United States Patent
Fisher et al.

(10) Patent No.: US 12,426,544 B2
(45) Date of Patent: *Sep. 30, 2025

(54) STAND-ON LAWN CARE VEHICLE WITH ADJUSTABLE NEUTRAL POSITION

(71) Applicant: HUSQVARNA AB, Huskvarna (SE)

(72) Inventors: Corey Fisher, Augusta, GA (US); Brian Downing, Charlotte, NC (US); Joshua Lawrence, Charlotte, NC (US); Timothy Wicker, Blythewood, SC (US); Juan Plasencia, Charlotte, NC (US); Darren Chandler, Orangeburg, SC (US); Jordan Craven, Matthews, NC (US); Travis Lyons, Peachtree City, GA (US); Rick Nelson, Lexington, SC (US); Braxton Reese, Charlotte, NC (US); Juan Rodriguez, Lexington, SC (US); Jerry Sandy, Fort Mill, SC (US); Eric Tse, Charlotte, NC (US); Chris Russell, Huntersville, NC (US); Steven Benedict, Charlotte, NC (US); Jake Bagwell, Huntersville, NC (US)

(73) Assignee: HUSQVARNA AB, Huskvarna (SE)

( * ) Notice: Subject to any disclaimer, the term of this patent is extended or adjusted under 35 U.S.C. 154(b) by 1131 days.

This patent is subject to a terminal disclaimer.

(21) Appl. No.: 17/235,263

(22) Filed: Apr. 20, 2021

(65) Prior Publication Data
US 2021/0307251 A1    Oct. 7, 2021

Related U.S. Application Data

(63) Continuation of application No. 16/098,151, filed as application No. PCT/US2017/036677 on Jun. 9, 2017, now Pat. No. 10,986,782.
(Continued)

(51) Int. Cl.
*A01D 69/03*    (2006.01)
*A01D 34/64*    (2006.01)
(Continued)

(52) U.S. Cl.
CPC ............. *A01D 69/03* (2013.01); *A01D 34/64* (2013.01); *A01D 34/66* (2013.01); *A01D 34/74* (2013.01);
(Continued)

(58) Field of Classification Search
CPC ........ A01D 69/03; A01D 34/64; A01D 34/66; A01D 34/68; A01D 34/74; A01D 34/82;
(Continued)

(56) References Cited

U.S. PATENT DOCUMENTS 4,876,846 A    10/1989    Torras
5,343,678 A *  9/1994    Stuart ................ A01D 34/6812
                                                                 56/11.6
(Continued)

FOREIGN PATENT DOCUMENTS

CN    102334400 A    2/2012
CN    103747998 A    4/2014
(Continued)

OTHER PUBLICATIONS

International Search Report and Written Opinion in the International Application No. PCT/US2017/036677 mailed Oct. 17, 2017.
(Continued)

*Primary Examiner* — Adam J Behrens
(74) *Attorney, Agent, or Firm* — Burr & Forman

(57) ABSTRACT

A riding lawn care vehicle may include a frame, an engine, a steering assembly, a support platform and a front platform. At least a pair of drive wheels may be operably coupled to the frame. The engine is operably coupled to the frame via an engine platform. The engine is disposed between the
(Continued)

drive wheels to selectively provide drive power to the drive wheels via respective hydraulic pumps. The steering assembly includes control levers operably coupled to respective drive wheels via the respective hydraulic pumps. The steering assembly enables steering of the lawn care vehicle based on drive speed control of the drive wheels responsive to positioning of the control levers. A neutral position of the control levers may be adjusted via a neutral position adjustment assembly.

20 Claims, 59 Drawing Sheets

Related U.S. Application Data

(60) Provisional application No. 62/348,447, filed on Jun. 10, 2016.

(51) Int. Cl.
| | | |
|---|---|---|
| A01D 34/66 | (2006.01) | |
| A01D 34/74 | (2006.01) | |
| A01D 34/82 | (2006.01) | |
| A01D 75/00 | (2006.01) | |
| B60K 17/28 | (2006.01) | |
| B60R 9/00 | (2006.01) | |
| B62D 11/00 | (2006.01) | |
| B62D 11/04 | (2006.01) | |
| B62D 51/02 | (2006.01) | |
| A01D 101/00 | (2006.01) | |

(52) U.S. Cl.
CPC ............ *A01D 34/82* (2013.01); *A01D 75/00* (2013.01); *B60K 17/28* (2013.01); *B60R 9/00* (2013.01); *B62D 11/005* (2013.01); *B62D 11/04* (2013.01); *B62D 51/02* (2013.01); *A01D 2101/00* (2013.01)

(58) Field of Classification Search
CPC .. A01D 34/824; A01D 2010/00; A01D 75/00; A01D 2034/6831; A01D 2034/6843; B62D 17/28; B62D 11/005; B62D 11/04; B62D 51/001
See application file for complete search history.

(56) References Cited

U.S. PATENT DOCUMENTS

| | | | | |
|---|---|---|---|---|
| 5,507,138 | A * | 4/1996 | Wright | A01D 34/6806 |
| | | | | 56/14.7 |
| 5,809,755 | A * | 9/1998 | Velke | B62D 51/02 |
| | | | | 56/14.7 |
| 5,921,142 | A * | 7/1999 | Peter | A01D 34/64 |
| | | | | 74/491 |
| 5,984,031 | A * | 11/1999 | Velke | B62D 51/04 |
| | | | | 56/14.7 |
| 6,059,055 | A * | 5/2000 | Velke | A01D 34/82 |
| | | | | 180/315 |
| 6,199,354 | B1 * | 3/2001 | King | A01D 34/6812 |
| | | | | 56/11.4 |
| 6,487,857 | B1 * | 12/2002 | Poplawski | F01B 13/04 |
| | | | | 60/487 |
| 6,490,849 | B1 * | 12/2002 | Scag | A01D 34/001 |
| | | | | 56/14.7 |
| 6,675,567 | B2 | 1/2004 | Samejima et al. | |
| 7,404,282 | B2 | 7/2008 | Samejima et al. | |
| 7,407,030 | B2 * | 8/2008 | Yasuda | B60K 25/06 |
| | | | | 180/305 |
| 7,458,311 | B2 * | 12/2008 | Korthals | F16H 61/439 |
| | | | | 60/328 |
| 7,458,432 | B2 * | 12/2008 | Mayer | A01D 34/66 |
| | | | | 56/10.8 |
| 7,473,207 | B1 | 1/2009 | Hauser et al. | |
| 7,634,953 | B2 * | 12/2009 | Hoffman | A01D 34/824 |
| | | | | 74/484 R |
| 7,748,480 | B2 * | 7/2010 | Loxterkamp | B62D 11/006 |
| | | | | 180/335 |
| 8,141,886 | B1 * | 3/2012 | Sugden | B62D 51/02 |
| | | | | 56/14.7 |
| 9,141,126 | B2 * | 9/2015 | Hynes | G05G 1/01 |
| 9,228,572 | B2 * | 1/2016 | Richardson | F03C 1/0686 |
| 9,285,028 | B2 * | 3/2016 | Reichard | F16H 59/02 |
| 9,341,258 | B1 * | 5/2016 | Templin | F16H 61/439 |
| 9,650,024 | B2 * | 5/2017 | Weihl | B60T 7/042 |
| 9,840,143 | B1 * | 12/2017 | Keller | F16H 57/04 |
| 10,099,714 | B2 * | 10/2018 | Oswald | A01D 34/001 |
| 10,208,852 | B2 * | 2/2019 | Aoki | F16H 59/044 |
| 10,321,627 | B1 * | 6/2019 | Lapp | G05G 1/04 |
| 2002/0178709 | A1 | 12/2002 | Velke et al. | |
| 2005/0126146 | A1 * | 6/2005 | Velke | A01D 34/824 |
| | | | | 56/16.7 |
| 2007/0044446 | A1 * | 3/2007 | Wright | A01D 69/03 |
| | | | | 56/11.9 |
| 2007/0289785 | A1 * | 12/2007 | Mayer | A01D 34/66 |
| | | | | 180/6.32 |
| 2008/0034722 | A1 * | 2/2008 | Wright | A01D 69/00 |
| | | | | 56/14.7 |
| 2008/0034723 | A1 * | 2/2008 | Wright | A01D 34/74 |
| | | | | 56/17.1 |
| 2008/0035394 | A1 * | 2/2008 | Bartel | B62D 11/006 |
| | | | | 180/6.24 |
| 2008/0307918 | A1 * | 12/2008 | Hoffman | A01D 34/824 |
| | | | | 74/484 R |
| 2011/0083413 | A1 * | 4/2011 | Jackson | A01D 34/82 |
| | | | | 56/14.7 |
| 2012/0275933 | A1 | 11/2012 | Richardson et al. | |
| 2013/0074464 | A1 | 3/2013 | Gindt et al. | |
| 2013/0145890 | A1 * | 6/2013 | Hynes | G05G 1/01 |
| | | | | 74/490.1 |
| 2013/0239731 | A1 | 9/2013 | Reichard et al. | |
| 2014/0110182 | A1 * | 4/2014 | Dwyer | A01D 34/824 |
| | | | | 74/522 |
| 2015/0175190 | A1 | 6/2015 | Ito et al. | |
| 2017/0247021 | A1 * | 8/2017 | Krystowski | B60T 7/104 |
| 2017/0280621 | A1 * | 10/2017 | Kawai | A01D 34/64 |

FOREIGN PATENT DOCUMENTS

| | | |
|---|---|---|
| CN | 103841816 A | 6/2014 |
| DE | 202005018037 U1 | 1/2006 |
| WO | 2013016196 A1 | 1/2013 |
| WO | 2016049275 A1 | 3/2016 |

OTHER PUBLICATIONS

International Preliminary Report on Patentability for International Application No. PCT/US2017/036677 issued on Dec. 11, 2018.

* cited by examiner

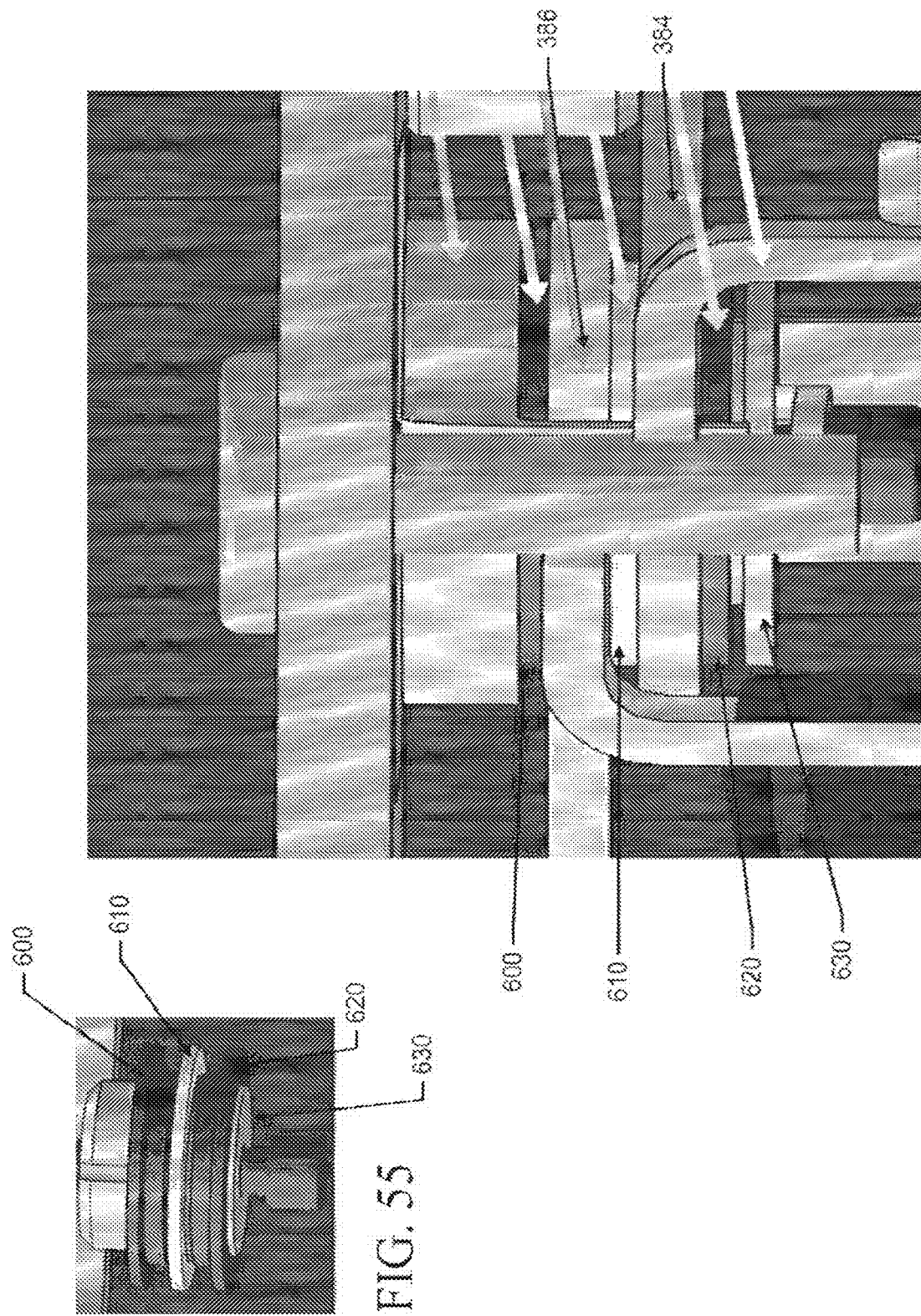

STAND-ON LAWN CARE VEHICLE WITH ADJUSTABLE NEUTRAL POSITION

CROSS-REFERENCE TO RELATED APPLICATIONS

This application claims priority to U.S. application No. 62/348,447 filed Jun. 10, 2016, the entire contents of which are incorporated herein by reference.

TECHNICAL FIELD

Example embodiments generally relate to lawn care vehicles and, more particularly, relate to a lawn care vehicle that allows an operator to stand on a platform while operating the lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers provide the convenience of a riding vehicle as well as a typically larger cutting deck as compared to a walk-behind model. Similarly, riding lawn care vehicles typically provide users with increased convenience by enabling them to perform the yard maintenance tasks faster without exerting effort to push or walk with a vehicle.

Riding lawn care vehicles typically include steering assemblies that are used to direct the movement of the riding lawn care vehicles. The steering assemblies often take the familiar form of a steering wheel. However, handlebar assemblies have also been used in some cases. More recently, some so called "zero turn" mowers have employed separate steering levers or even a joystick to provide steering functionality. These zero turn models have become increasingly popular. One particular type of zero turn mower is a stand-on model that is designed to support a standing operator rather than (or perhaps as an optional alternative to) a seated rider. Stand-on models may be useful or desirable in some contexts or by some operators and thus, continued improvements in the design and operation of these models is needed.

BRIEF SUMMARY OF SOME EXAMPLES

Accordingly, some example embodiments may provide a structure for employment in connection with a stand-on riding lawn care vehicle. For example, in one embodiment of the invention, a riding lawn care vehicle is provided. The vehicle may include a frame, an engine, a steering assembly, a support platform and a front platform. At least a pair of drive wheels may be operably coupled to the frame. The engine is operably coupled to the frame via an engine platform. The engine is disposed substantially between the drive wheels to selectively provide drive power to the drive wheels via respective hydraulic pumps. The steering assembly includes control levers operably coupled to respective ones of the drive wheels via the respective hydraulic pumps. The steering assembly enables steering of the riding lawn care vehicle based on drive speed control of the drive wheels responsive to positioning of the control levers. The support platform is operably coupled to the frame at a rear portion of the riding lawn care vehicle to support a standing rider. The front platform is operably coupled to the frame forward of the engine platform. The front platform supports the hydraulic pumps.

Some example embodiments may improve an operator's ability to employ a stand-on model of a lawn care vehicle to accomplish various yard maintenance activities. The user experience associated with achieving a comfortable ride on a riding lawn care vehicle may also be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 55 illustrates a perspective view of retention assembly components in accordance with an example embodiment;

FIG. 56 shows the retention assembly components together with first and second scissor arms in accordance with an example embodiment;

DETAILED DESCRIPTION

Figure 1:
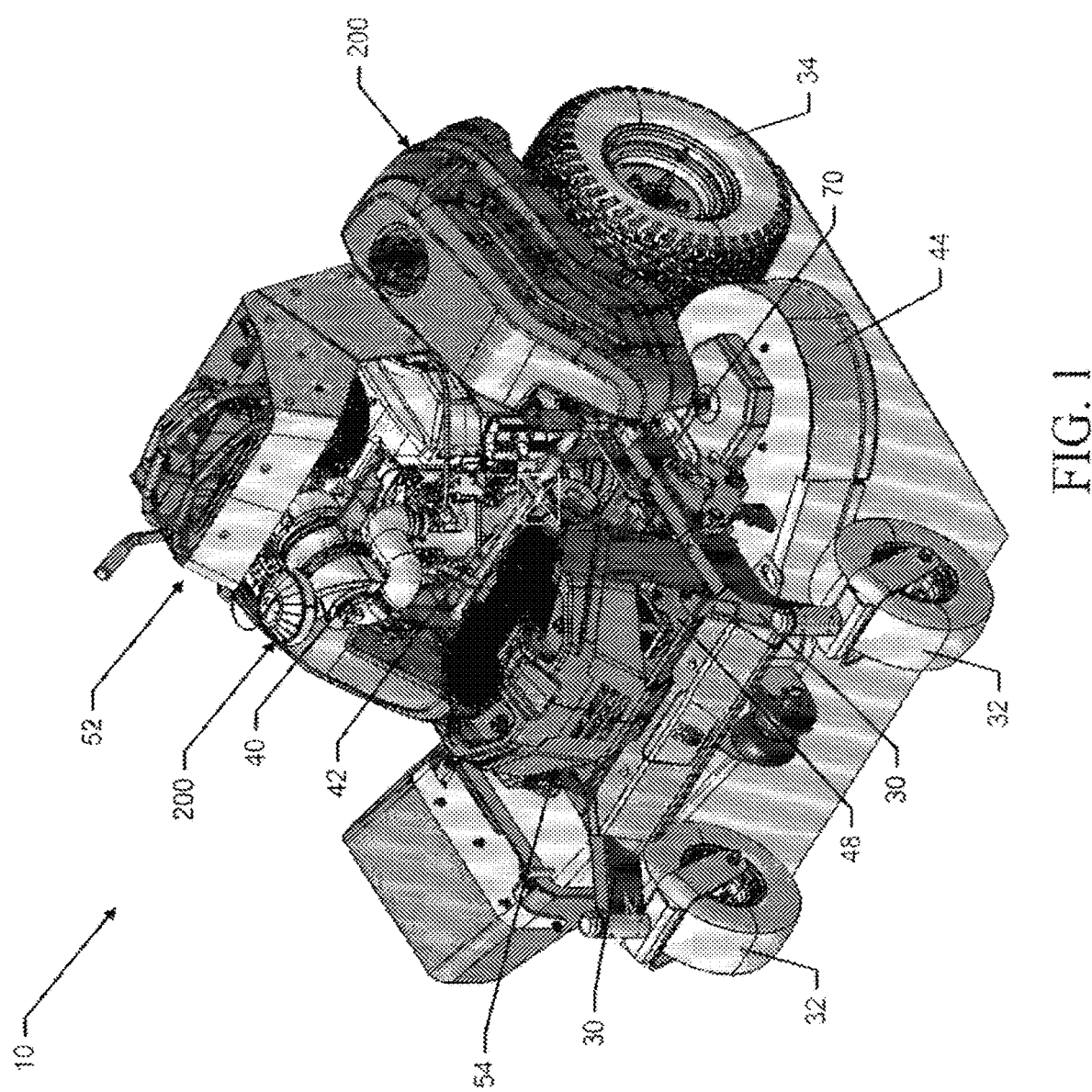
FIG. 1 illustrates a perspective view of a stand-on riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

Some example embodiments may improve operator comfort, ease of maintenance, operability, and overall device utility of lawn care vehicles such as, for example, riding lawn mowers with a stand-on platform. In this regard, FIG. 1 illustrates a perspective view of a riding lawn care vehicle 10 that is operated by a standing rider according to an example embodiment. FIGS. 2-18 illustrate various additional views of components or portions of the riding lawn care vehicle 10 according to an example embodiment.

Figure 9A:
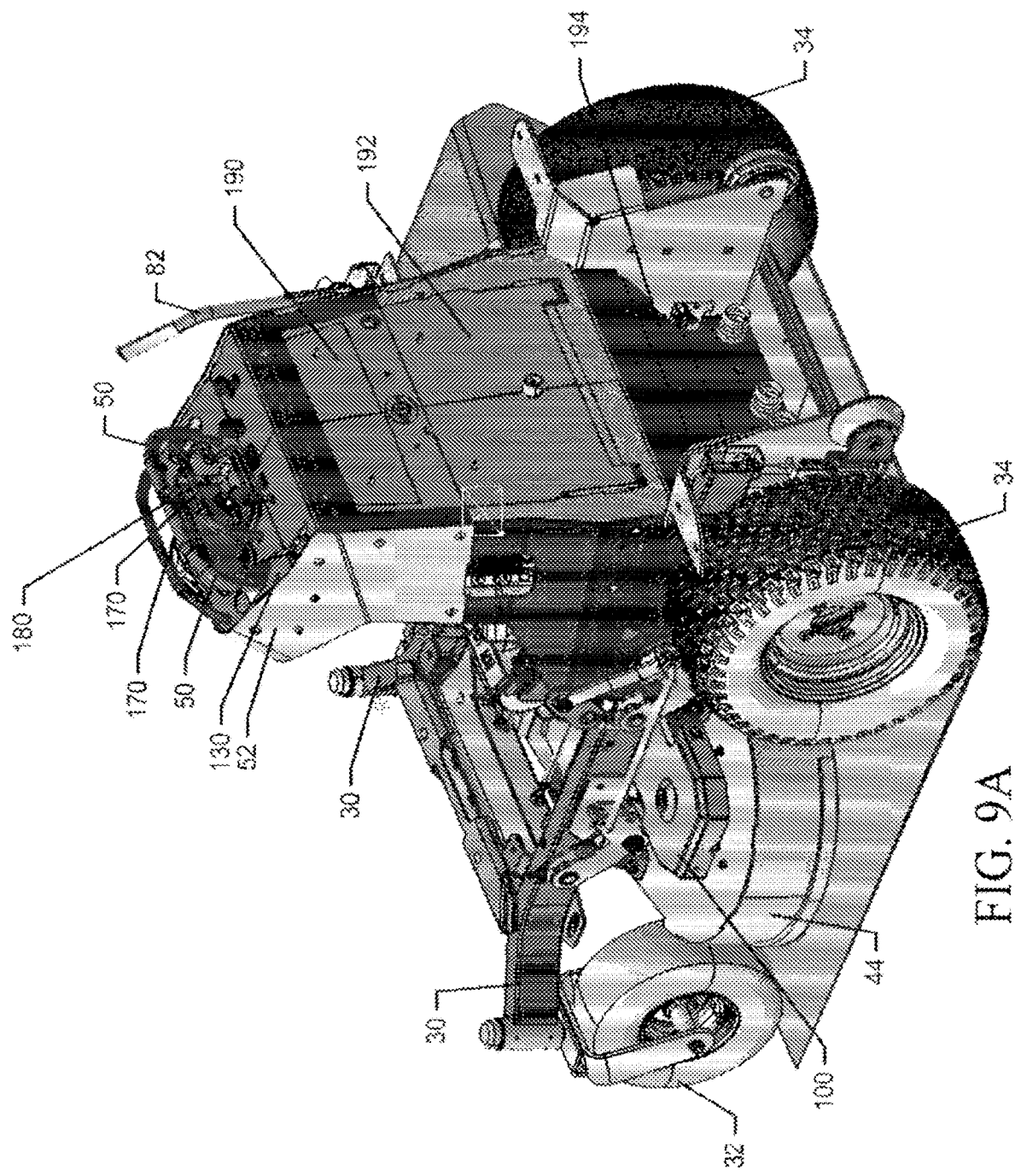
FIG. 9A illustrates a rear perspective view of the riding lawn care vehicle of FIG. 1 according to an example embodiment.
Figure 9B:
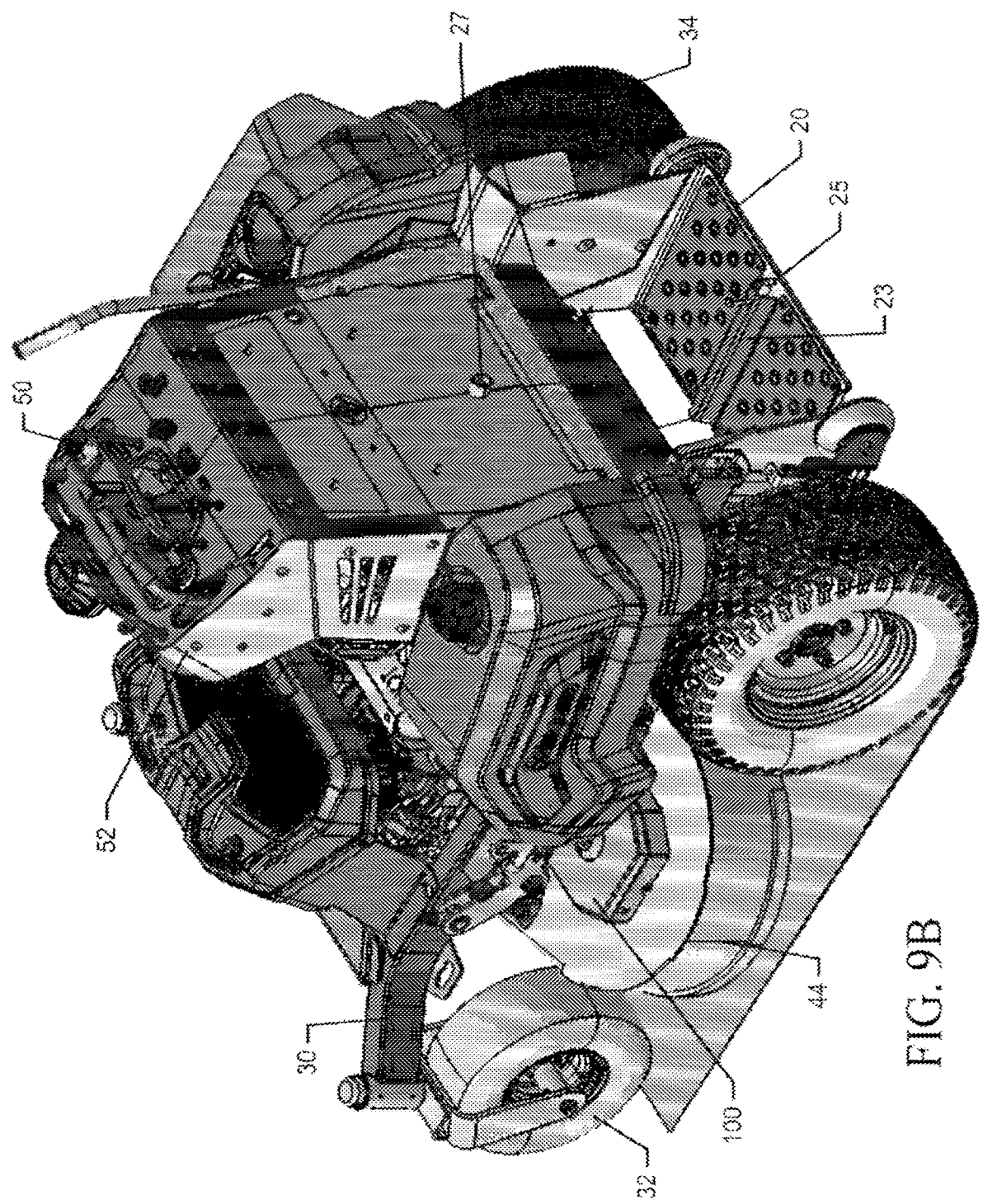
FIG. 9B illustrates a rear perspective view of the riding lawn care vehicle of FIG. 9A with the support platform added and in a lowered position according to an example embodiment.
Figure 9C:
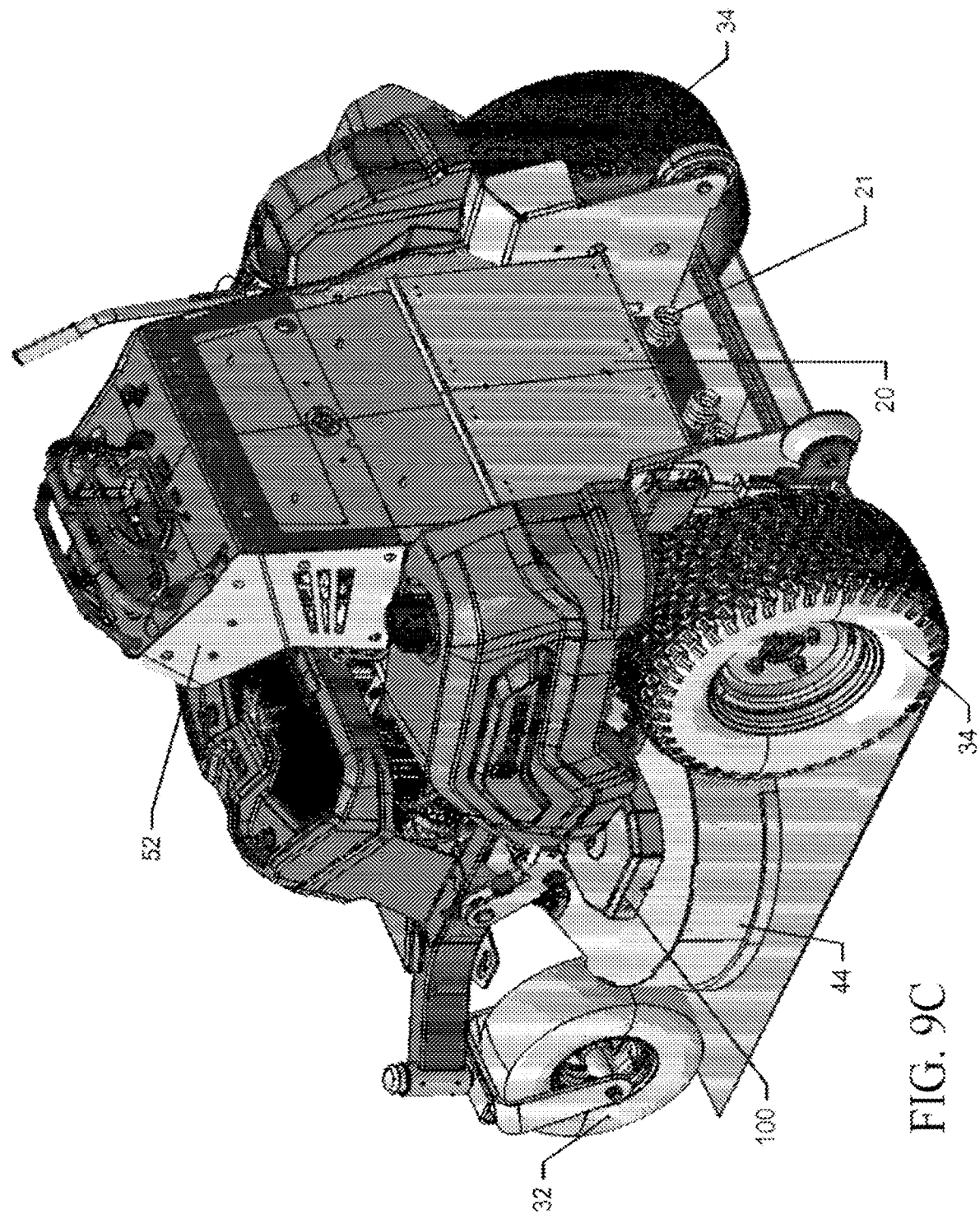
FIG. 9C illustrates a rear perspective view of the riding lawn care vehicle of FIG. 9B with the support platform folded up according to an example embodiment.

Referring to FIGS. 1-18, the riding lawn care vehicle 10 of FIG. 1 includes a support platform 20 (see FIGS. 9B and 9C) operably coupled (e.g., pivotally attached) to a frame 30 of the riding lawn care vehicle 10. The support platform 20 may be configured to support a standing operator that may operate the riding lawn care vehicle 10. As such, the support platform 20 may include a step-like (e.g., relative to the ground), substantially flat surface upon which the operator may stand. To be able to accommodate operators of various sizes while minimizing overall weight, the support platform 20 may be made of relatively thin sheet metal or another rigid material that is sized to substantially support one or more feet of an average expected operator of the riding lawn care vehicle 10. The support platform 20 may be cushioned or have a suspension system to improve operator comfort. For example, FIG. 9C illustrates springs 21 that may be operably coupled (e.g., attached) to the frame 30 and/or extend rearwardly away from the frame 30. In operation, when the support platform 20 is deployed in a horizontal (e.g., its working) position (e.g., as shown in FIG. 9B), the springs 21 are disposed between and/or engage a portion of the frame 30 of the riding lawn care vehicle 10 and a portion (e.g., a vertical portion) of the support platform 20. Such positioning enables the springs 21 to, e.g., reduce vibrations felt by the operator and/or bias the support platform 30 in a particular direction (e.g., back to the horizontal position from a position closer to the ground).

In the illustrated embodiment, the support platform 20 is a permanent feature of the riding lawn care vehicle and is rotatable relative to the frame 30 (e.g., pivotally suspended from the frame 30) between a first position and a second position. The first position may be a generally horizontal, working position, e.g., the position during which the operator stands on the support platform 20. The second position may be a generally vertical, storage position, e.g., the position during which a protrusion 25 of the support platform 20 is secured to a receiver 27 of the operator station 52 and/or the lawn care vehicle 10 may be operated in a walk-behind mode. In other embodiments, the support platform 20 may still be a permanent feature of the lawn care vehicle, but may be fixed relative to the frame 30. In some examples, the support platform 20 may be mounted to the frame 30 so that it is prevented from moving side-to-side relative to the frame 30, but at the same time, the support platform 20 may be rotatably mounted to the frame 30 so that the support platform 20 can be fully or partially tilted or folded as demonstrated in FIG. 9C. In some cases, the operator may walk behind the riding lawn care vehicle 10 when the support platform 20 is tilted or folded upward as shown in FIG. 9C. Meanwhile, when the support platform 20 is not folded, and is therefore deployed, a surface (e.g., with grips thereon in some cases) may be provided for the operator to stand upon. In some cases, the surface may be interrupted by a divider plate 23 provided to bisect the surface (e.g., the gripped surface), as shown in FIG. 9B. One foot may be placed on each side of the divider plate 23 during normal operation. However, the operator may elevate one foot by placing it on the divider plate 23 when the riding lawn care vehicle 10 is operated on unlevel ground. The support plate 20 may also be provided with the protrusion 25 disposed at a portion thereof in order to be received (e.g., via a snap fit) in the receiver 27 disposed at a rear portion of the riding lawn care vehicle 10.

The frame 30 may be a weldment or assembly of frame members that may lie substantially in a same plane. The plane in which the frame 30 lies may be substantially horizontal and/or substantially parallel to the ground upon which the riding lawn care vehicle 10 is operated when the riding lawn care vehicle 10 is operated on even terrain. However, in some embodiments, the frame 30 may lie in a plane that is a few degrees out of being parallel with the ground. In an example embodiment, the frame 30 may include at least two elongate members that extend substantially parallel to a longitudinal centerline of the riding lawn care vehicle 10. However, some portions of the frame 30 may bend or extend out of a line parallel to the longitudinal centerline of the riding lawn care vehicle 10. The frame 30 may further include cross members, brackets, and/or other support structures as needed or desired to provide a solid foundation for attachment of other components of the riding lawn care vehicle 10.

In an example embodiment, the frame 30 may support (directly or indirectly) ground contacting wheels of the riding lawn care vehicle 10. In this regard, the riding lawn care vehicle 10 may include a pair of front wheels 32 and a pair of rear wheels 34. In the illustrated embodiment, the rear wheels 34 are also the "drive wheels" since they are powered (e.g., by the engine of the vehicle) to provide the driving force for propelling the lawn care vehicle 20 over the ground. In the illustrated embodiment, the front wheels 32 are not drive wheels (i.e., are not powered to propel the lawn care vehicle) and may be caster or caster-type wheels. The rear wheels 34 may be capable of being independently driven so that the lawn care vehicle 10 can turn and perform zero-turn maneuvers by driving the rear wheels 34 at different speeds and/or in different directions.

In some embodiments, the rear wheels 34 may have a larger diameter than the front wheels 32. As such, an axis of rotation of the rear wheels 34 may have a higher elevation (e.g., vertical distance from the ground) than the elevation of the axis of rotation of the front wheels 32.

Figure 2:
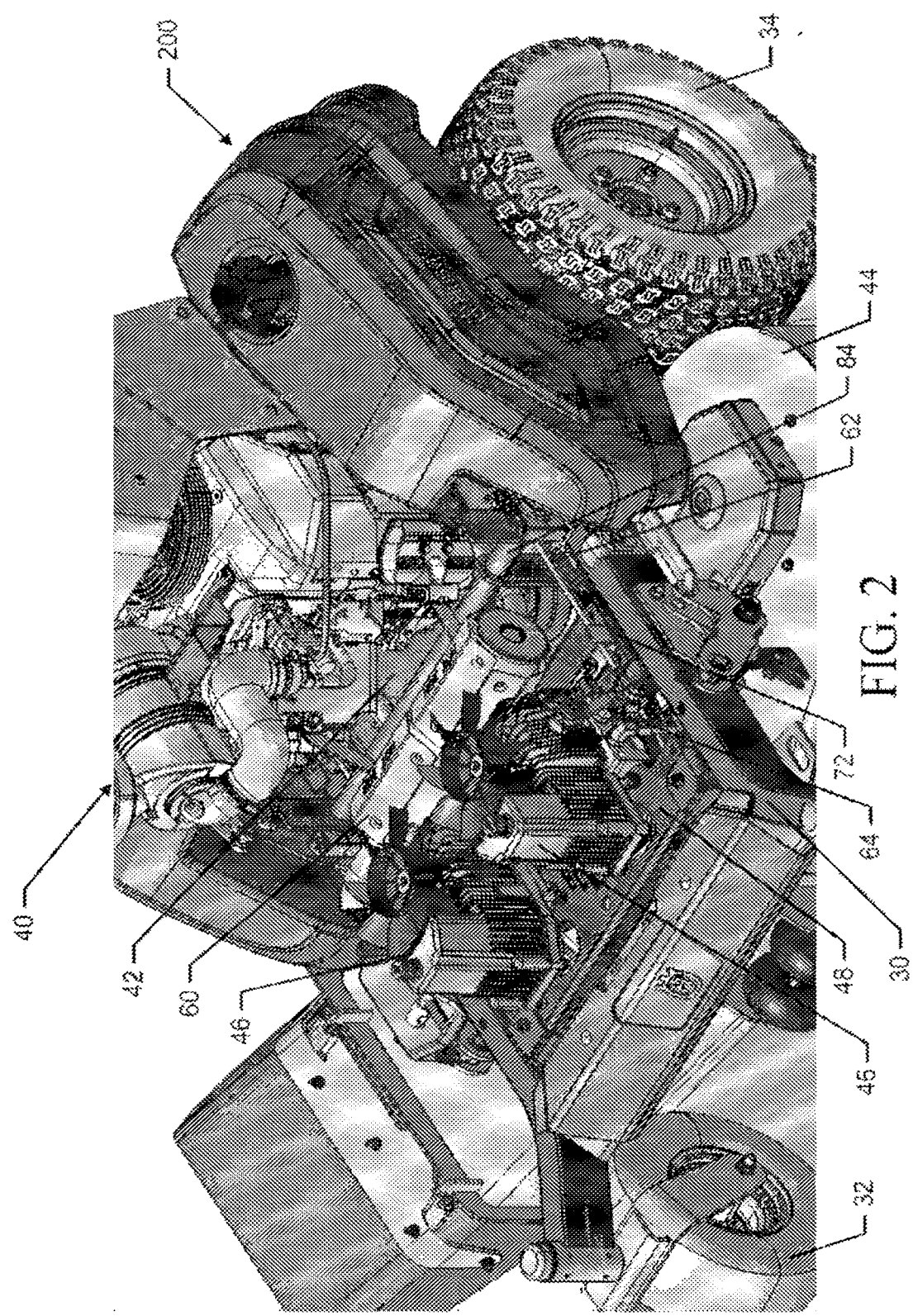
FIG. 2 illustrates a top perspective view of the riding lawn care vehicle of FIG. 1 with a front cover of the riding lawn care vehicle removed according to an example embodiment.
Figure 3:
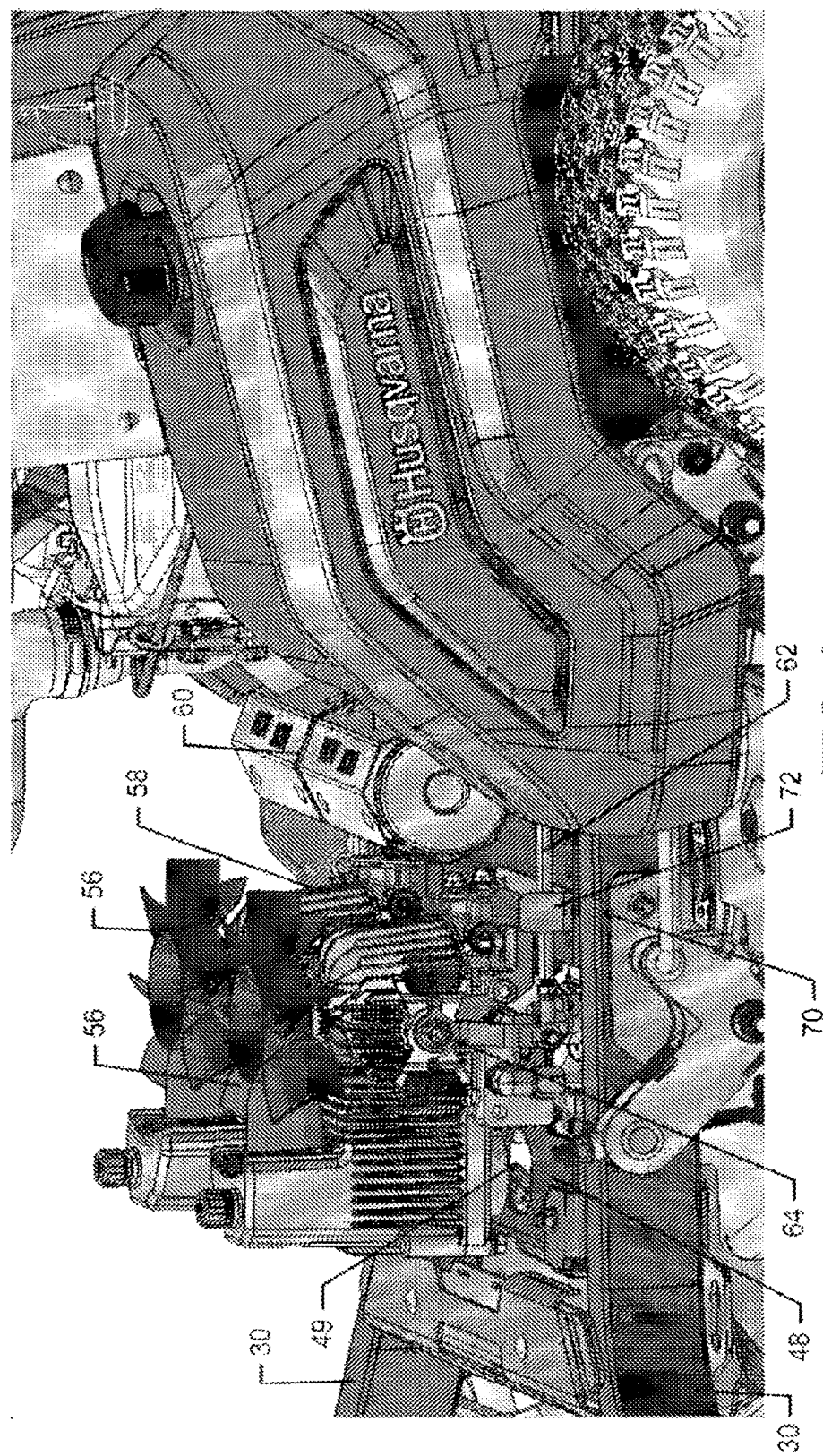
FIG. 3 illustrates a side perspective view of the riding lawn care vehicle of FIG. 1 with the front cover removed according to an example embodiment.

The riding lawn care vehicle 10 may include an engine 40. The engine 40 may be a gas-powered internal combustion engine, or may be another type of engine, such as a battery-powered electric motor. The engine 40 may be supported by the frame 30 via an engine platform 42 that extends between members of the frame 30. In some cases, the engine platform 42 or the engine 40 may be further supported by additional platforms, support brackets, support rods, and/or the like. Support for the engine 40 may be provided such that the engine 40 is disposed substantially between the rear wheels 34. However, as shown in FIGS. 1-3, some portions of the engine 40 may extend forward of the rear wheels 34.

In some embodiments, the engine platform 42 may be provided at an elevation above the ground that is equal to or higher than the axis of rotation of the rear wheels 34. As such, a bottom of the engine 40 is supported at an elevation above the ground that is equal to or higher than the axis of rotation of the rear wheels 34. In some embodiments, the engine platform 42 is located between the elevation of the axis of rotation of the rear wheels 34 and the elevation of the top edge of the rear wheels 34.

The engine 40 may drive (e.g., via belts, chains, cables, pulleys, shafts, etc.) one or more blades housed within a cutting deck 44 of the riding lawn care vehicle 10. The engine 40 may be configured to have a horizontal or a vertical crankshaft. A horizontal crankshaft may be advantageous in some embodiments since it may lend itself better to driving the cutting deck 44 or other front attachment using a shaft. A vertical crankshaft may be advantageous in some embodiments since it may lend itself better to driving the cutting deck or other front attachment using a belt, chain, or other endless band.

In an example embodiment, the engine 40 may drive (e.g., via belts, chains, cables, pulleys, shafts, etc.) one or more hydraulic pumps 46 that are also operably coupled to the frame 30. In an example embodiment, the hydraulic pumps 46 may be mounted on a front platform 48 that is separated from (e.g., not integral with) the engine platform 42. Moreover, in an example embodiment, the front platform 48 may be provided at a higher elevation than the engine platform 42. In this regard, the front platform 48 may be mounted to be substantially level with or nearly at the same elevation as the top of the frame 30. However, the engine platform 42 may be mounted slightly lower than the top of the frame 30. In other embodiments, the engine platform 42 is positioned at the same elevation as the front platform 48, or at a higher elevation than the front platform 48.

The hydraulic pumps 46 may be operably coupled to respective steering levers (e.g., control levers 50) that may be disposed at an operator station 52 of the riding lawn care vehicle 10 to form a steering assembly for the riding lawn care vehicle 10. Each of the hydraulic pumps 46 may be operably coupled to respective ones of the rear wheels 34 to provide inputs to the rear wheels 34 for driving the rear wheels 34 in forward or reverse directions and for controlling the speed of the rear wheels 34 responsive to positions (e.g., a degree or amount of displacement from a neutral position) of the control levers 50. As such, the operator may stand on the support platform 20, may face the engine 40, and may be positioned to operate the control levers 50 at the operator station 52 to control the movement of the riding lawn care vehicle 10 based on the combined inputs provided to the control levers 50. For example, if both control levers 50 are engaged in a forward direction by the same amount, the riding lawn care vehicle 10 may move substantially straight ahead at a speed determined by the degree of deflection (or amount of displacement) of the control levers 50 from a neutral position thereof. Meanwhile, if both control levers 50 are engaged in a reverse direction by the same amount, the riding lawn care vehicle 10 may move substantially straight back at a speed determined by the degree of deflection of the control levers 50 provided by the engagement. If one of the control levers 50 is engaged in a forward direction with a same degree of deflection as the other one of the control levers 50 is engaged in the reverse direction, then the riding lawn care vehicle 10 may be directed to make a substantially zero radius turn. Any difference in the degree of deflection between the control levers 50 may then result in turns of varying magnitudes, the size of which depend upon the difference in the degree of deflection.

The control levers 50 may extend through an outer portion of the operator station 52 (e.g., proximate to lateral sides thereof) and then bend at one portion along respective lengths of the control levers 50 to continue to extend toward each other. Although the control levers 50 may extend directly toward each other, in some cases the control levers 50 may be angled toward the operator to provide better ergonomics for the handling of the control levers 50 by an operator standing on the support platform 20.

When performing a zero radius turn (where the two rear wheels 34 are driven at equal speeds in opposite directions), an axis of rotation of the riding lawn care vehicle 10 may extend substantially perpendicular to the plane of the frame 30 and/or the plane of the ground from a location substantially halfway between the rear wheels 34. As such, the axis of rotation of the riding lawn care vehicle 10 may extend perpendicularly (and vertically relative to the horizontal ground plane) from a line passing through the axis of rotation of each of the rear wheels 34. Furthermore, the axis of rotation of the riding lawn care vehicle 10 may extend substantially from a midway point between the rear wheels 34. By positioning the engine 40 substantially between the rear wheels 34, a substantial portion of the weight of the riding lawn care vehicle 10 may be placed near the axis of rotation of the riding lawn care vehicle 10 to improve stability. In some cases, to account for differences between the weight of an average operator and the weight of the cutting deck 44 of the riding lawn care vehicle 10, the engine 40 may be moved slightly forward or rearward relative to the axis of rotation to attempt to provide a good balance of weight distribution on the riding lawn care vehicle 10, which can affect traction, handling, stability, hill performance, etc. As illustrated in FIGS. 2 and 3, in the illustrated embodiment of the riding lawn care vehicle 10 at least a portion of the engine 40 is positioned to extend forward of the axis of rotation of the rear wheels 34 to help balance the weight of the operator. In some embodiments, the provision of the engine platform 42 at a lower elevation than the front platform 48 also provides a lower center of gravity for the riding lawn care vehicle 10 to further increase stability.

For safety and/or aesthetic purposes, the hydraulic pumps 46 may normally be covered by a removable front cover 54, such as the one shown in FIG. 1. This front cover 54 is removed in FIGS. 2-4 to allow better visibility of the hydraulic pumps 46. The hydraulic pumps 46 include fans 56 and cooling fins 58 (see particularly FIGS. 3 and 4) to mitigate temperature rise during operation of the hydraulic pumps 46. Due to the positioning of the front cover 54, the engine 40, the hydraulic pumps 46 and the operator station 52, air drawn in by the fans 56 may also necessarily create airflow that cools one or more components of the exhaust 60.

The hydraulic pumps 46 may be controlled via pump control linkages 62 that extend from the control levers 50 to the hydraulic pumps 46. The movement of the control levers 50 away from a neutral position may cause rotation of a pump control assembly 64 that controls operation of a respective one of the hydraulic pumps 46 to provide drive power to the rear wheels 34 as described above. The hydraulic pumps 46 are normally in an engaged state, which provides for movement of the rear wheels 34 responsive to operation of the hydraulic pumps 46. However, the hydraulic pumps 46 can also be disengaged so that the rear wheels 34 can freely rotate. When the hydraulic pumps 46 are in the disengaged state, the riding lawn care vehicle 10 is essentially in "neutral" and can be pushed by the operator.

For a typical lawn care vehicle with hydraulic pump drive, the hydraulic pumps are individually engaged/disengaged by operation of a bypass lever or other operating member positioned on the respective ones of the hydraulic pumps in order to shift to and from the engaged state. This would therefore typically require the operator to reach into the area around the hydraulic pumps, which may be hot or dangerous relative to the fans 56, to individually operate the bypass lever or other operating member. On the other hand, example embodiments of the present invention may provide a bypass assembly 70 to allow the hydraulic pumps 46 to be simultaneously engaged/disengaged from a single location/direction of the riding lawn care vehicle 10, and via a single actuator.

Figure 4:
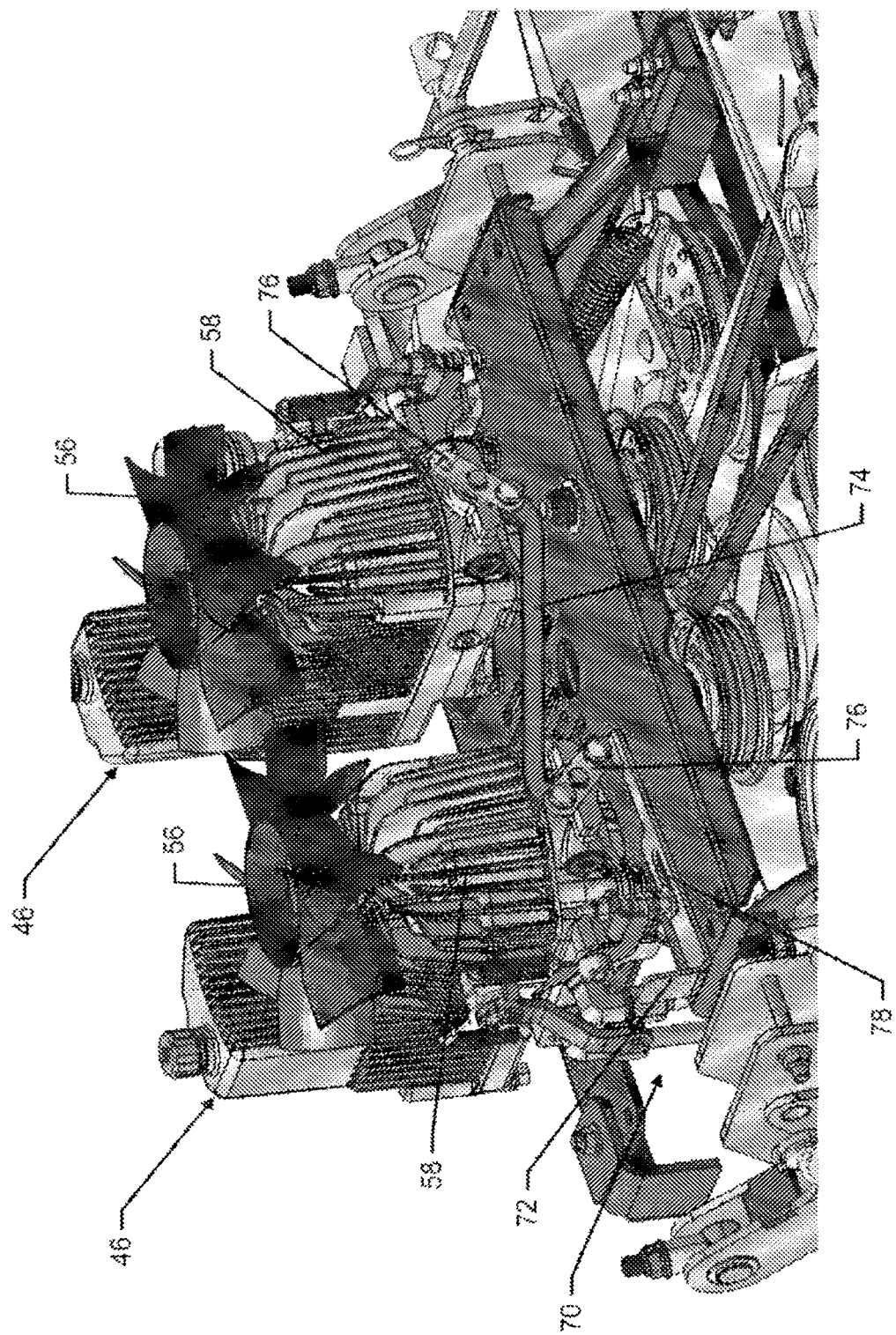
FIG. 4 illustrates a closer view of some components of the riding lawn care vehicle to illustrate a bypass lever for simultaneous operation to bypass both hydraulic pumps of the riding lawn care vehicle according to an example embodiment.

As shown in FIG. 4, the bypass assembly 70 includes a universal bypass lever 72, a linkage arm 74, and one instance of a local bypass lever 76 at each one of the hydraulic pumps 46. The universal bypass lever 72 is directly coupled to one of the local bypass levers 76, and the other indirectly (e.g., via the linkage arm 74). The universal bypass lever 72 is configured to slide inwardly or outwardly (e.g., relative to the longitudinal centerline of the riding lawn care vehicle 10) to shift the local bypass levers 76 and control engagement or disengagement of the hydraulic pumps 46. In some cases, the universal bypass lever 72 slides across a surface of the front platform 48 to control engagement or disengagement of the hydraulic pumps 46. In this regard, for example, a slot 78 may be provided in the universal bypass lever 72 to define the range of motion of the universal bypass lever 72 along the surface of the front platform 48. As the universal bypass lever 72 moves, the local bypass lever 76 to which the universal bypass lever 72 is directly coupled will rotate and carry with it the other local bypass lever 76 via the linkage arm 74.

Each instance of the local bypass lever 76 rotates to shift the respective one of the hydraulic pumps 46 between the engaged and disengaged states. The linkage arm 74 operably couples the respective instances of the local bypass lever 76, and provides opposite rotational movement directions at respective ones of the hydraulic pumps 46 to synchronize the states of the hydraulic pumps 46. In this regard, for example, the linkage arm 74 extends between opposite ends (e.g., top and bottom) of respective ones of the local bypass lever 76 so that rotational movement of one of the local bypass levers 76 in a clockwise direction disengages the corresponding instance of the hydraulic pumps 46 and further causes rotational movement of the other one of the local bypass levers 76 in a counterclockwise direction to disengage the other corresponding instance of the hydraulic pumps 46. The movement of the local bypass levers 76 in the opposite direction would, via the linkage arm 74, likewise cause engagement of the hydraulic pumps 46.

Positioning of the hydraulic pumps 46 on the front platform 48, and in front of the engine 40 enables greater access to the hydraulic pumps 46 for service, maintenance and inspection. In addition to providing improved access to the hydraulic pumps 46 by virtue of removal of the front cover 54, the front platform 48 may also include features to improve access to the hydraulic pumps 46. For example, the front platform 48 may include an access passage 49 (see FIG. 3) provided under the reservoir portion of each of the hydraulic pumps 46. Cartridge filters of the hydraulic pumps 46 may therefore be easily accessed, cleaned or replaced via the access passage 49.

Providing the hydraulic pumps 46 forward of the engine 40 also enables easier accessory attachment such as, for example, if an accessory is to be attached to a front part of the riding lawn care vehicle 10. This position is also advantageous for cooling (as described above) and for maintaining cleanliness of components of the riding lawn care vehicle 10. Similarly, by providing the engine 40 farther rearward relative to the cutting deck 44, improved belt angles can be provided for operation of the cutting deck 44. Examples of such belts can be seen in FIG. 5, which also shows the deck lift system 80 of an example embodiment.

The deck lift system 80 may include a deck lift lever 82, a torsion bar 84, a front lift assembly 86, a rear lift assembly 88, torsion bar linkages 90, and deck lift linkage arms 92. The deck lift lever 82 may be provided on one side or the other of the operator station 52 (e.g., the right side in this example). The deck lift lever 82 may be movable forward or rearward to adjust other components of the deck lift system 80 to correspondingly raise or lower the elevation of the cutting deck 44. The front lift assembly 86 and the rear lift assembly 88 may each be operably coupled to the cutting deck 44 and the frame 30 to allow the cutting deck 44 to be raised or lowered relative to the frame 30. The front lift assembly 86 and the rear lift assembly 88 may each be operably coupled to the frame 30 via a pivotal connection at the apex of a V-shaped arm or member. Meanwhile, one of the ends of the V-shaped arms or members (e.g., the forward end) is operably coupled to the cutting deck 44 while the other ones of the ends are operably coupled to each other via the deck lift linkage arms 92. Moreover, the rear lift assembly 88 that is operably coupled to the deck lift lever 82 is also operably coupled to the same end of the rear lift assembly 88 that is operably coupled to the deck lift linkage arm 92 on that side (e.g., the right side).

The torsion bar 84 is also operably coupled to the same end of both of the rear lift assemblies 88 via torsion bar linkages 90. The torsion bar 84 is physically located in the space between the engine 40 and the hydraulic pumps 46 (e.g., proximate to the exhaust 60) and/or extends laterally between left and right sides of the vehicle 10. In some cases, the torsion bar 84 may include extensions 94 that extend upward and downward to engage springs 96 that are biased in opposing directions to assist with raising and lowering the cutting deck 44 by facilitating rotation of the torsion bar 84. The torsion bar 84 therefore provides operable coupling between the left and right sides of the deck lift system 80.

During operation, if the deck lift lever 82 is operated, the rear lift assembly 88 on the same side will be pivoted based on the direction of movement of the deck lift lever 82. The torsion bar linkage 90 will translate the pivoting of the rear lift assembly 88 on the same side as the deck lift lever 82 to the rear lift assembly 88 on the opposite side via the torsion bar 82. The deck lift linkage arms 92 will also translate pivoting (or rotation) of the rear lift assemblies 88 to the front lift assemblies 86 and then correspondingly move the cutting deck 44 accordingly.

Figure 5:
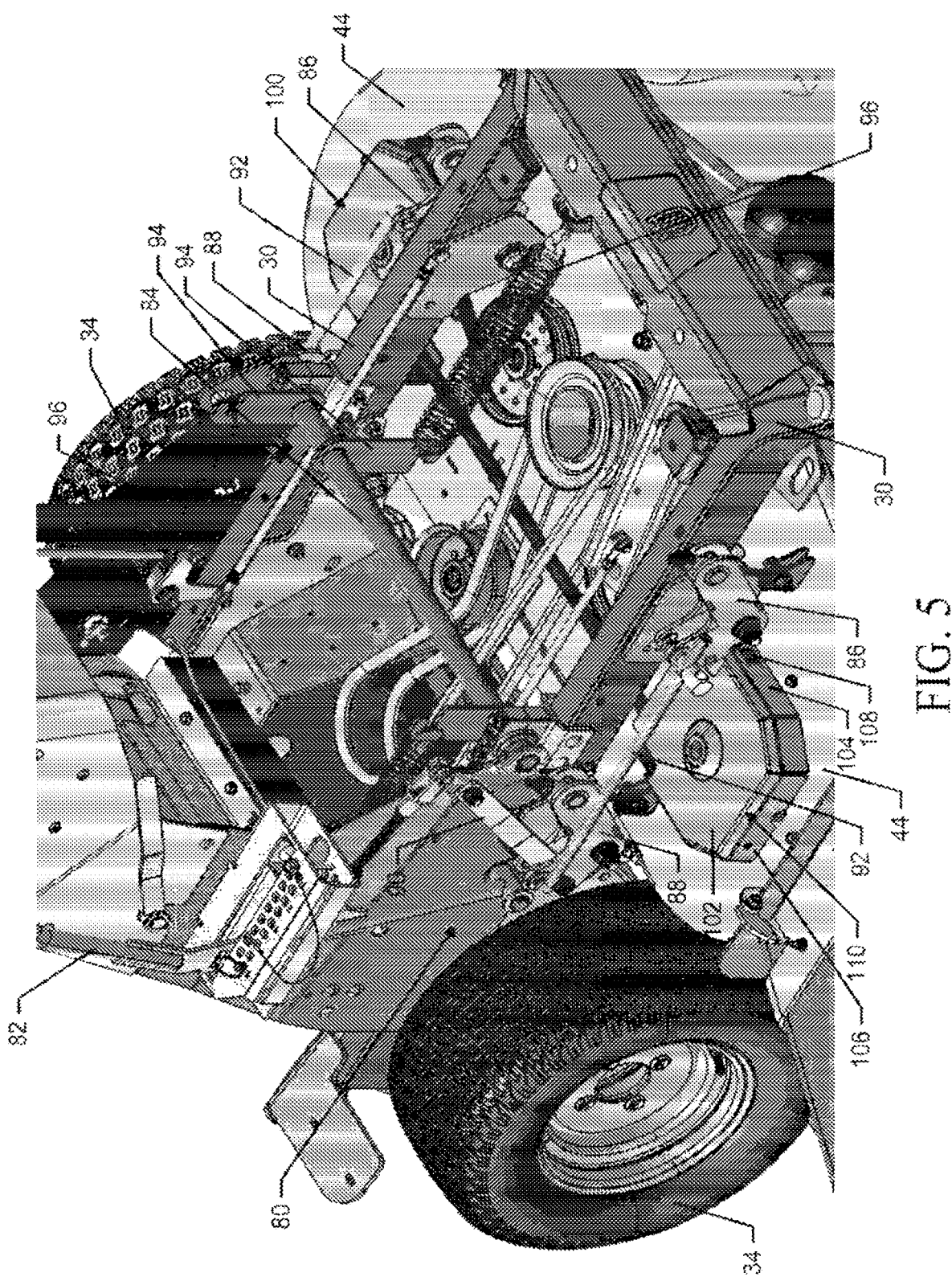
FIG. 5 illustrates a perspective view of the riding lawn care vehicle with both the engine and the hydraulic pumps removed (along with their respective platforms) according to an example embodiment.

FIG. 5 also shows mandrel covers 100 that cover what would otherwise be exposed belts for driving the blades of the cutting deck 44. The mandrel covers 100 may include a top portion 102 that lies in a plane substantially parallel to a plane in which a top of the cutting deck 44 lies. The mandrel covers 100 may also include sidewalls 104 and an outer wall 106 to cover three sides around the belts and pulleys used for driving the cutting blades inside the cutting deck 44. The outer wall 106 may on an opposite side relative to the frame 30 and an opening may be provided on the fourth side facing the outer wall 106. The sidewalls 104 may each have tabs 108 that are bent inwardly toward each other.

Figure 6:
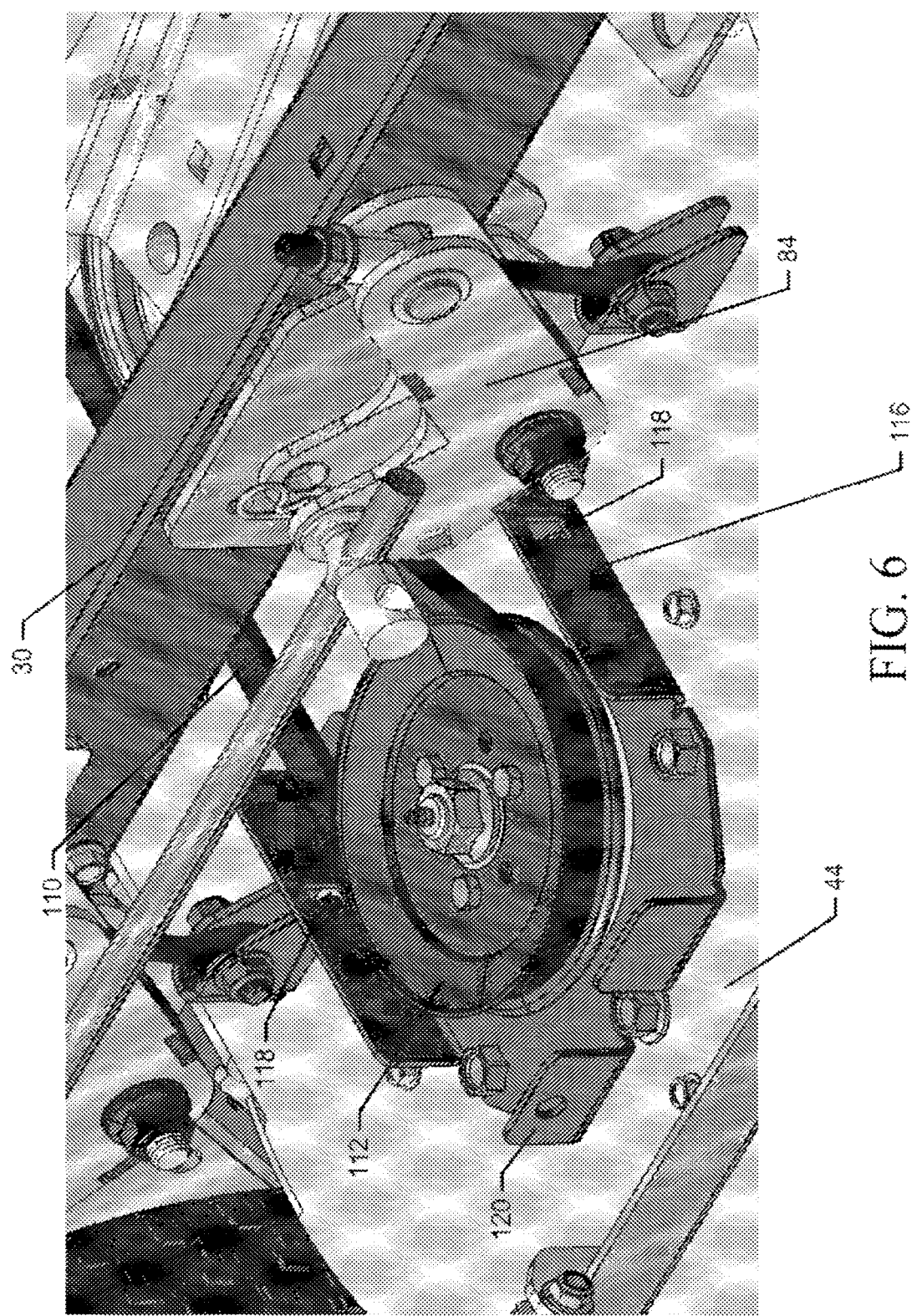
FIG. 6 illustrates a perspective view of portions of the riding lawn care vehicle with mandrel covers removed according to an example embodiment.

FIG. 6 illustrates the belt 110 and pulley 112 that drive the cutting blade inside the cutting deck 44. Moreover, an inner frame is provided with inner walls 116 that extend upward and away from the top surface of the cutting deck 44 and also extend parallel to each other and substantially perpendicular to the direction of extension of the frame 30. The inner walls 116 each include an orifice 118 provided therein to correspond to the tabs 108 of the mandrel covers 100. In this regard, the mandrel covers 100 may be placed on the top surface of the cutting deck 44 so that the sidewalls 104 correspond to the inner walls 116. The mandrel covers 100 may then be slid inwardly until the tabs 108 are seated in the orifices 118. An outer wall 120 may also be provided to limit the travel of the mandrel cover 100 toward the frame 30. For example, the outer wall 106 of the mandrel cover 100 may be adjacent to or in contact with the outer wall 120 of the inner frame when the tabs 108 are seated in the orifices 118. The tabs 108 may essentially snap into and out of the orifices 118 such that the mandrel covers 100 can be alternately secured to the cutting deck 44 or released from the cutting deck 44 without tools.

The operator station 52 may be constructed of a U or C shaped assembly that may extend vertically in a direction substantially perpendicular to the plane of the frame 30 (and/or the support platform 20). The operator station 52 may be made of sheet metal, plastic, composite material or any other suitable rigid material that may form a platform at which various controls and other components accessible to the operator may be provided conveniently while the operator stands on the support platform 20 facing forward. In particular, for example, the operator station 52 may be positioned at a height that provides the control levers 50 at a convenient height and location at which the control levers 50 may be operated. The height of the operator station 52 relative to the support platform 20 and/or frame 30 may be determined based on an average expected operator's height. In this regard, for example, the operator station 52 may be positioned such that a height thereof may facilitate manual operation of the control levers 50 by a user of average height at a level that lies between chest and waist level for the operator as such a height is likely to provide most users with a comfortable operating experience. In other embodiments, the support platform 20 and/or the operator station 52 may be adjustable vertically so that the operator can, within a predefined range, adjust the distance between the controls levers 50 and the support platform 20 to fit the operator better.

In some embodiments, the operator station 52 tilts forward so that it extends further, for example, over the engine. This may be more comfortable for the operator since the operator station 52 may permit the operator to lean forward against a padding (e.g., pad 198 shown in FIG. 14) provided at a rear portion of the operator station 52. This forward leaning configuration may also allow for better weight distribution, balance, and/or operator stability and may result in more of the operator's mass being located proximate the zero-turn axis. In some embodiments the operator station 52 may be configured to have an adjustable tilt so that the operator can adjust the forward tilt, if any, of the operator station 52 within a predefined range of acceptable tilt angles.

As mentioned above, the control levers 50 may have a neutral position. When displaced from the neutral position in either direction, the hydraulic pumps 46 may be caused (via the pump control linkages 62 and pump control assembly 64) to change their direction and/or speed of operation and drive the rear wheels 34 accordingly. The location of the control levers 50 at the neutral position may therefore define the amount of movement in the forward and rearward directions that are possible for the control levers 50 since a top panel 130 of the operator station 52 may include slots 132 (see FIG. 10) inside which the movement of the control levers 50 may be limited. Thus, for example, if the neutral position is such that the control levers 50 are directly in the center of the slots 132 relative to the longitudinal length of the slots 132, then equal motion (and speed) is possible in both forward and reverse directions. However, if the neutral position is offset from center rearwardly, then greater deflection of the control levers 50 (and therefore also greater speed) is possible in the forward direction than in the rearward direction. The neutral position can be adjusted using the neutral position adjustment assembly 140 of FIG. 7.

Figure 7:
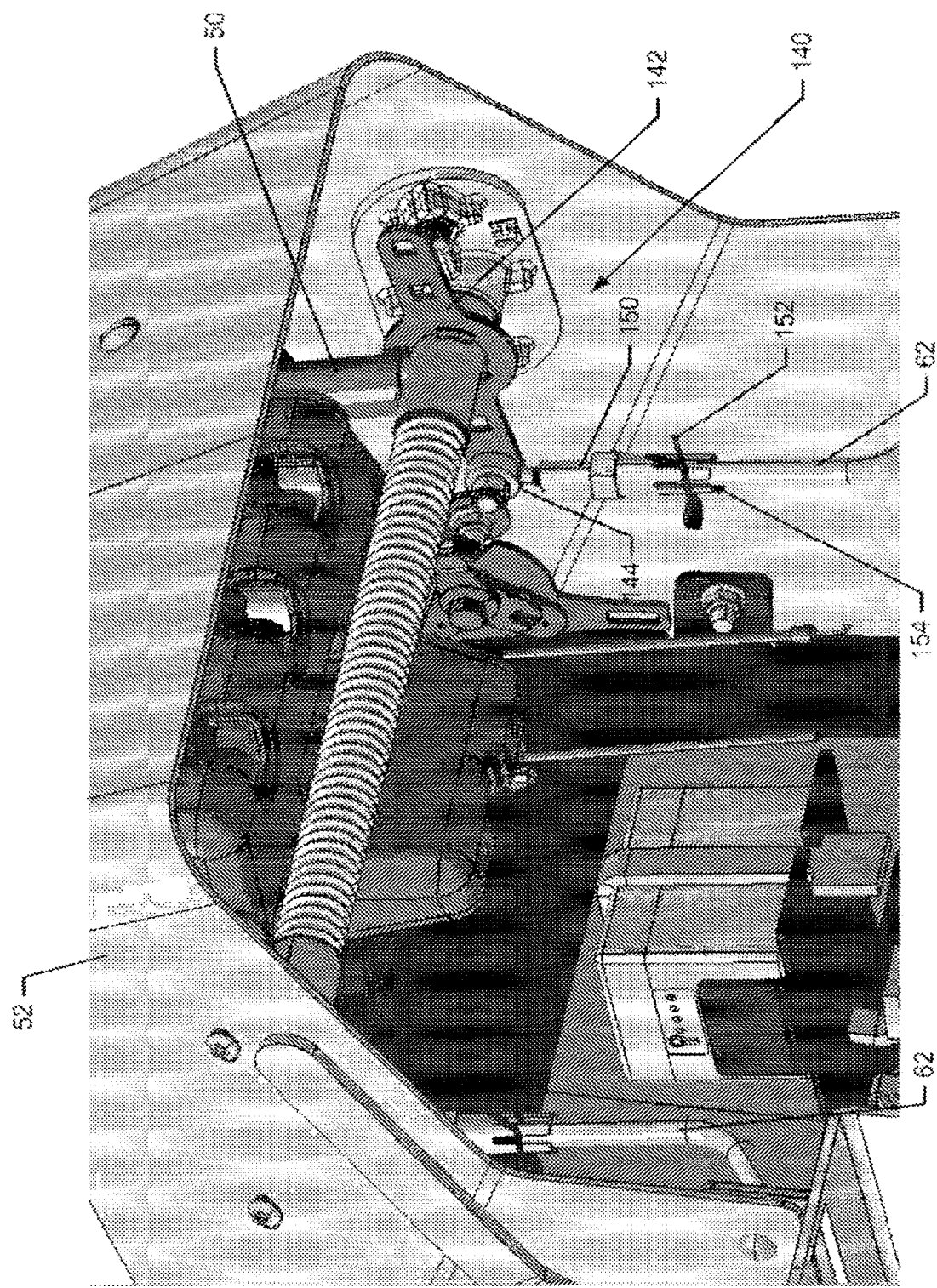
FIG. 7 illustrates a perspective view underneath an operator station of the riding lawn care vehicle to show a neutral position adjustment assembly for control levers of the riding lawn care vehicle according to an example embodiment.
Figure 8:
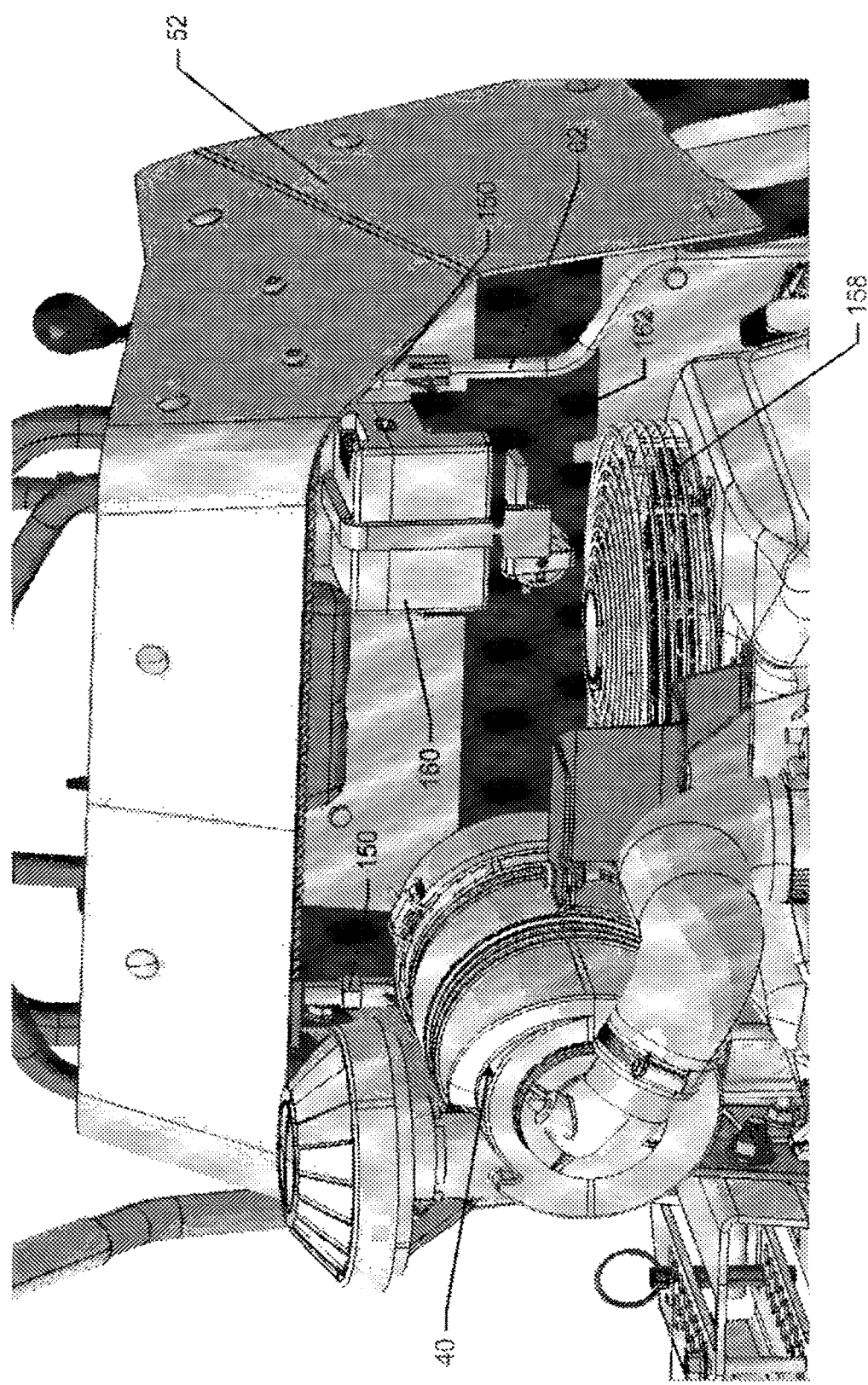
FIG. 8 illustrates positioning of a battery relative to the engine of the riding lawn care vehicle according to an example embodiment.
Figure 10:
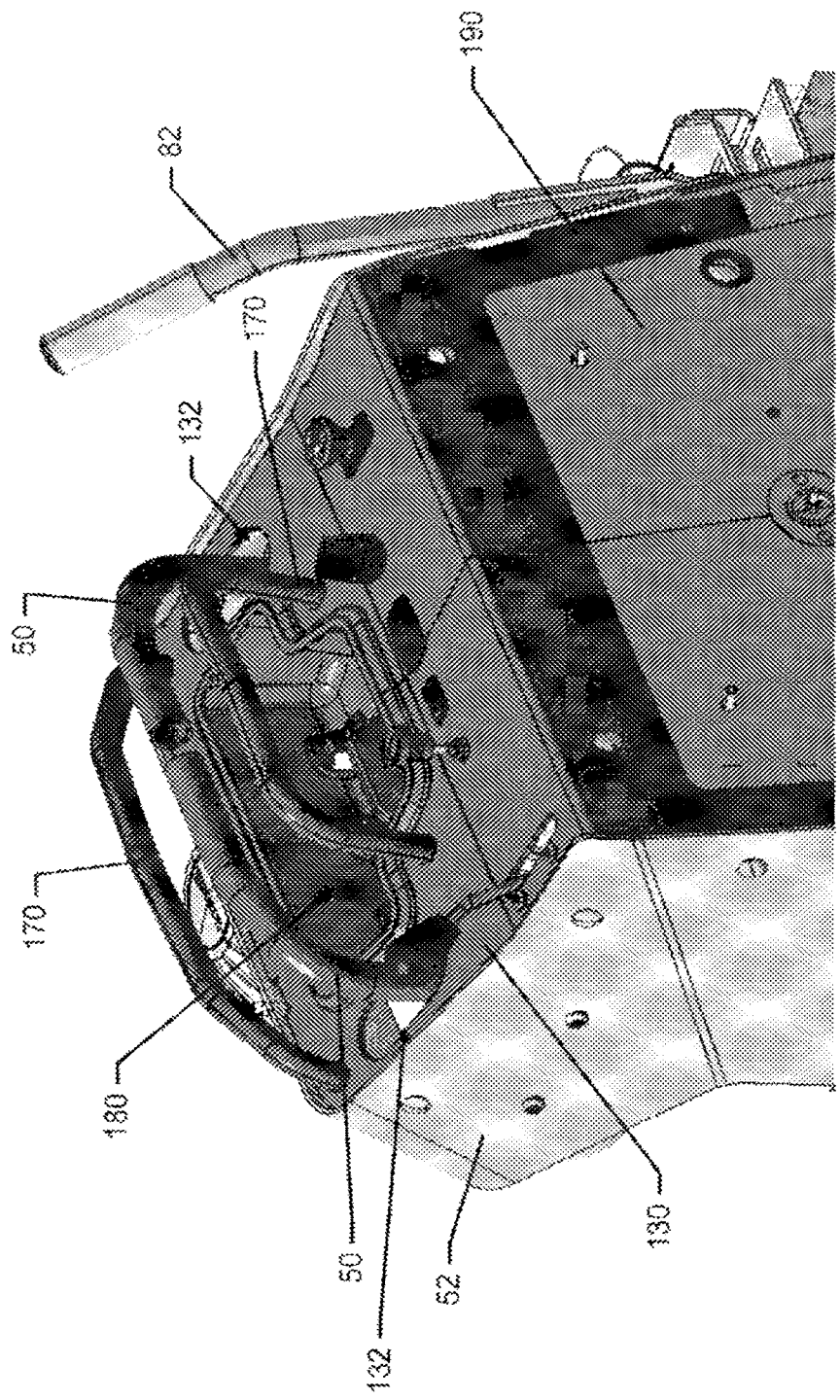
FIG. 10 illustrates a perspective view of the operator station of the riding lawn care vehicle of FIG. 1 according to an example embodiment.
Figure 11:
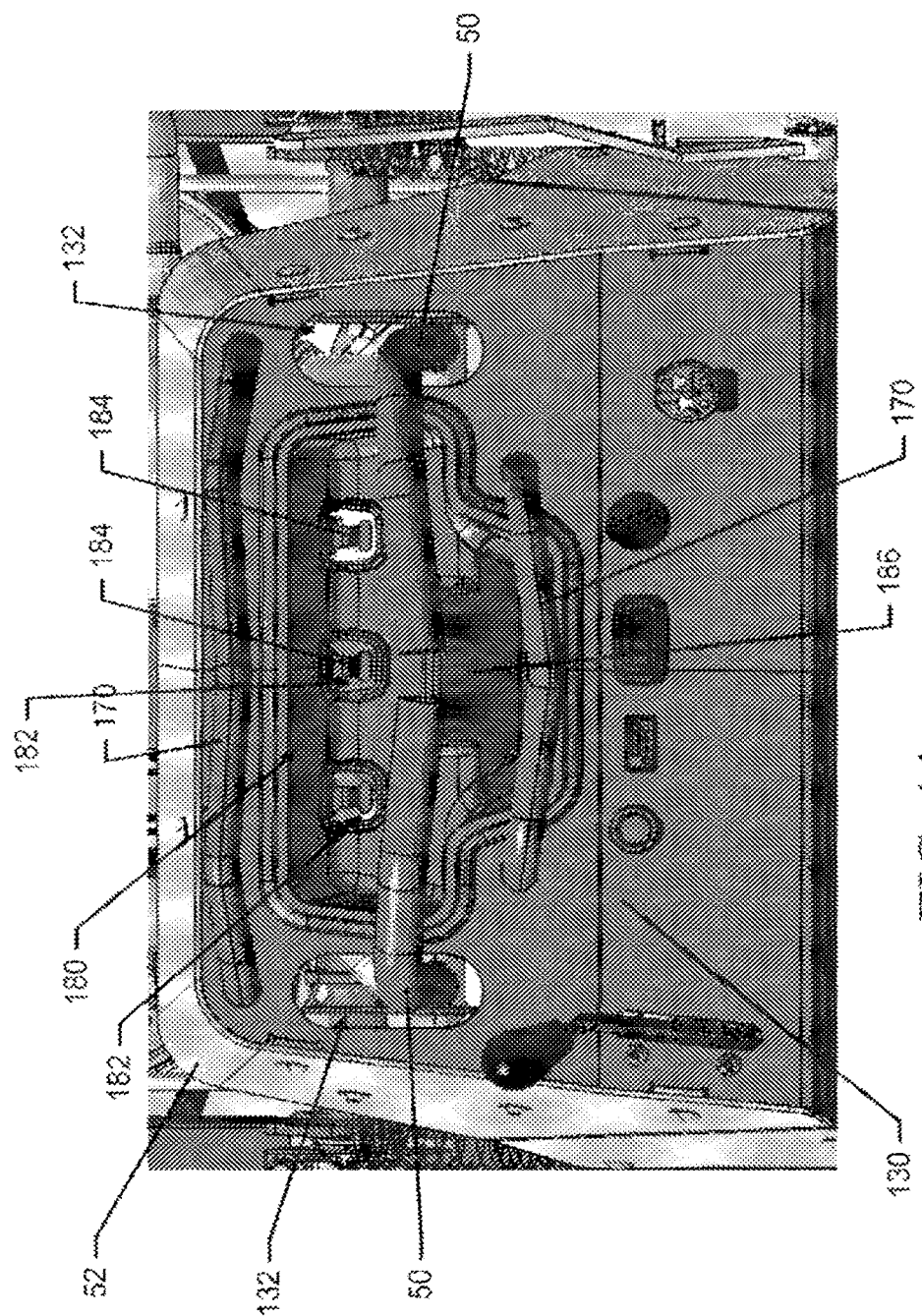
FIG. 11 illustrates a top view of the operator station according to an example embodiment.

Referring mainly to FIGS. 7 and 10, the neutral position adjustment assembly 140 may be used to adjust the neutral position of the control levers 50. In this regard, FIG. 7 illustrates one half of the neutral position adjustment assembly 140 (e.g., the left half) and it should be appreciated that the other half or side is a mirror image of the half shown. The neutral position adjustment assembly 140 includes a cross member 142 to which the control lever 50 is attached. The neutral position adjustment assembly 140 may further include a threaded eye 144 that is operably coupled (e.g., screwed) to one end of the cross member 142. In this regard, for example, the eye portion of the threaded eye 144 may be screwed to the cross member 142 at one end of the cross member 142. The eye portion may be pivotal relative to the cross member 142. Meanwhile, the threaded portion of the threaded eye 144 may extend downward to engage with a vertically extending portion of the pump control linkage 62 via an adjustment screw assembly 150.

The cross member 142 is operably coupled to the operator station 52 such that it is pivotally mounted thereon. When the control lever 50 is centered in a corresponding one of the slots 132, the cross member 142 may be substantially level or parallel to the ground. However, when the neutral position is adjusted away from the center of the slot 132, the cross member 142 may be slightly non-parallel to the ground. The adjustment screw assembly 150 can be threaded onto the threaded portion of the threaded eye 144 to move the threaded eye 144 higher (by loosening) or lower (by tightening) the adjustment screw assembly 150 onto the threaded eye 144. An elevation of the vertical extending portion of the pump control linkage 62 may be substantially constant at the neutral position. Thus, by tightening the adjustment screw assembly 150 onto the threaded eye 144 in the example shown, the cross member 142 is pivoted counterclockwise and the control lever 50 is drawn rearward in the slot 132 adjusting the neutral position accordingly. Meanwhile, by loosening the adjustment screw assembly 150 to move the threaded eye 144 farther from the adjustment screw assembly 150, the cross member 142 is pivoted clockwise and the control lever 50 is moved forward in the slot 132 adjusting the neutral position accordingly. In some embodiments, the cross member 142 may be split into two independently operable pieces. In some cases, the two pieces may not necessarily need to be, concentric, coaxial or aligned.

In an example embodiment, the top portion of the vertically extending portion of the pump control linkage 62 may have an orifice passing therethrough in a direction substantially perpendicular to the direction of extension of the vertically extending portion of the pump control linkage 62. A cotter pin 152 or other such pin may be passed through the orifice and through a pair of vertically extending slots 154 in the adjustment screw assembly 150 to prevent further rotation of the adjustment screw assembly 150 when the desired neutral position has been set. As can be appreciated from this example, the length of the vertically extending slots 154 may substantially define the amount or range of motion that is possible for the adjustment screw assembly 150 relative to the threaded eye 144.

In some cases, the operator station 52 may extend vertically to at least partially cover portions of the engine 40. However, in other cases, the operator station 52 may be disposed to extend vertically from the frame 30 at a position that is between the engine 40 and the support platform 20. When the operator station 52 at least partially covers the engine 40 (as shown for example in FIGS. 1, 2, 7 and 8), the sidewalls, rear wall and top of the operator station 52 may define an airflow channel into an intake 158 of the engine 40. Moreover, a battery 160 (e.g., a lithium ion, lead acid or other type of battery) of the riding lawn care vehicle 10 may be provided to extend from the rear wall of the operator station 52 to be proximate to the intake 158 of the engine 40 so that the battery 160 may be cooled by the airflow in the airflow channel that is formed. In this example, the battery 160 is supported by a cantilevered mount 162 that extends from the rear wall. However, other mounting strategies could alternatively be employed. The provision of the battery 160 in this location also provides short and convenient connections to electric components of the riding lawn care vehicle 10 that are operated or otherwise housed at the operator station 52.

As shown in FIGS. 9-15, the operator station 52 may include one or more handles 170. These handles 170 may be fixed relative to the frame 30 so that the operator can grasp or lean on the handles 170 to maintain balance when standing on the support platform 20 during operation of the riding lawn care vehicle 10. If multiple handles are used (as shown in FIGS. 9-15), the control levers 50 may be configured to move in a range defined between the handles 170 (e.g., by the slots 132). The operator station 52 may further include other levers, buttons, operating members, and/or displays located in an instrument panel disposed at the top panel 130 of the operator station 52 either forward or rearward of the control levers 50.

By extending the operator station 52 substantially over at least a portion of the engine 40, the operator may be at least partially shielded from some of the noise generated by the engine 40. Furthermore, a heat shield may be provided between the engine 40 and the operator (i.e., rearward of the engine 40) so as to protect the operator from the heat and moving components of the engine 40. The operator side of the heat shield may be cushioned so that the operator can lean against the heat shield during operation of the riding lawn care vehicle 10.

In some embodiments, the handles 170 may include a larger handle (in terms of width) positioned forward and higher on the top panel (in front of the control levers 50) and a smaller handle (in terms of width) behind the control levers 50 (e.g., closer to the operator). In an example embodiment, a storage container 180 may be provided between the handles 170. The control levers 50 may therefore extend over the storage container 180. The storage container 180 may extend downward (e.g., toward the engine 40) from the top panel 130, and may allow the operator to place objects therein during operation of the riding lawn care vehicle 10.

In an example embodiment, the storage container 180 may include drain holes 182 provided in the bottom thereof. Accordingly, any fluid or debris that would otherwise accumulate in the storage container 180 can exit via the drain holes 182. The drain holes 182 of some example embodiments may also serve as convenient places to provide anchor members 184 that may protrude into or above the drain holes 182. The anchor members 184 may extend or protrude toward the operator, away from the operator, or to one side or the other within or above the drain holes 182. As such, the anchor members 184 may provide a convenient structure to which a retention element such as, for example, a net, elastic band, or other such materials may be removably attached to hold a mobile phone or other item securely in the storage container 180 during operation of the riding lawn care vehicle 10. As can be appreciated from FIG. 11, the storage container 180 may have a wider portion and a narrower portion, and the narrower portion may further include a divider wall 186 against which objects may be propped or secured using the anchor members 184 and any net, elastic band or other securing device employed with the anchor members 184. The divider wall 186 may be positioned to define a full dividing wall or partial wall between the narrower portion and the wider portion of the storage container 180. The divider wall 186 of some embodiments could divide segments of any shape or orientation and at the same or different elevations.

Figure 12:
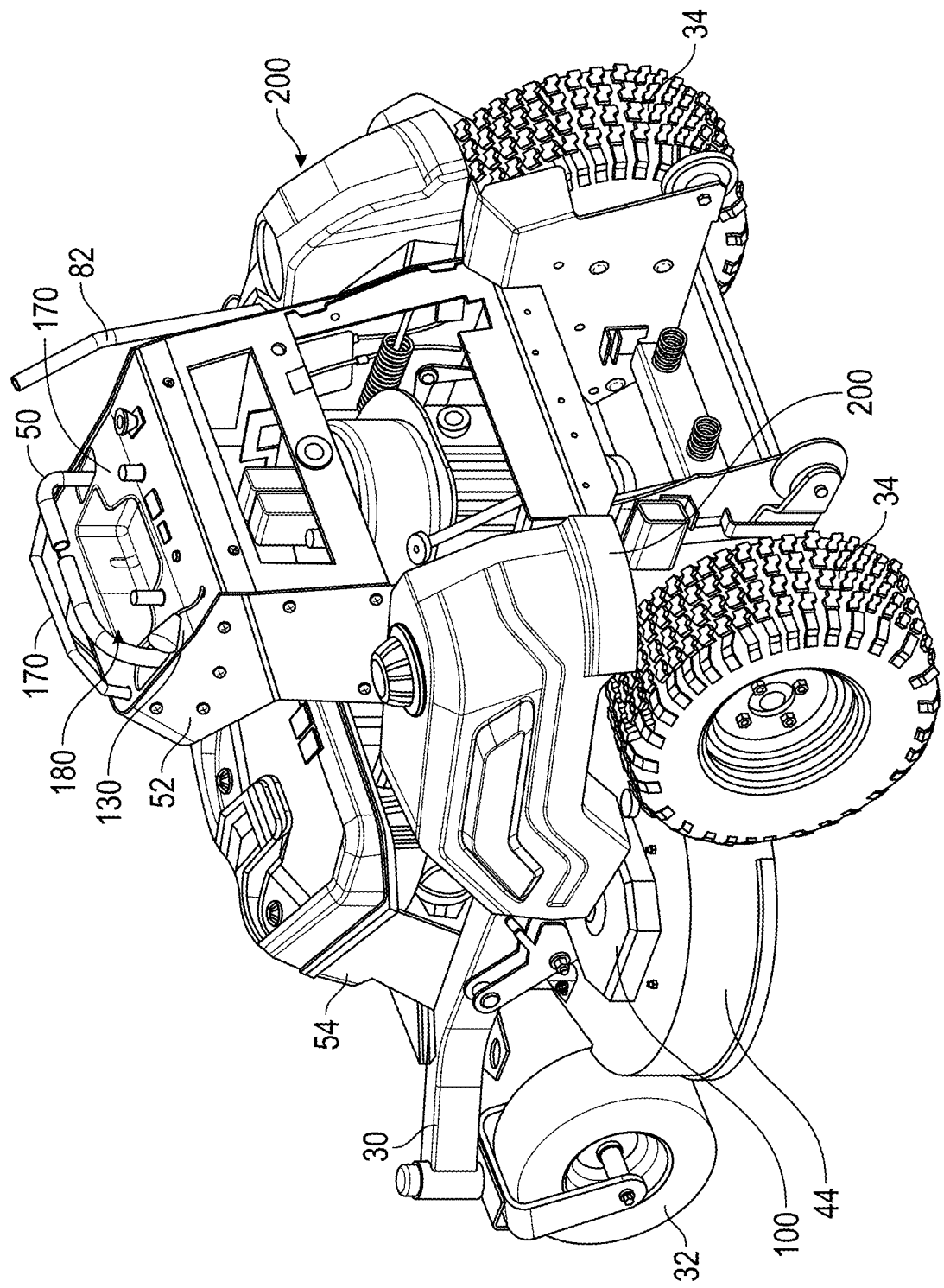
FIG. 12 illustrates a rear perspective view of the riding lawn care vehicle with various panels of the operator station and proximate to the support platform removed according to an example embodiment.
Figure 13:
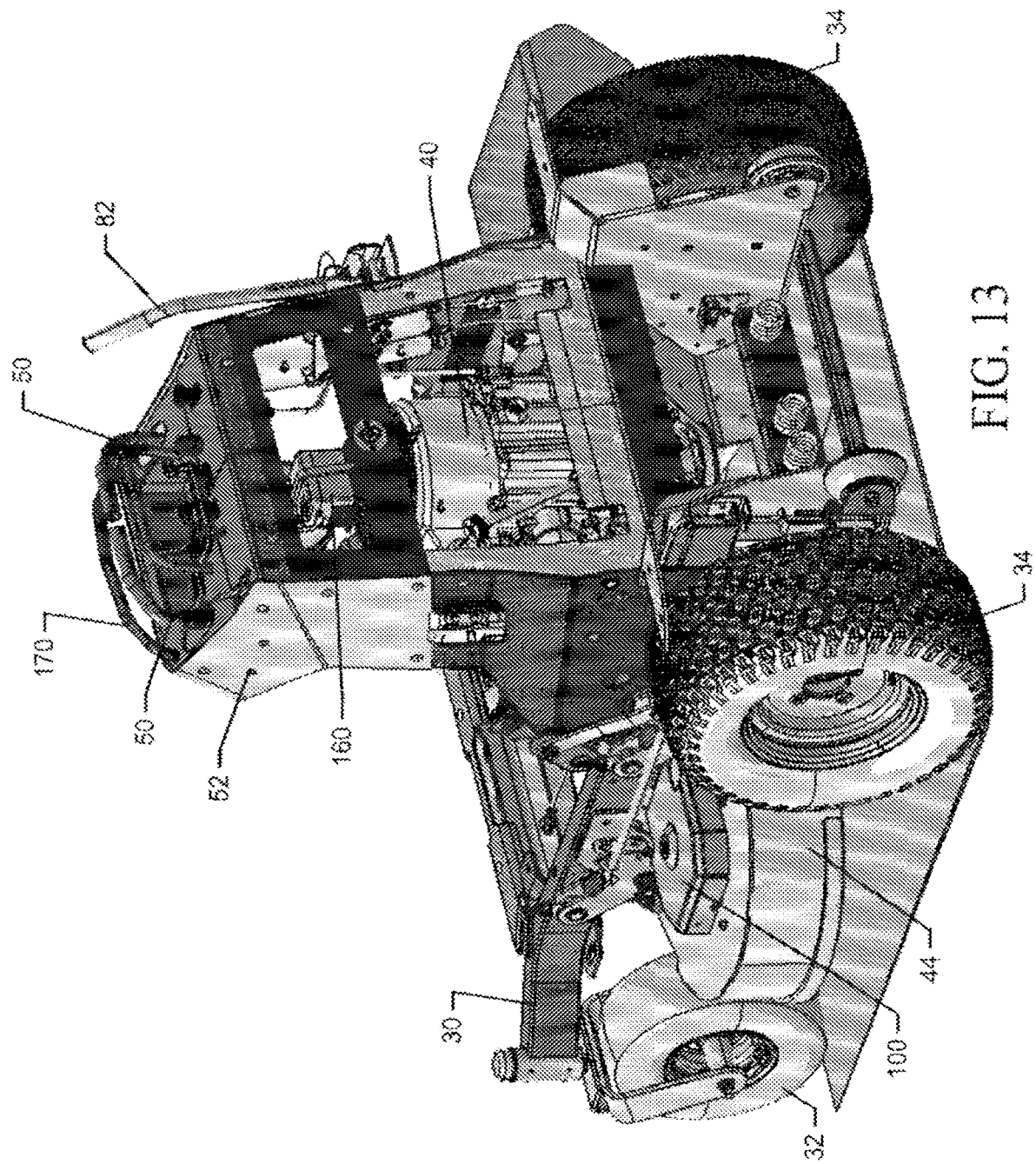
FIG. 13 illustrates a rear perspective view of the riding lawn care vehicle of FIG. 12 with various additional panels and components removed according to an example embodiment.

In some embodiments, one or more access panels may be provided at the back of the operator station 52 (and/or below the operator station 52) to permit access to components of the engine 40, the battery 160, or belts, pulleys, etc. associated with operation of the riding lawn care vehicle 10. Examples of such access panels are visible in FIG. 9. In this regard, upper access panel 190, middle access panel 192, and lower access panel 192 may be removed (as shown in FIGS. 12 and 13) to allow access to portions of the riding lawn care vehicle 10 for maintenance, inspection or servicing. In particular, the upper access panel 190 may be removed to provide access to the battery 160, while the middle access panel 192 is removable to grant access to the engine 40, and the lower access panel 194 is removable to grant access to various belts and pulleys.

In an example embodiment, the operator station 52 may be supported between opposing members of the frame 30 that extend to support the rear wheels 34. As such, for example, the operator station 52 may be positioned such that, relative to a longitudinal length of the riding lawn care vehicle 10 extending from a forward portion to an aft portion thereof, the support platform 20 lies substantially between the axis of rotation of the front wheels 32 and the axis of rotation of the rear wheels 34, as shown in FIG. 1. Furthermore, the operator station 52 may be located completely rearward of the hydraulic pumps 46, and any portion thereof, as also shown in FIGS. 1-3. In some embodiments, the operator station 52 lies substantially between the axis of rotation of the rear wheels 34 and an imaginary line parallel to and half way between the axis of rotation of the front wheels 32 and the axis of rotation of the rear wheels 34, as is also shown in FIG. 1.

Figure 14:
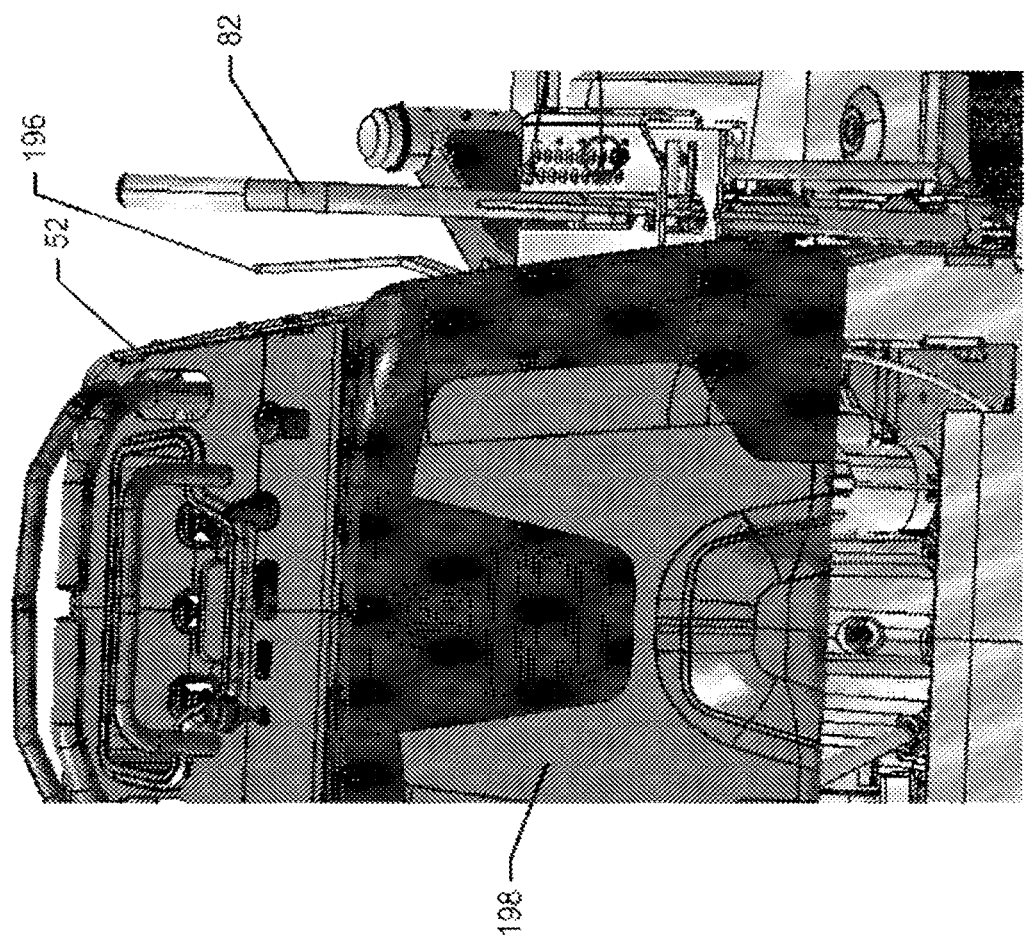
FIG. 14 illustrates a rear view of the operator station to illustrate positioning of a brake lever and a deck lift lever relative to the operator station according to an example embodiment.

In some cases, the operator station 52 may taper while extending upward, as shown in FIG. 14. The tapered shape of the operator station 52 may allow for convenient placement of a parking brake lever 196 to be positioned and operable between the operator station 52 and the deck lift lever 82. The provision of the parking brake lever 196 proximate to the deck lift lever 82 provides better ergonomics and ease of access to the corresponding functions associated with each respective lever.

Figure 15:
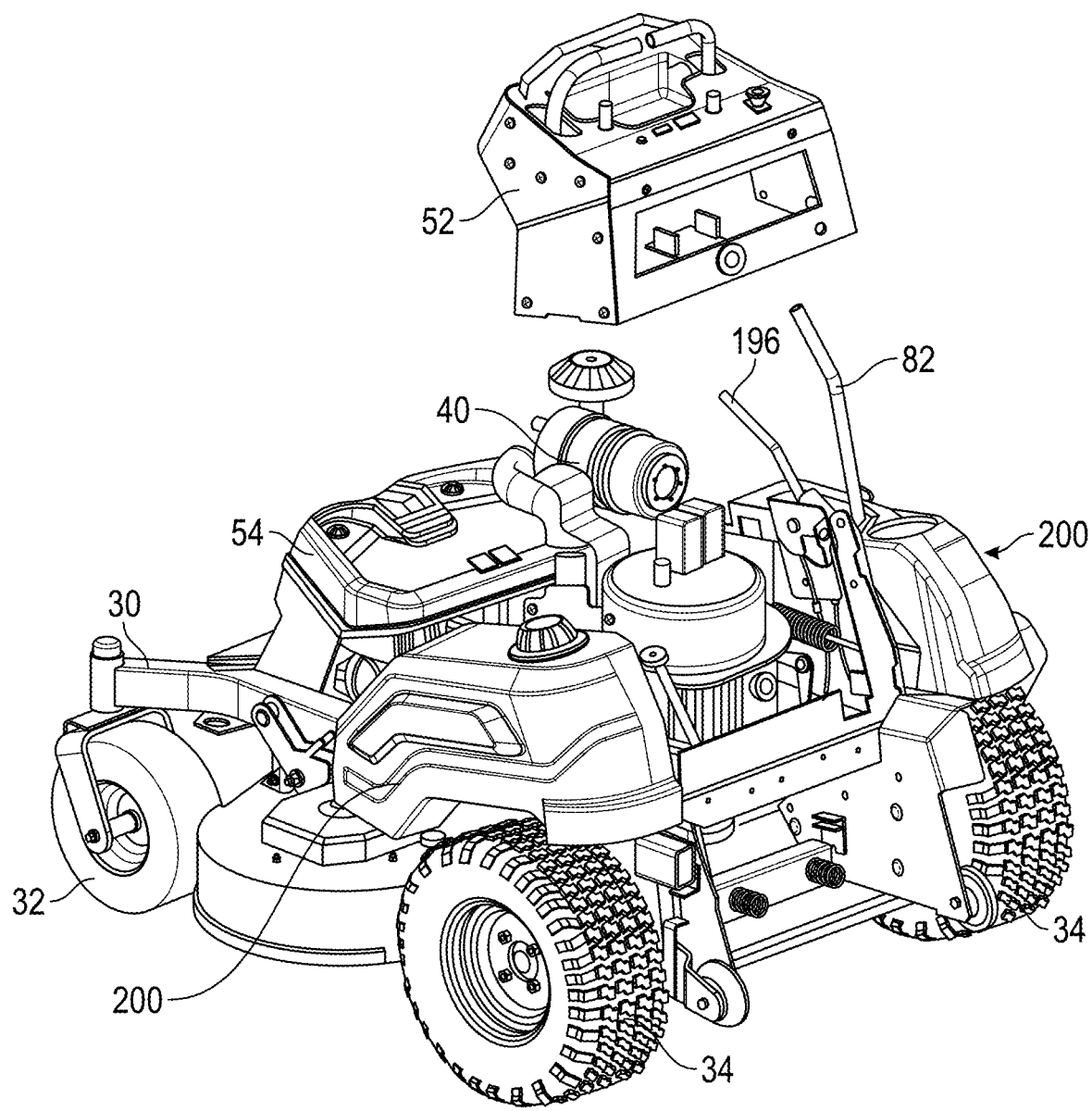
FIG. 15 illustrates a perspective view of the operator station removed from the riding lawn care vehicle according to an example embodiment.

FIG. 14 also shows the pad 198 (e.g., a thigh pad) that may be provided for the comfort of the operator, and which may cover over the upper access panel 190 and at least a portion of the middle access panel 192. The pad 198 may be removable from the operator station 52 (e.g., as shown in FIG. 9B) and/or pivotable relative to the operator station 52. In addition, the operator station 52 may be removable from the remainder of the riding lawn care vehicle 10, as shown in FIG. 15. In this regard, screws operably coupling the operator station 52 to other support structures of the riding lawn care vehicle 10 may be removed, and the threaded eye 144 and the adjustment screw assembly 150 may be disengaged to enable the entire operator station 52 to be lifted off the riding lawn care vehicle 10. Removal of the operator station 52 may allow complete access to the engine 40 for maintenance or even removal or swapping of the engine 40. In some cases, rather than being completely removed, the operator station 52 could be folded on a hinge joint to permit full access to the engine 40.

In some example embodiments, at least a portion of the support platform 20 may lie between the rear wheels 34. Moreover, in some embodiments, the rear wheels 34 may each have a fender assembly 200 or console provided above and partially forward thereof. The fender assemblies 200 may prevent debris from being kicked up toward the operator by the rear wheels 34. One or both of the fender assemblies 200 may include a container (e.g., a cup holder, storage or location for retaining items) or a gas tank 210 for the riding lawn care vehicle 10.

Figure 16:
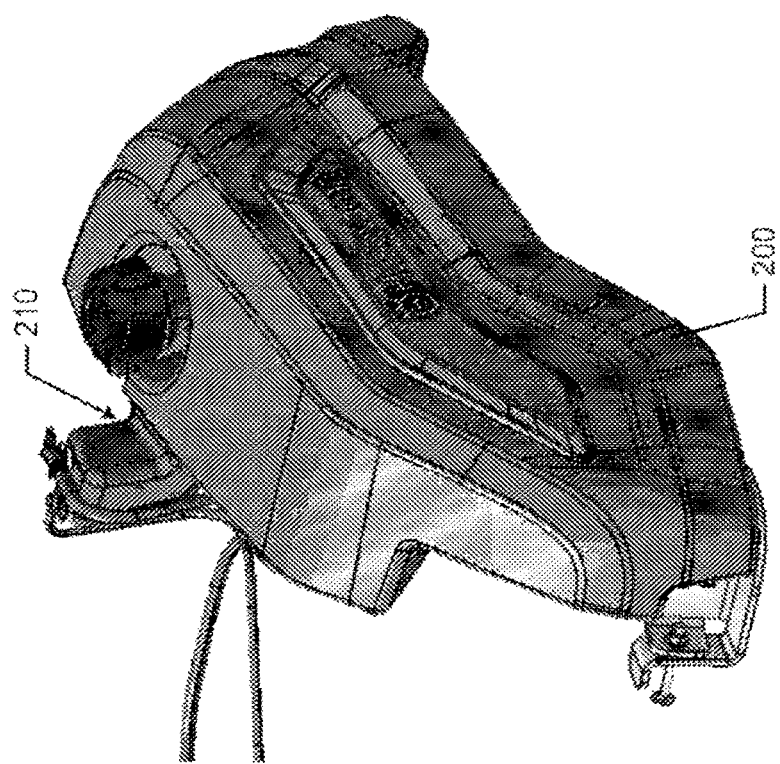
FIG. 16 illustrates a perspective view of a gas tank of the riding lawn care vehicle according to an example embodiment.
Figure 17:
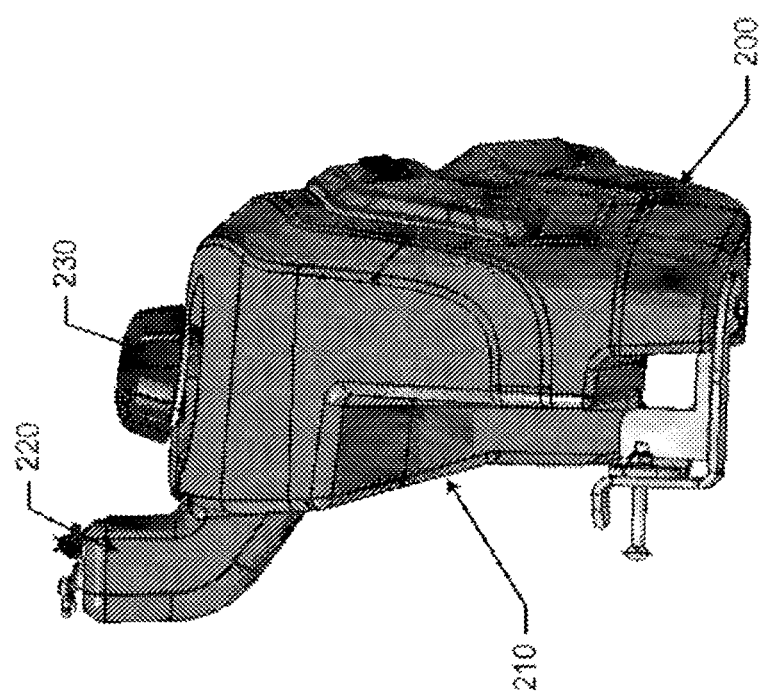
FIG. 17 illustrates a front view of the gas tank according to an example embodiment.
Figure 18:
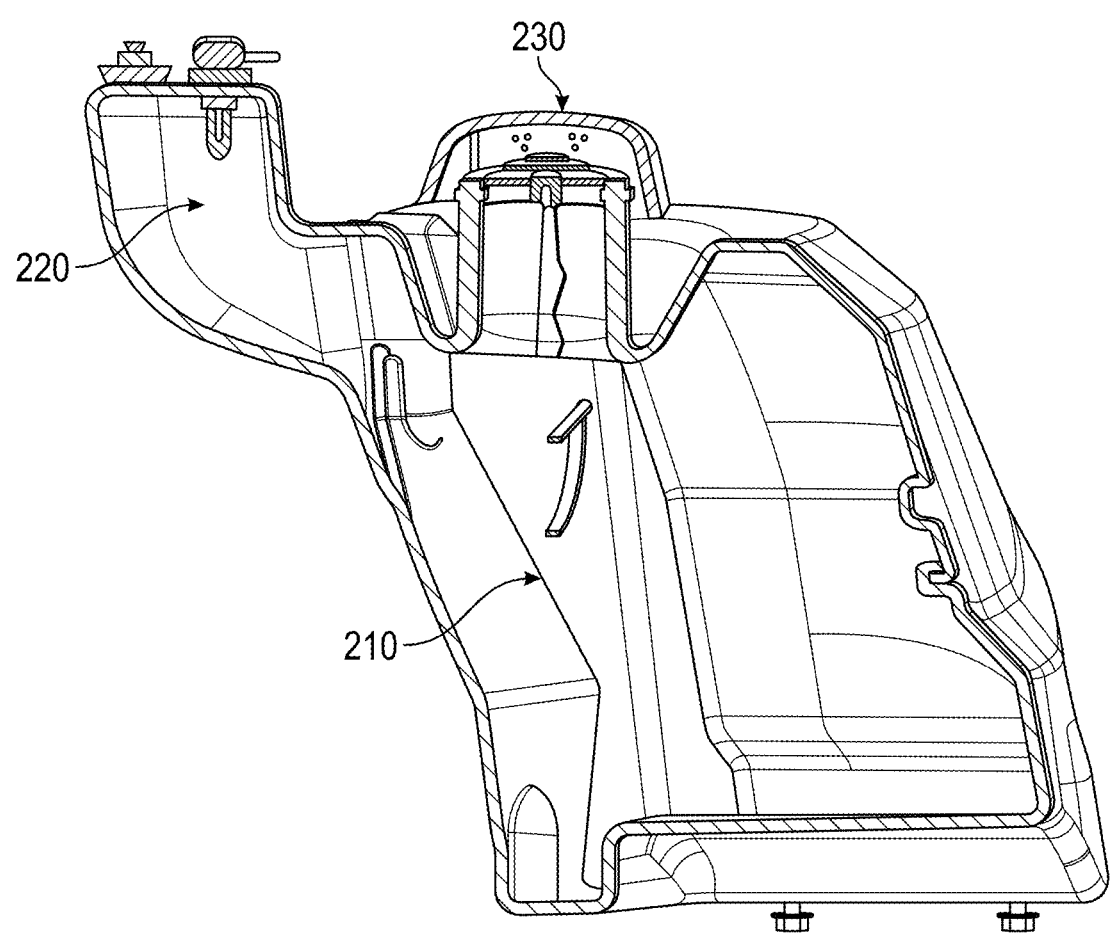
FIG. 18 illustrates a cross section view of the gas tank according to an example embodiment.

FIG. 16 illustrates a perspective view of the fender assembly 200 inside which the gas tank 210 is provided. FIG. 17 illustrates a front view of the gas tank 210 to illustrate a position of a vapor space 220 of the gas tank 210 relative to the remainder of the gas tank 210. FIG. 18 illustrates a gross section view of the gas tank 210 and the vapor space 220. As can be appreciated from FIGS. 16-18, the vapor space 220 is at a higher elevation than the remainder of the gas tank 210 (including the cap 230). Furthermore, the vapor space 220 is located inside the operator station 52, while the remaining portions of the gas tank 210 remain in the console or fender assembly 200, outside the operator station 52. The aesthetics of the console or fender assembly 200 can therefore be preserved, while the benefit of having the vapor space 220 at the higher elevation can still be provided, but not in a way that results in an unsightly or awkward appearance.

In some embodiments, the front wheels 32 may be caster wheels that can be situationally locked in a particular orientation, such as in a parallel alignment with the rear wheels 34. For example, the front wheels 32 may be locked in their orientation by operator action employing, for example, a hand or foot operated lever, button or other selection device mechanically or electrically coupled to the front wheels 32 or front wheel actuators. Lockable front wheels 32 may be advantageous when performing certain maneuvers, such as when the lawn care vehicle 10 is operating to drive on an incline in a transverse direction such that one of the front wheels 32 is at a higher elevation than the other of the front wheels 32.

In still other embodiments, the front wheels 32 may be caster-like in that they can, for example, turn approximately 180 or 360 degrees around a vertical axis, but are steerable instead of being able to freely turn about the vertical axis. In such an embodiment, electrical motors or hydraulic actuators may be coupled to the frame 30 at each front wheel 32 to steer the corresponding front wheel 32. In such an embodiment, the riding lawn car vehicle 10 may include a control system comprised of a computer for coordinating the steering of each front wheel 32 with the driving of each rear wheel 34 based at least in part on the inputs provided to the control levers 50 by the operator. In some such embodiments, the front wheels 32 may be independently steerable relative to each other.

In some cases, the assemblies or components described above may be modified, augmented or replaced with other structures or components. FIGS. 19-50 illustrate some alternative assembly and/or component structures that may be employed in some embodiments. In this regard, FIGS. 19-28 illustrate a riding lawn care vehicle 310 from various different perspectives. FIGS. 29-50 then further illustrate specific assemblies and/or components of the riding lawn care vehicle 310 to illustrate various modifications, augmentations or substitutions relative to the examples shown in FIGS. 1-18.

Figure 19:
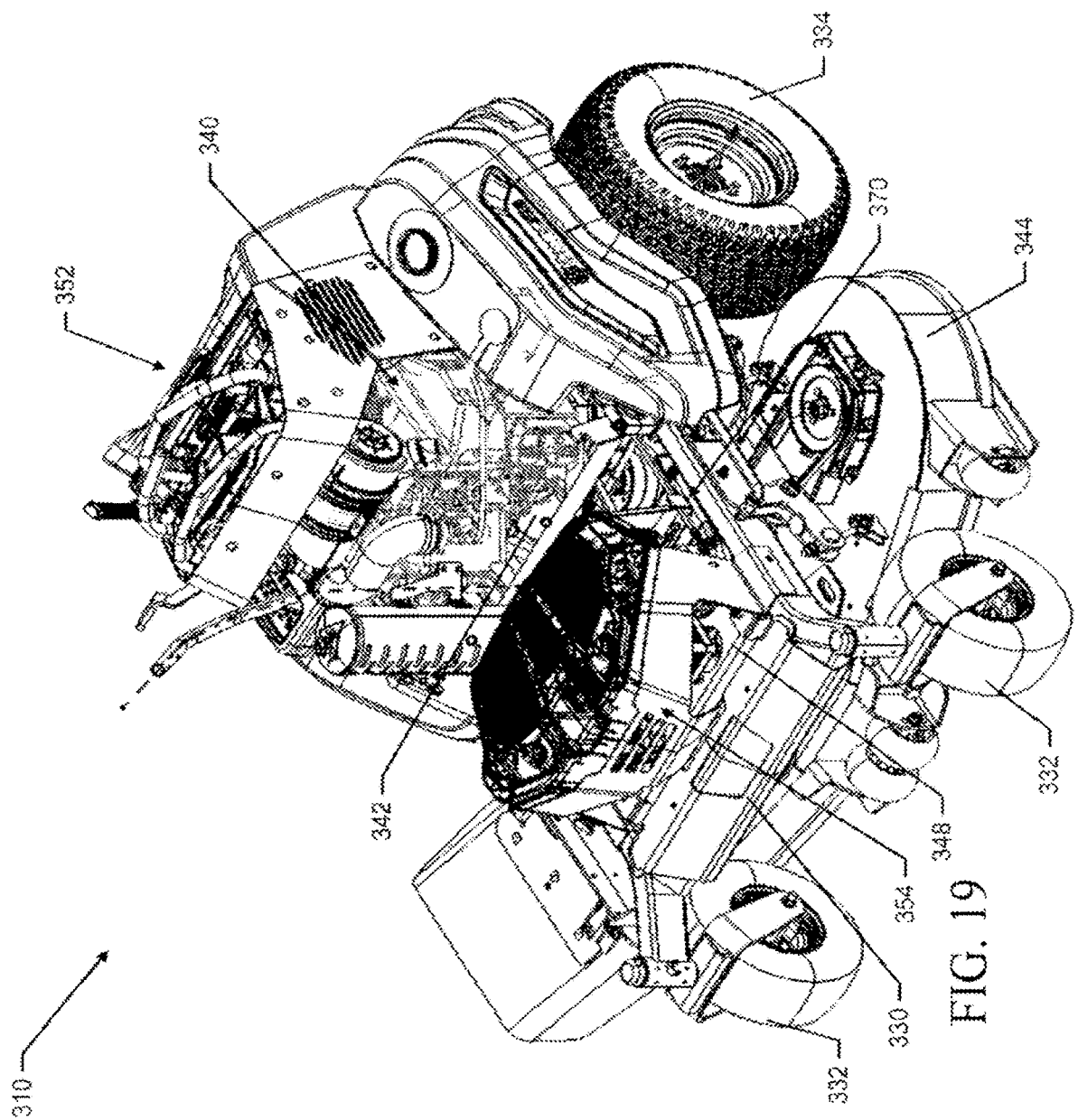
FIG. 19 illustrates a front-left perspective view of an alternative riding lawn care vehicle structure in accordance with an example embodiment.
Figure 20:
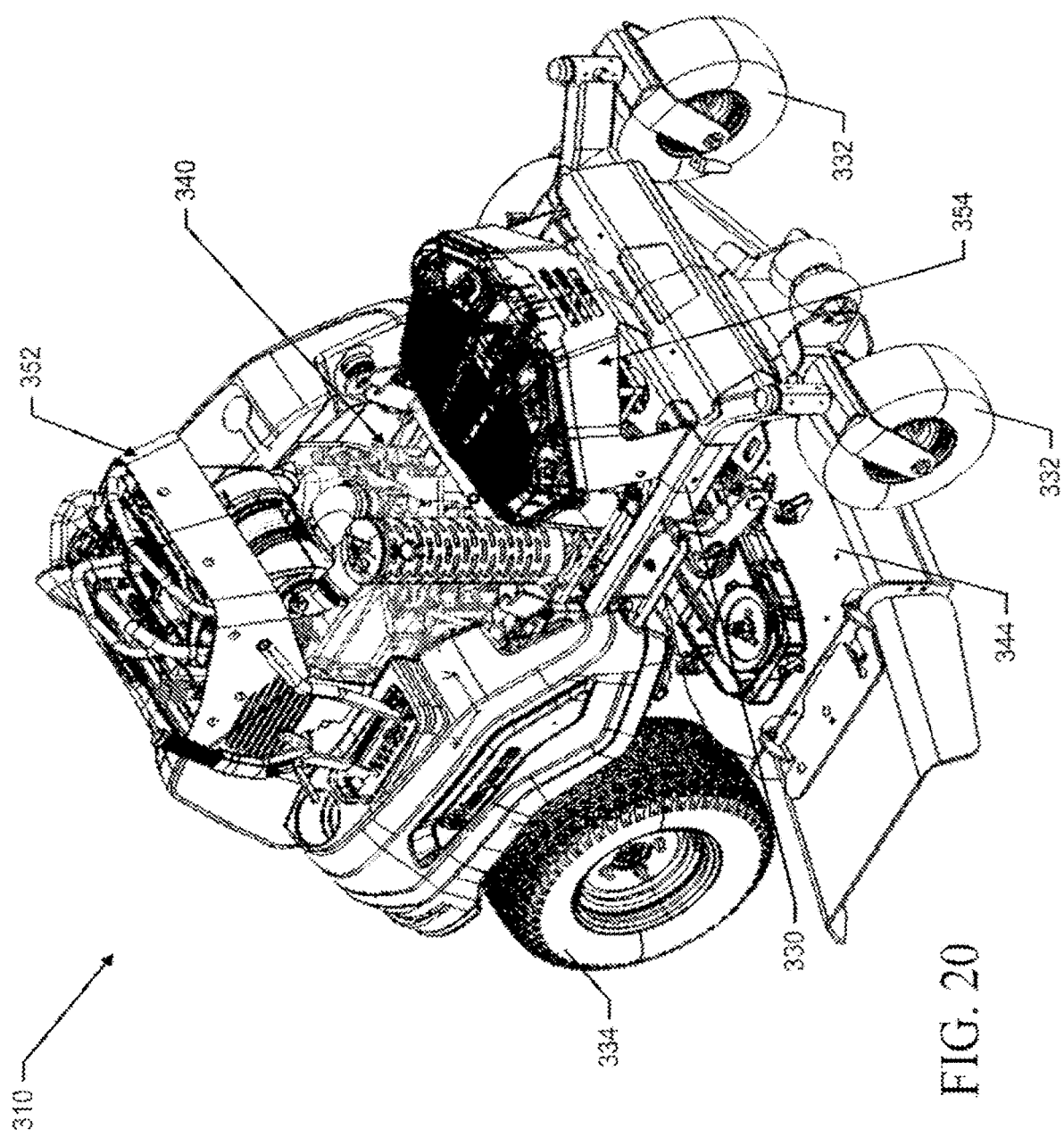
FIG. 20 illustrates a front-right perspective view of the riding lawn care vehicle of FIG. 19 in accordance with an example embodiment.
Figure 21:
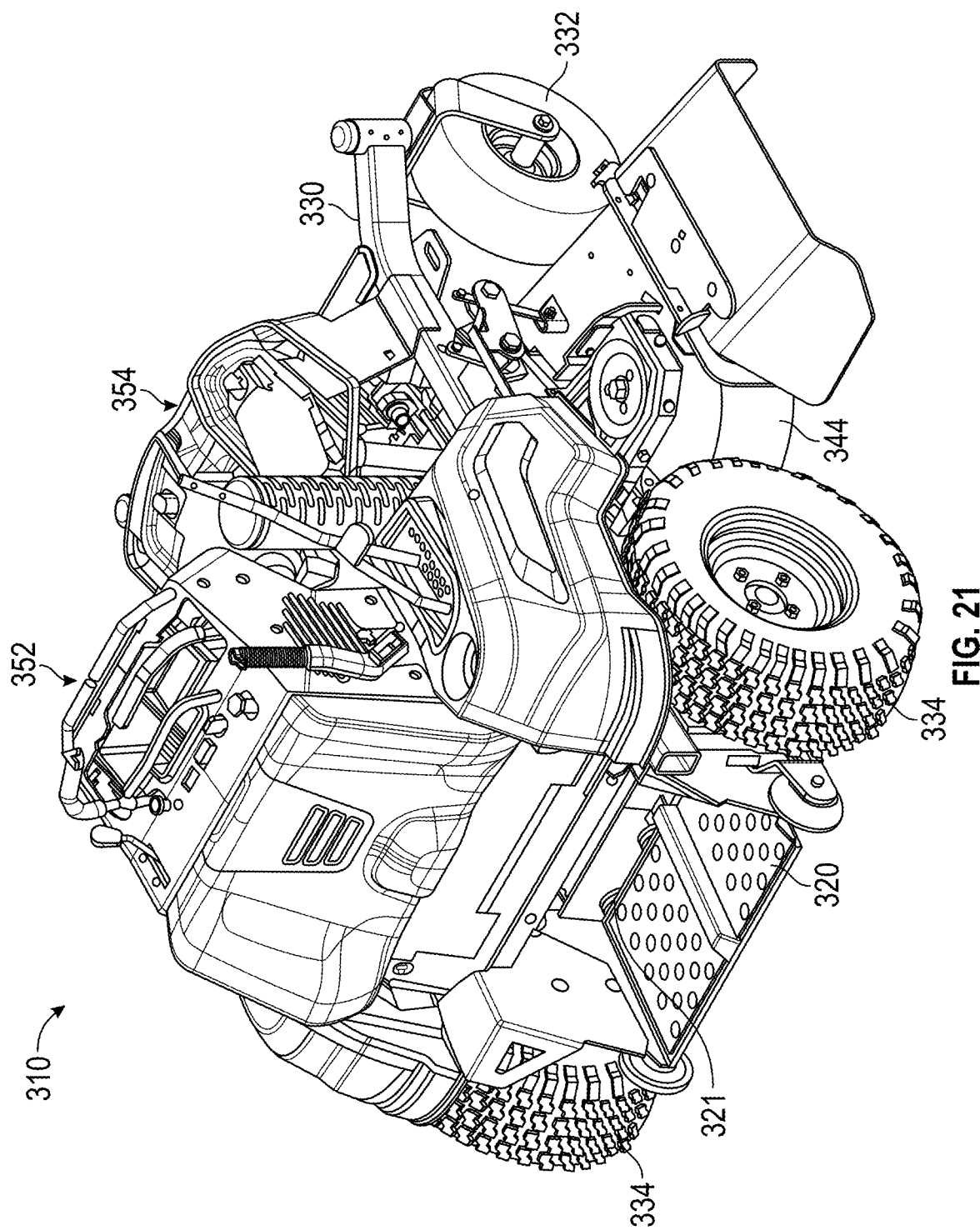
FIG. 21 illustrates a rear-right perspective view of the riding lawn care vehicle of FIG. 19 in accordance with an example embodiment.
Figure 22:
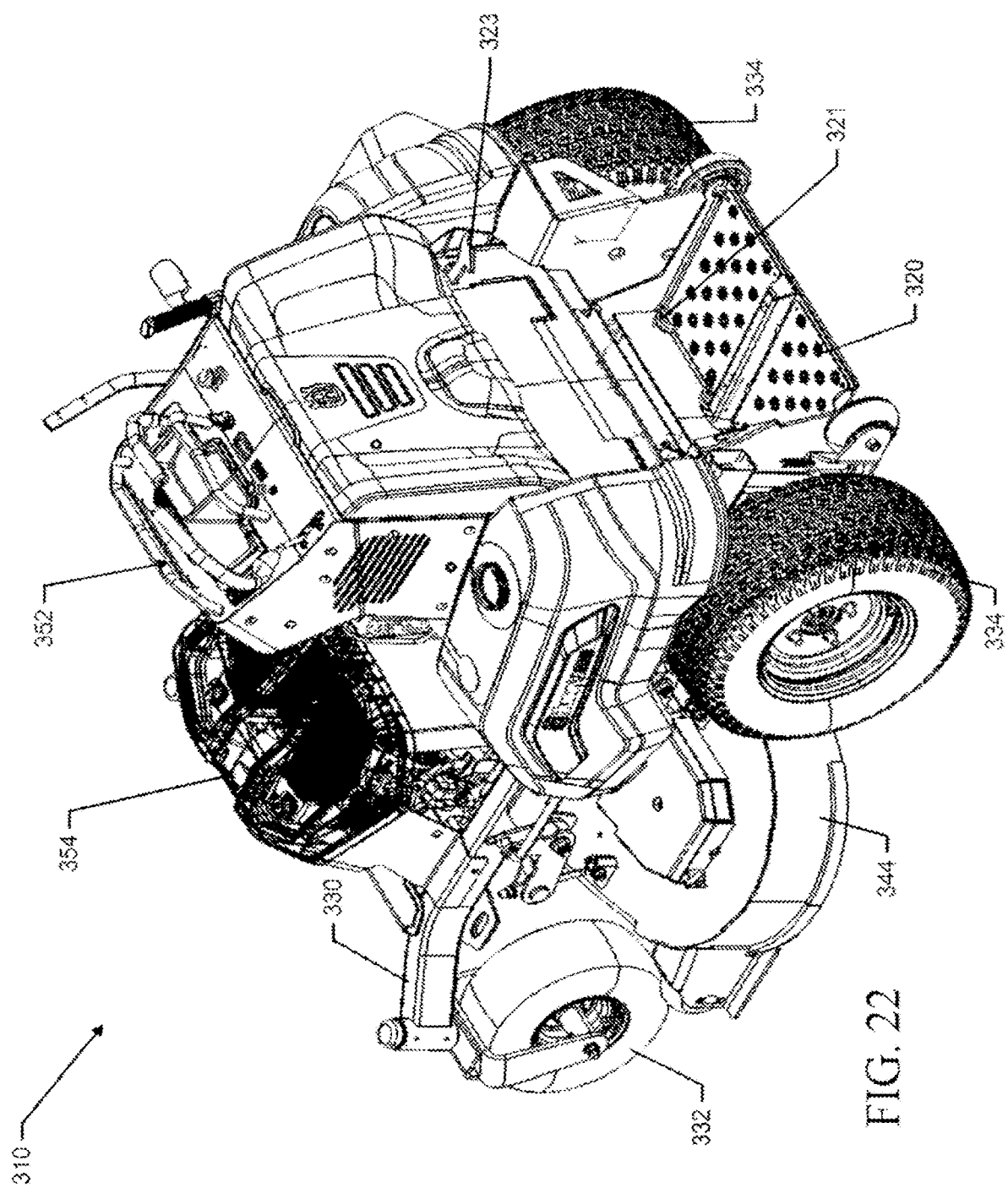
FIG. 22 illustrates a rear-left perspective view of the riding lawn care vehicle of FIG. 19 in accordance with an example embodiment.
Figure 23:
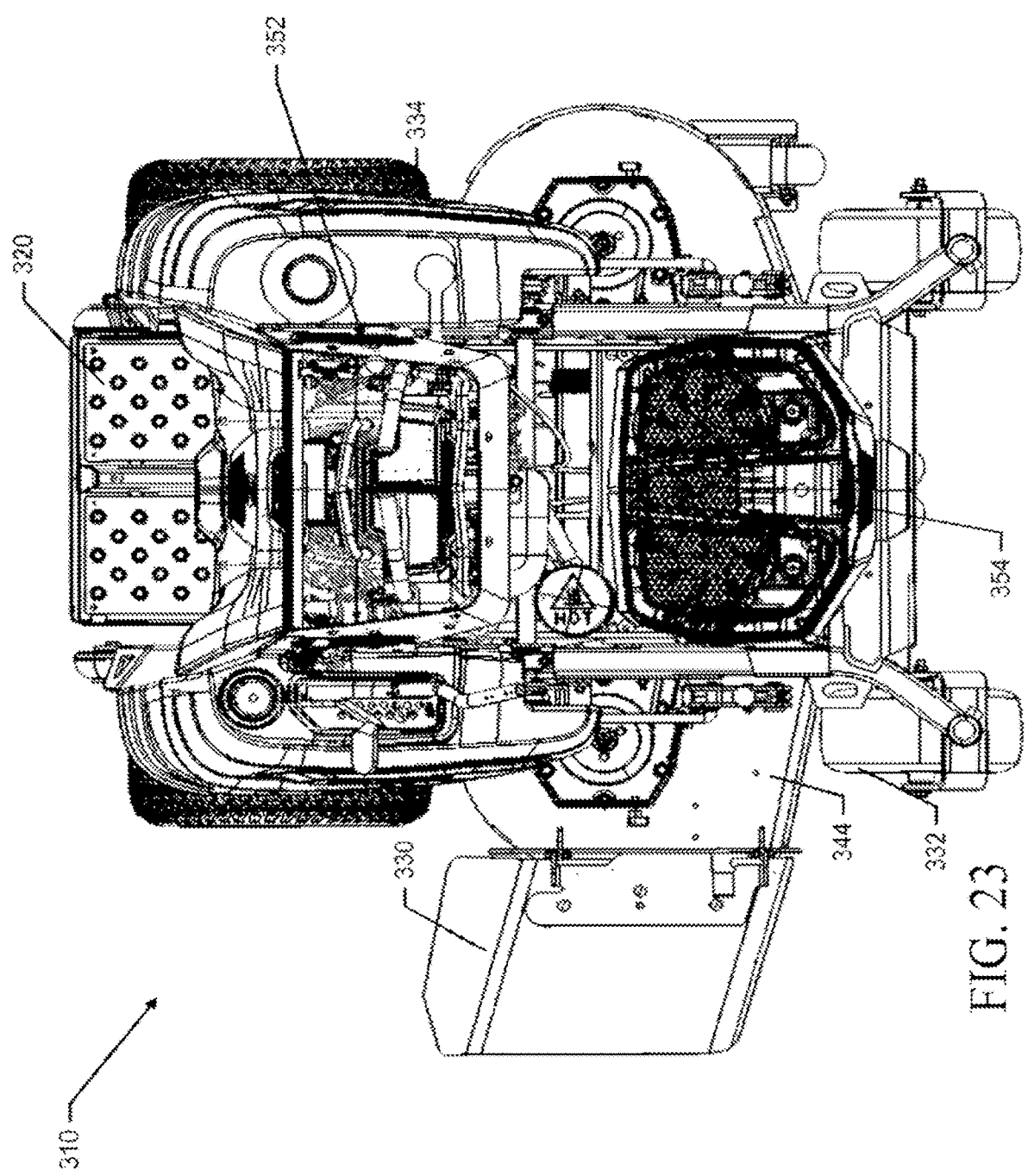
FIG. 23 illustrates a top view of the riding lawn care vehicle of FIG. 19 in accordance with an example embodiment.
Figure 24:
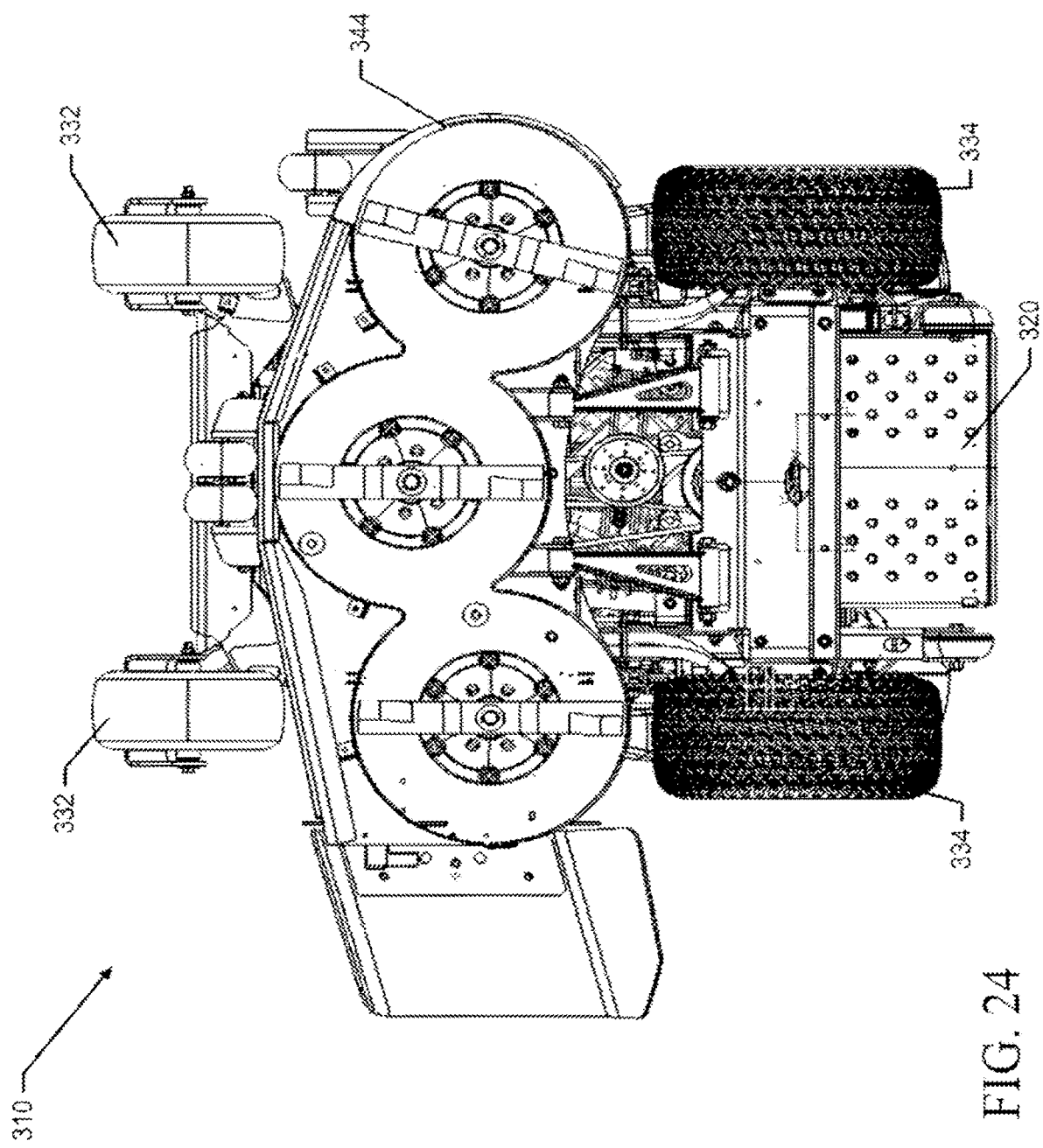
FIG. 24 illustrates a bottom perspective view of the riding lawn care vehicle of FIG. 19 in accordance with an example embodiment.
Figure 25:
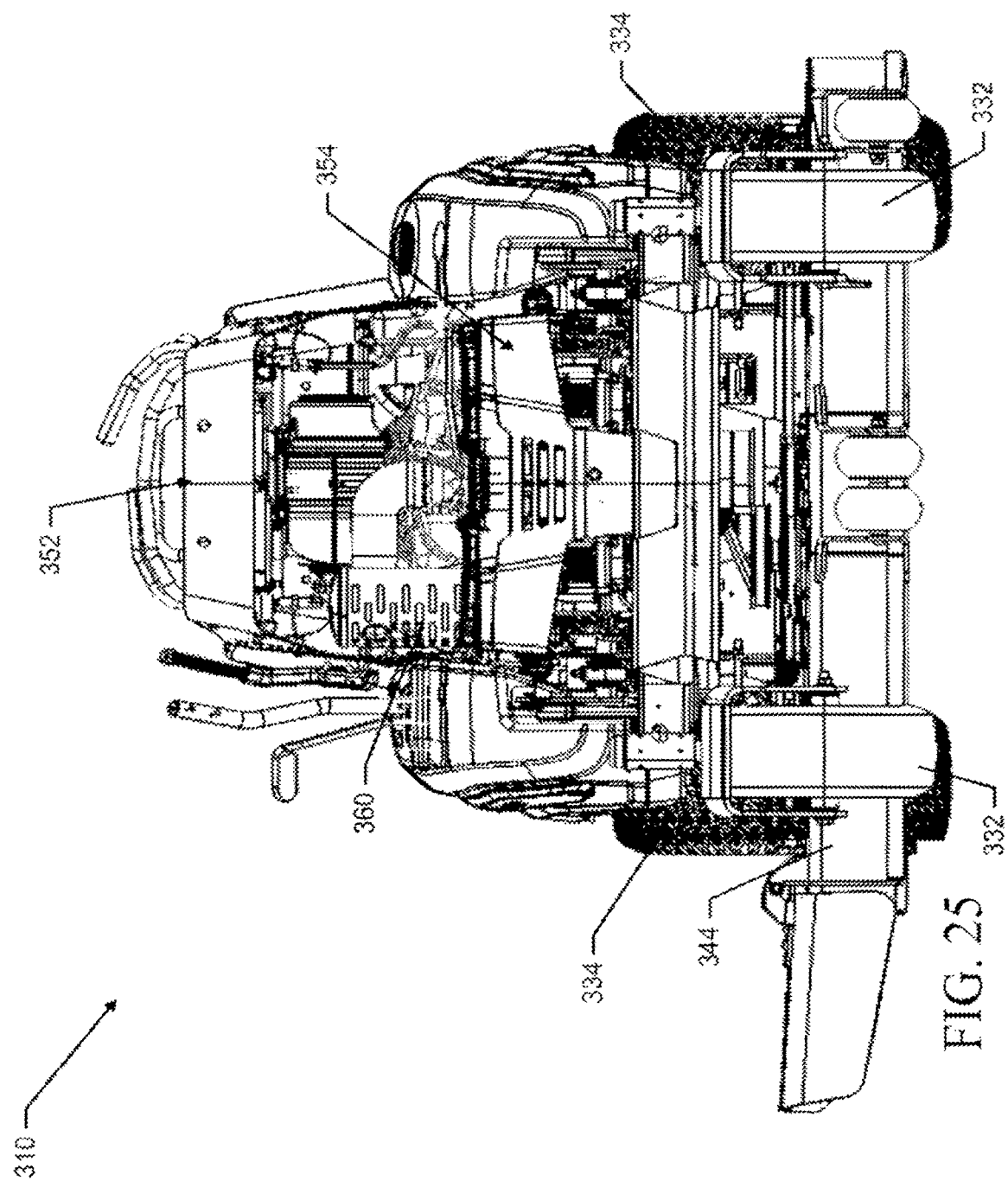
FIG. 25 illustrates a front view of the riding lawn care vehicle of FIG. 19 in accordance with an example embodiment.
Figure 26:
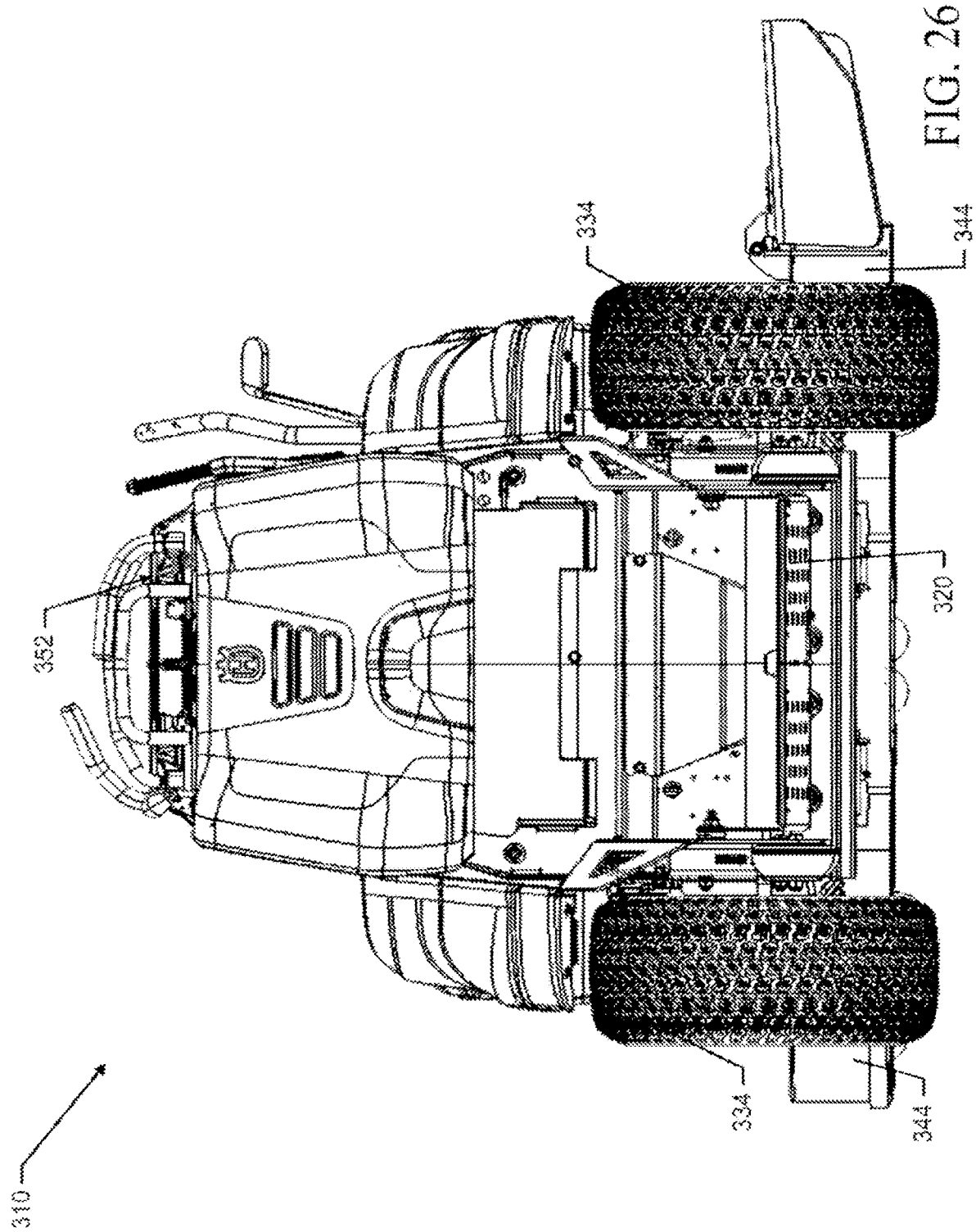
FIG. 26 illustrates a rear view of the riding lawn care vehicle of FIG. 19 in accordance with an example embodiment.

Referring to FIGS. 19-50, the riding lawn care vehicle 310 of FIG. 19 includes a support platform 320 operably coupled (e.g., pivotally attached) to a frame 330 of the riding lawn care vehicle 310. The support platform 320 may be configured to support a standing operator that may operate the riding lawn care vehicle 310 in the same manner described above. As such, the support platform 320 may include a suspension system including dampers, biasing members, etc., such as springs 321 that may be disposed between and/or engage a portion of the frame 330 of the riding lawn care vehicle 310 and a portion of the support platform 320 to reduce vibrations felt by the operator.

The support platform 320, as described above, may be rotatable between the first position (in which the support platform 320 is generally horizontal in the working position) and the second position (in which the support platform 320 is generally vertical in the storage position). However, the support platform 320 may be retained in the second position (e.g., a locked or folded position) by a locking assembly 322. The locking assembly 322 may include a hook member 323 that is biased (e.g., via spring 324 shown in FIG. 50) toward a locking position as shown by arrow 325. When the operator folds the support platform 320 from the first position shown in FIG. 36, through an intermediate position shown in FIG. 37, to the second position of FIG. 38, the hook member 323 engages the support platform 320 to lock the support platform 320 in the second position. In particular, the hook member 323 includes a sliding surface 326 that allows the force of moving the support platform 320 toward the second position to overcome the biasing force of the spring 324 to move the hook member 323 in the direction opposite arrow 325 (see FIG. 39). Once the support platform 320 clears the hook member 323 and moves to the second position, the hook member 323 engages the support platform 320 to prevent the support platform 320 from moving to the first position. However, the operator may rotate the hook member 323 in a direction opposite of that shown by arrow 325 to allow the support platform 320 to be rotated back to the first position.

Figure 27:
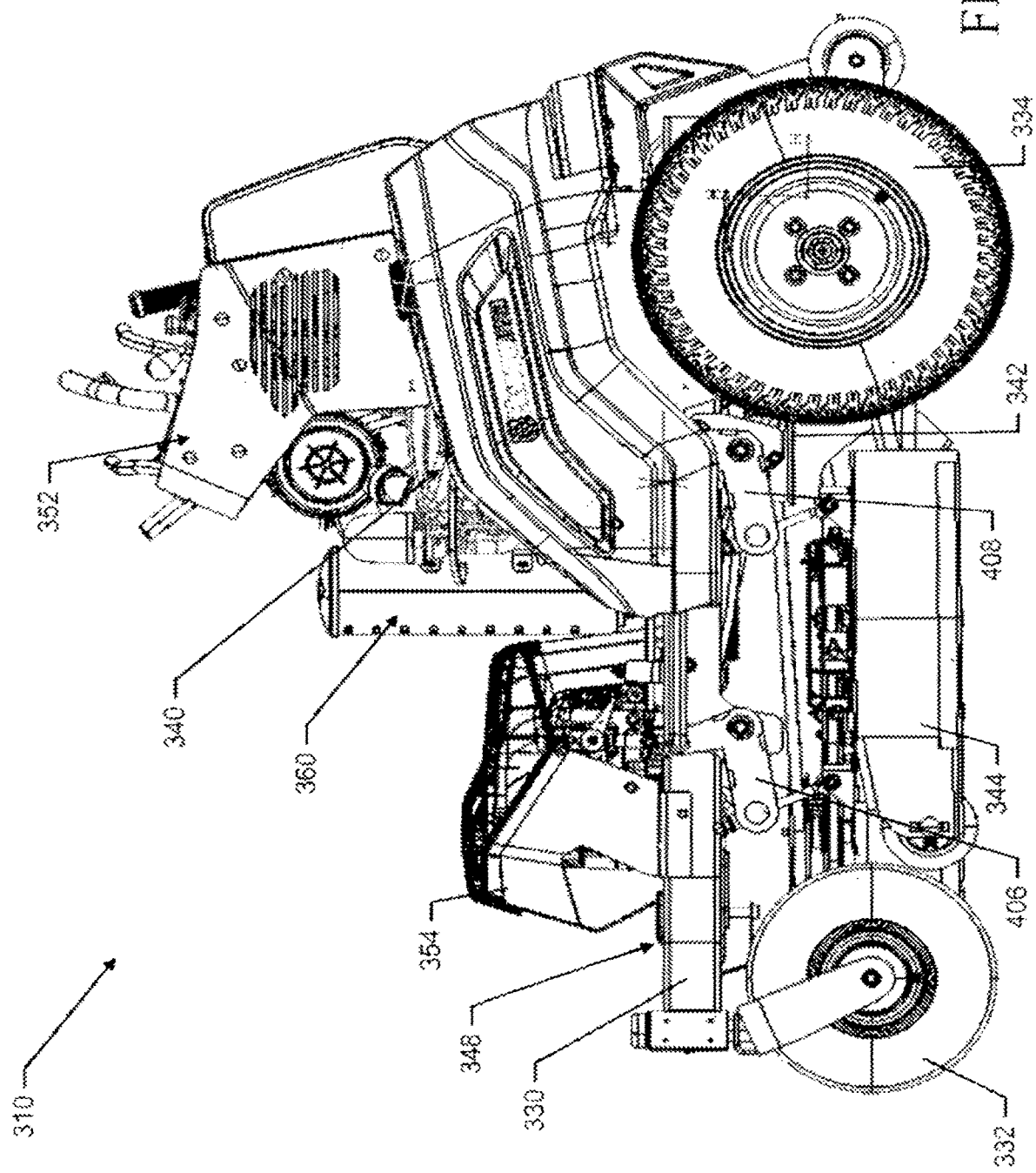
FIG. 27 illustrates a left side view of the riding lawn care vehicle of FIG. 19 in accordance with an example embodiment.
Figure 28:
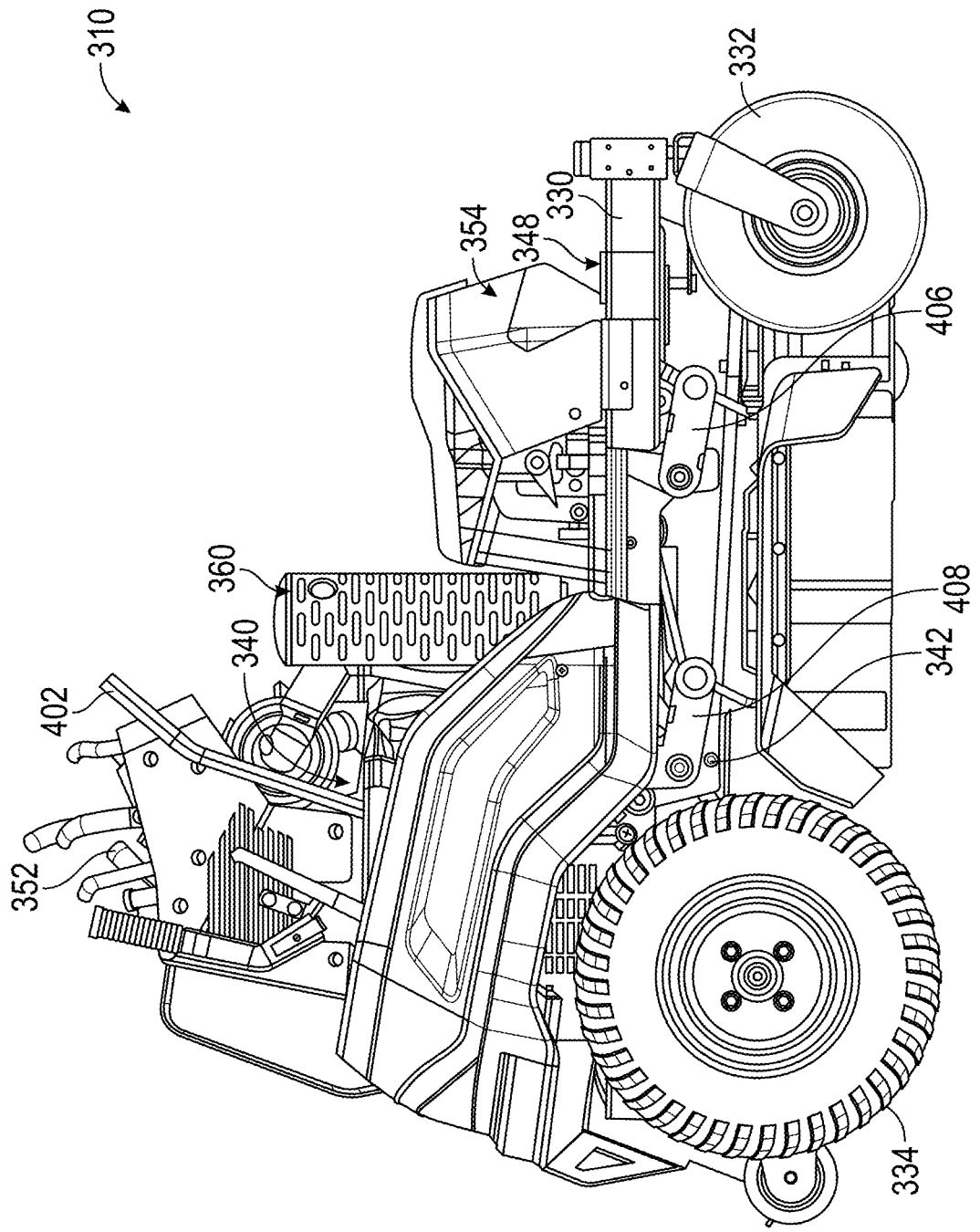
FIG. 28 illustrates a right side view of the riding lawn care vehicle of FIG. 19 in accordance with an example embodiment.

The frame 330 may be a weldment or assembly of frame members that includes, for example, an engine platform 342 and a front platform 348 that may lie in different planes with the front platform 348 being higher (e.g., at a higher elevation relative to the ground) than the engine platform 342 as best shown in FIGS. 27 and 28. The frame 330 may further include cross members, brackets, and/or other support structures as needed or desired to provide a solid foundation for attachment of other components of the riding lawn care vehicle 310. In an example embodiment, the frame 330 may support a pair of front wheels 332 (e.g., caster wheels) and a pair of rear wheels 334 (e.g., powered or drive wheels). The wheels may be operable in the manner described above responsive to operation of steering levers that can be operated from an operator station 352.

The riding lawn care vehicle 310 may include an engine 340. The engine 340 may be a gas-powered internal combustion engine, or may be another type of engine, such as a battery-powered electric motor that is supported by engine platform 42. In some cases, the engine platform 342 or the engine 340 may be further supported by additional platforms, support brackets, support rods, and/or the like. The engine 340 may drive (e.g., via belts, chains, cables, pulleys, shafts, etc.) one or more blades housed within a cutting deck 344 of the riding lawn care vehicle 310. The engine 340 may also be configured to drive (e.g., via belts, chains, cables, pulleys, shafts, etc.) one or more hydraulic pumps 346 that are also operably coupled to the frame 330. In an example embodiment, the hydraulic pumps 346 may be mounted on the front platform 348 and therefore be separated from the engine 340 and on a different platform than the engine 340 (which is mounted on the engine platform 342). As discussed above, in an example embodiment, the front platform 348 may be provided at a higher elevation than the engine platform 342.

The physical separation of the hydraulic pumps 346 from the engine 340, and the placement of each on different platforms is not a typical configuration. Typically, the engine 340 and the hydraulic pumps 346 are provided close to each other and on the same platform in order to minimize the complexity and length of couplings (mechanical and hydraulic) that are associated with these components. However, the employment of mechanical and hydraulic couplings between the hydraulic pumps 346 and the engine 340 may actually end up providing a number of advantages. In this regard, the front platform 348 being mounted forward of and higher than the engine 340 may allow easier access to both the hydraulic pumps 346 and the engine 340 for maintenance or repair, and for coupling to auxiliary equipment that may be front-mounted. Additionally, the distribution of these two relatively heavy components separated from each other fore and aft may increase the stability of the riding lawn care vehicle 310. In some cases, the provision of the engine platform 342 at a lower elevation than the front platform 348 also provides a lower center of gravity for the riding lawn care vehicle 10 to further increase stability as described above.

For safety and/or aesthetic purposes, the hydraulic pumps 346 may normally be covered by a removable front cover 354, such as the one shown in FIGS. 19-28. The front cover 354 may be removed to allow better visibility of and access to the hydraulic pumps 346. The hydraulic pumps 346 may include fans 356 and cooling fins 358 (see particularly FIGS. 41 and 42) to mitigate temperature rise during operation of the hydraulic pumps 346. Due to the positioning of the front cover 354, the engine 340, the hydraulic pumps 346 and the operator station 352, in combination with the use of a vertical exhaust 360, air drawn in by the fans 356 may also necessarily create airflow that avoids drawing in hot air from the vertical exhaust 360.

The hydraulic pumps 346 may normally be in an engaged state, which provides for movement of the rear wheels 334 responsive to operation of the hydraulic pumps 346. However, the hydraulic pumps 346 can also be disengaged so that the rear wheels 334 can freely rotate. When the hydraulic pumps 346 are in the disengaged state, the riding lawn care vehicle 310 is essentially in "neutral" and can be pushed by the operator. As described above, the riding lawn care vehicle 310 can be operated such that a single operator can operate both hydraulic pumps 346 to move them between engaged and disengaged states without requiring the operator to reach into the hot and narrow space proximate to the hydraulic pumps 346. In this regard, a bypass assembly 370 is provided to enable the hydraulic pumps 346 to be simultaneously engaged or disengaged from a single location (e.g., single side) of the riding lawn care vehicle 310, and via a single actuator.

Figure 40:
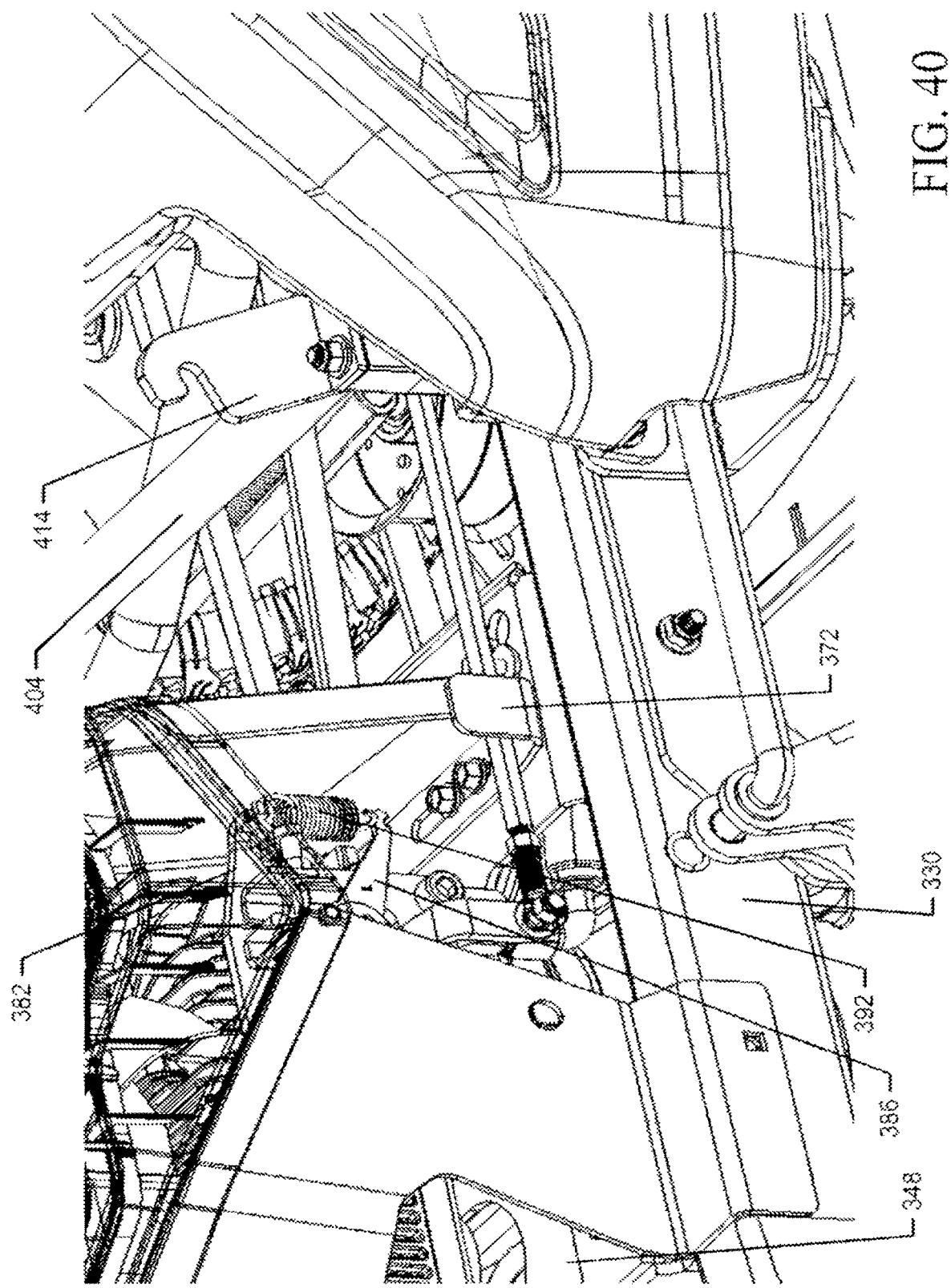
FIG. 40 illustrates a universal bypass lever in accordance with an example embodiment.
Figure 41:
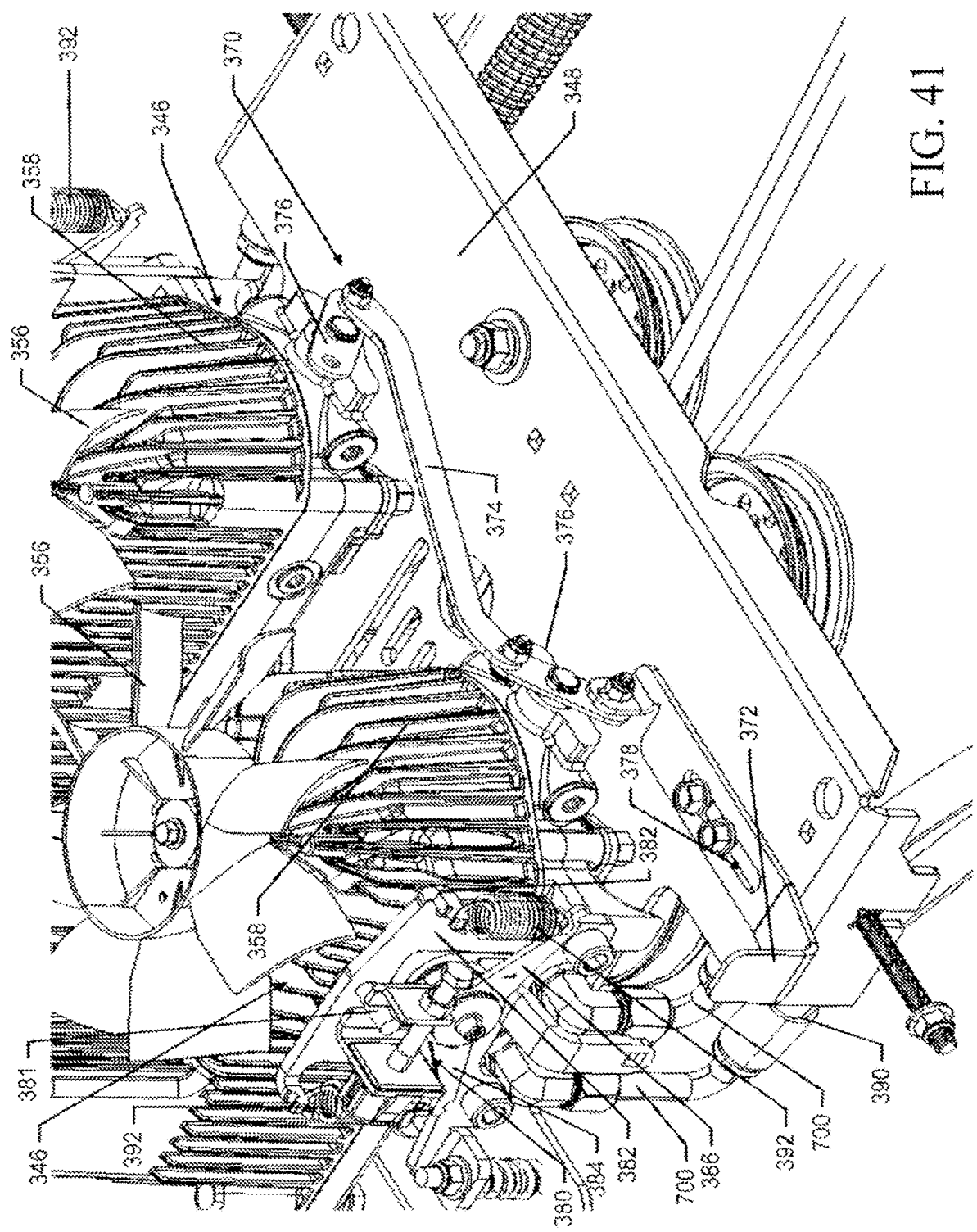
FIG. 41 illustrates a perspective view of the universal bypass lever in a disengaged position in accordance with an example embodiment.
Figure 42:
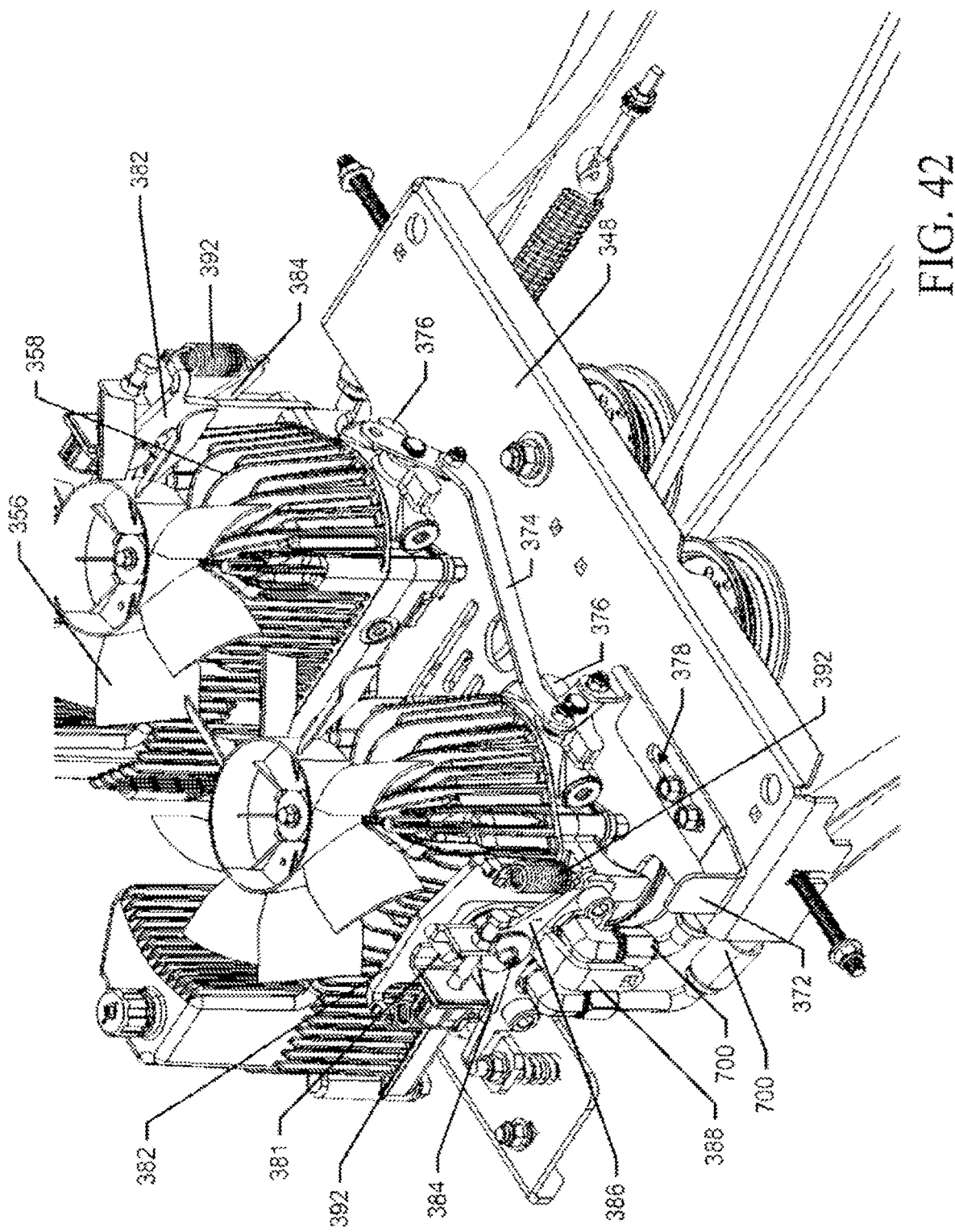
FIG. 42 illustrates a perspective view of the universal bypass lever in an engaged position in accordance with an example embodiment.

As shown in FIGS. 40-42, the bypass assembly 370 includes a universal bypass lever 372, a linkage arm 374, and one instance of a local bypass lever 376 at each one of the hydraulic pumps 346. The universal bypass lever 372 is directly coupled to one of the local bypass levers 376, and the other indirectly (e.g., via the linkage arm 374). The universal bypass lever 372 is configured to slide inwardly or outwardly (e.g., relative to the longitudinal centerline of the riding lawn care vehicle 310) to shift the local bypass levers 376 and control engagement or disengagement of the hydraulic pumps 346. In some cases, the universal bypass lever 372 slides across a surface of the front platform 348 to control engagement or disengagement of the hydraulic pumps 346. In this regard, for example, a slot 378 may be provided in the universal bypass lever 372 to define the range of motion of the universal bypass lever 372 along the surface of the front platform 348. As the universal bypass lever 372 moves, the local bypass lever 376 to which the universal bypass lever 372 is directly coupled will rotate and carry with it the other local bypass lever 376 via the linkage arm 374.

Each instance of the local bypass lever 376 rotates to shift the respective one of the hydraulic pumps 346 between the engaged and disengaged states. The linkage arm 374 operably couples the respective instances of the local bypass lever 376, and provides opposite rotational movement directions at respective ones of the hydraulic pumps 346 to synchronize the states of the hydraulic pumps 346. In this regard, for example, the linkage arm 374 extends between opposite ends (e.g., top and bottom) of respective ones of the local bypass lever 376 so that rotational movement of one of the local bypass levers 376 in a clockwise direction disengages the corresponding instance of the hydraulic pumps 346 and further causes rotational movement of the other one of the local bypass levers 376 in a counterclockwise direction to disengage the other corresponding instance of the hydraulic pumps 346. The movement of the local bypass levers 376 in the opposite direction would, via the linkage arm 374, likewise cause engagement of the hydraulic pumps 346. In the example of FIGS. 40-42, movement of the universal bypass lever 372 inward and toward the longitudinal centerline of the riding lawn care vehicle 310 engages both hydraulic pumps 346 and movement of the universal bypass lever 372 outward and away from the longitudinal centerline of the riding lawn care vehicle 310 disengages both hydraulic pumps 346.

The hydraulic pumps 346 may have a neutral position to which the hydraulic pumps 346 return when the control levers of the operator station 352 are released and also allowed to return to their neutral position (as described above). A neutral positioning assembly 380 (sometimes referred to as a return-to-neutral (RTN) assembly) may be provided to define the neutral position and return the hydraulic pumps 346 to the neutral position. Referring primarily to FIGS. 41, 42, 51, 52, 53 and 54, the neutral positioning assembly 380 may include an orientation plate 382 having a reference protrusion 381. The orientation plate 382 and the reference protrusion 381 are each generally fixed relative to the hydraulic pumps 346 and/or the frame 330 during movement of other components of the neutral positioning assembly 380. The neutral positioning assembly 380 may further include a first scissor arm 384, a second scissor arm 386, and a pivot arm 388 that is operably coupled to linkage 390 that is moved responsive to repositioning of the control levers of the operator station 352. The pivot arm 388 may include a protrusion 389 at a distal end thereof. The first and second scissor arms 384 and 386 may each be biased to return to the neutral position by biasing springs 392 that are operably coupled between respective distal ends of the first and second scissor arms 384 and 386 and corresponding portions of the orientation plate 382. The first and second scissor arms 384 and 386 may each rotate in opposite directions responsive to corresponding movement of the control levers in respective opposite directions. The movement of a respective one of the first and second scissor arms 384 and 386 responsive to movement of the corresponding control lever will load the corresponding one of the biasing springs 392. The first and second scissor arms 384 and 386 may then, when the control levers are no longer being moved by the operator, be returned to the neutral position by unloading of the corresponding one of the biasing springs 392. In particular, the first and second scissor arms 384 and 386 operate on the protrusion of the pivot arm 388 whenever the first and second scissor arms 384 and 386 are displaced out of alignment with the reference protrusion 381 of the orientation plate 382.

When the control lever is in the neutral position, no movement of the linkage 390 is provided. In such a state, both of the biasing springs 392 pull their respective ones of the first and second scissor arms 384 and 386 such that the protrusion on the pivot arm 388 aligns with the reference protrusion 381 on the orientation plate 382. However, when the control lever is moved out of the neutral position, the linkage 390 will also move and rotate the pivot arm 388. Rotation of the pivot arm 388 will carry a corresponding one of the first and second scissor arms 384 and 386 and load the corresponding one of the biasing springs 392. Meanwhile, the other biasing spring 392 will maintain the other one of the first and second scissor arms 384 and 386 in contact with the reference protrusion 381 on the orientation plate 382. When the control lever is released, the linkage 390 will no longer transmit any force to position the pivot arm 388 and the corresponding one of the first and second scissor arms 384 and 386 which had originally been moved will return to the neutral position responsive to unloading of the corresponding one of the biasing springs 392. When both of the first and second scissor arms 384 and 386 are being held at the neutral position by their respective biasing springs 392, each of the first and second scissor arms 384 and 386 contacts the reference protrusion 381 and the protrusion 389 of the pivot arm 388 is also held at a neutral position. Thus, it should be appreciated that any adjustment to the position of the orientation plate 382 necessarily adjusts the location of the neutral position.

Figure 51:
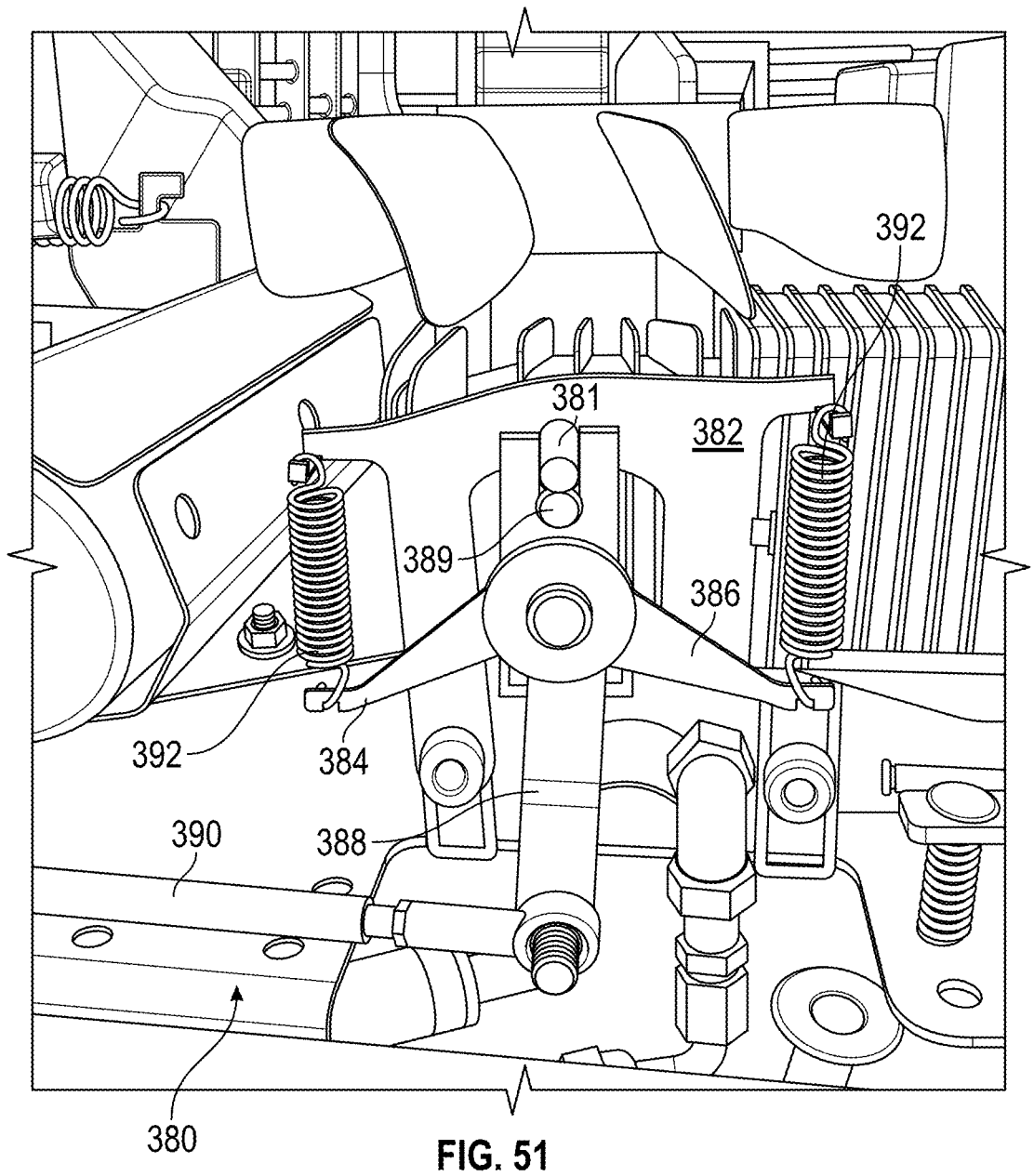
FIG. 51 illustrates a neutral positioning assembly in the neutral position in accordance with an example embodiment.
Figure 52:
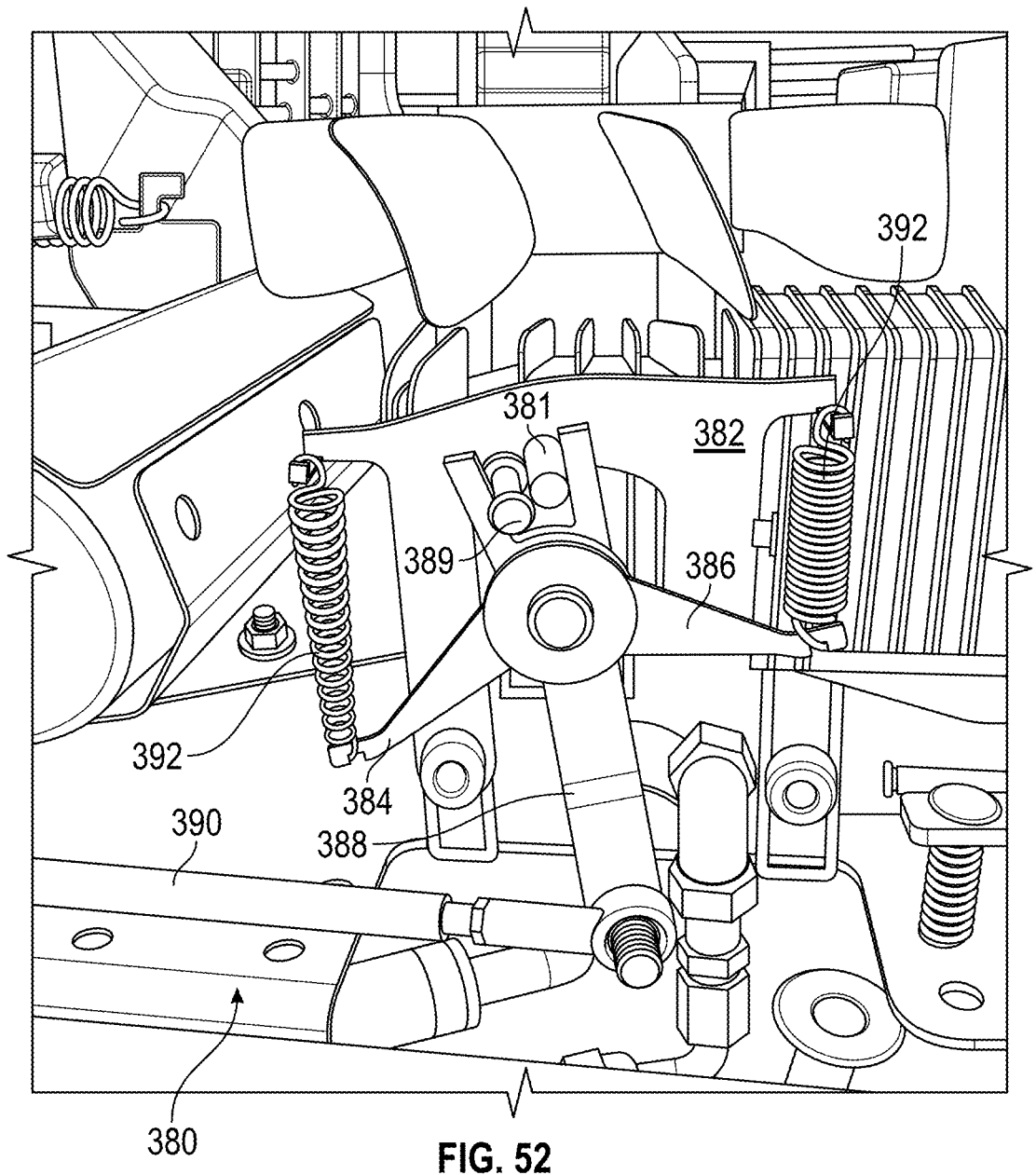
FIG. 52 illustrates the neutral positioning assembly in a condition in which the first scissor arm is deflected in accordance with an example embodiment.
Figure 53:
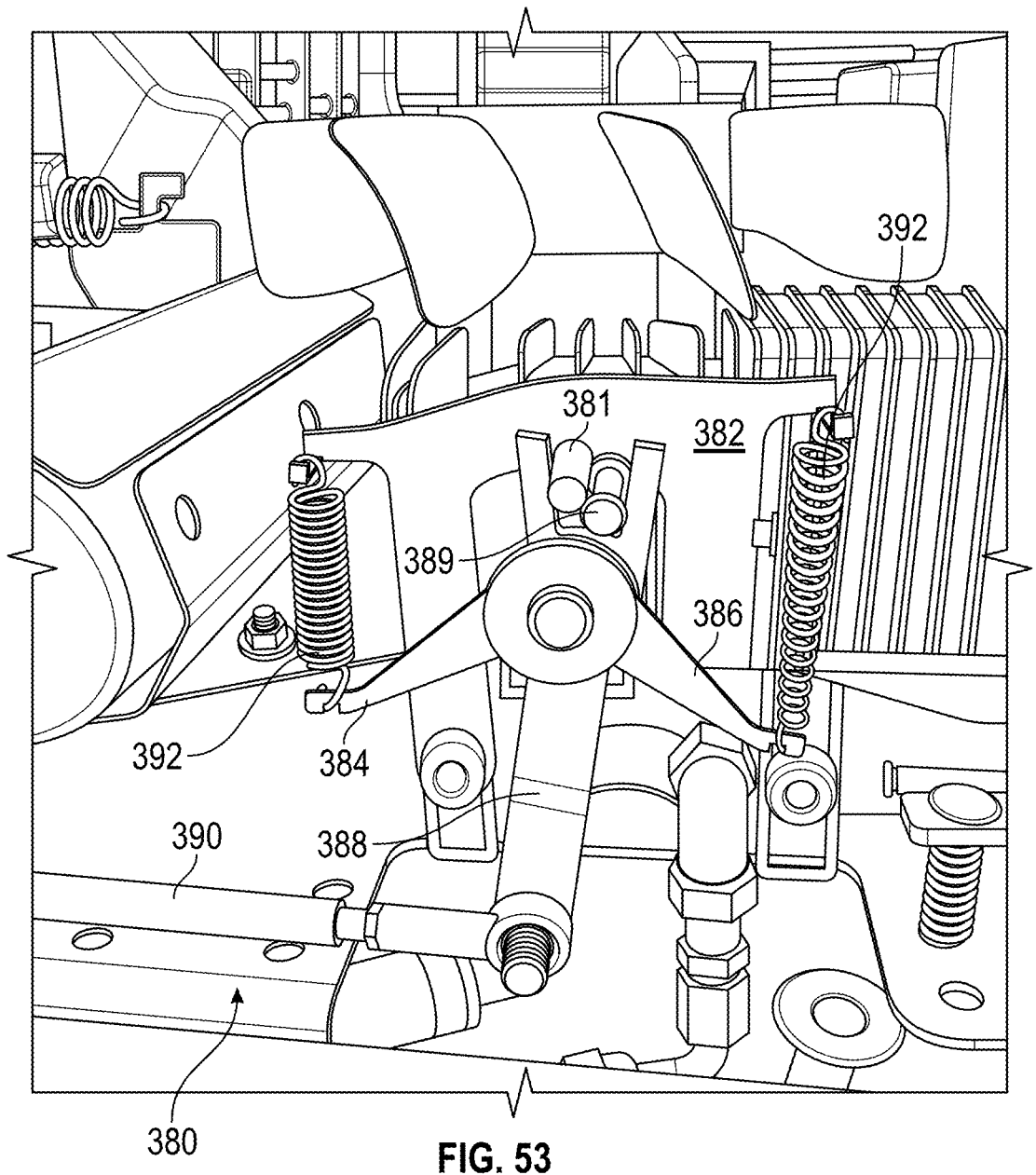
FIG. 53 illustrates the neutral positioning assembly in a condition in which the second scissor arm is deflected in accordance with an example embodiment.
Figure 54:
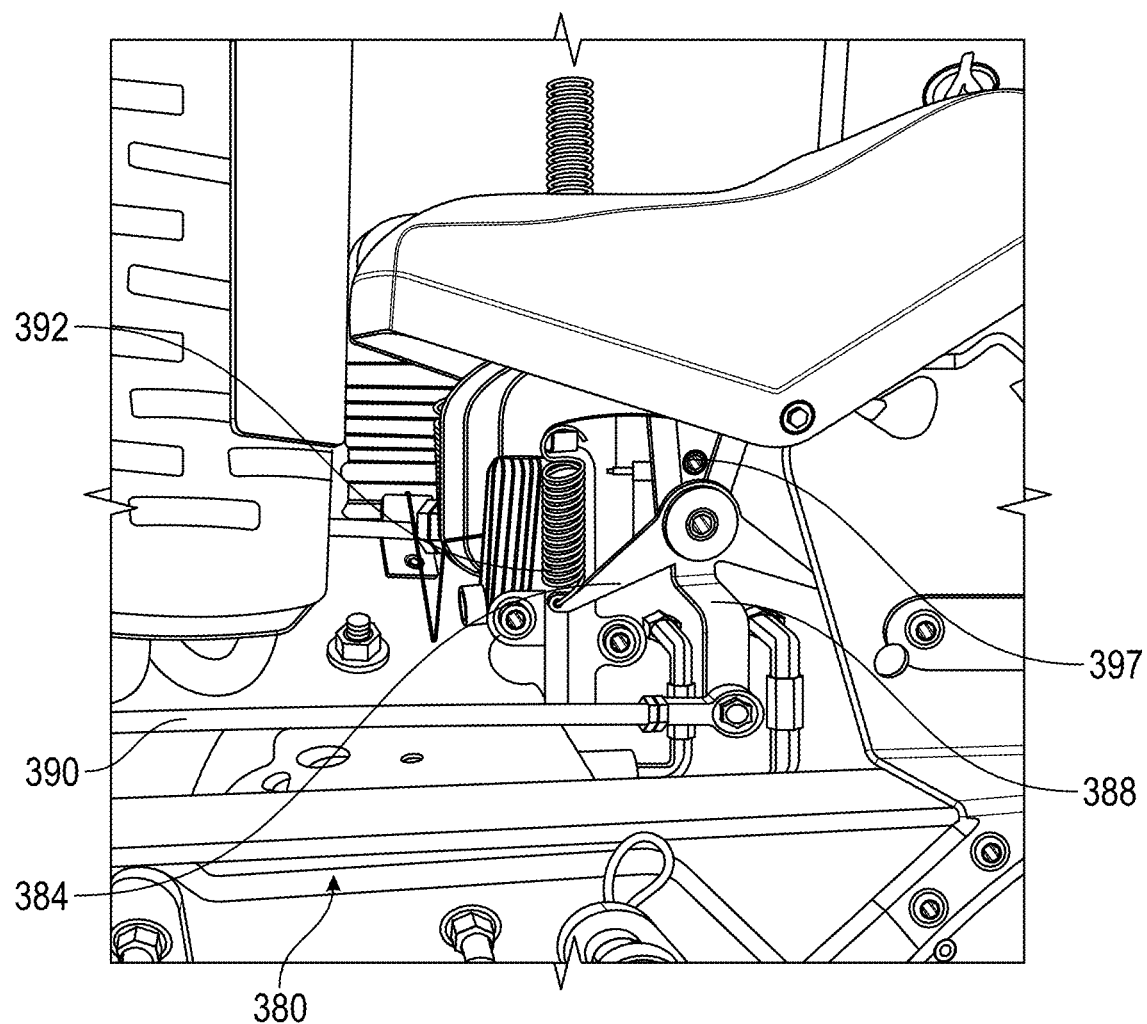
FIG. 54 illustrates an indicator for the neutral position in accordance with an example embodiment.

FIG. 51 illustrates the neutral positioning assembly 380 in the neutral position. FIG. 52 illustrates the neutral positioning assembly 380 in a condition in which the first scissor arm 384 is deflected by the linkage 390 being deflected (to the right in this view) to move the protrusion 389 of the pivot arm 388 to the left thereby carrying the first scissor arm 384 also to the left. The corresponding biasing spring 392 is deflected and poised to return the protrusion 389 to the neutral position of FIG. 51 when the corresponding control lever is also returned to neutral. FIG. 53 illustrates the neutral positioning assembly 380 in a condition in which the second scissor arm 386 is deflected by the linkage 390 being deflected (to the left in this view) to move the protrusion 389 of the pivot arm 388 to the right thereby carrying the second scissor arm 386 also to the right. The corresponding biasing spring 392 is deflected and poised to return the protrusion 389 to the neutral position of FIG. 51 when the corresponding control lever is also returned to neutral. In some cases, an indication may be given when the neutral positioning assembly 380 is in the neutral position. To accomplish this, a push button 397 may be provided to be deflected to indicate when the neutral position is achieved as shown in FIG. 54.

The first and second scissor arms 384 and 386 may be retained to rotate about a common axis. Moreover, a retention assembly including bushings and washers may be employed to achieve such retention in some cases. FIGS. 55 and 56 illustrate such a retention assembly in accordance with an example embodiment. In this regard, FIG. 55 illustrates the retention assembly components in isolation, while FIG. 56 shows such components together with the first and second scissor arms 384 and 386. The retention assembly may include a first flanged bushing 600, a separator 610 (e.g., a washer), a second flanged bushing 620 and a retainer 630 (e.g., a washer). The first and second flanged bushings 600 and 620 may be made of plastic and may include flanges that face away from each other to retain the first and second scissor arms 384 and 386 therebetween. The separator 610 may be metallic, nylon, plastic or other materials, and may be provided between the first and second scissor arms 384 and 386 to separate the first and second scissor arms 384 and 386. The retainer 630 may be at a distal end of the common axis, proximate to the second flanged bushing 620.

The hydraulic pumps 346 are not collocated with the engine 340, as indicated above. In this regard, the hydraulic pumps 346 are located remotely and on a different platform relative to the engine 340. However, the hydraulic pumps 346 are also remotely located (i.e., in different housings and in different physical locations) relative to hydraulic motors 710 that turn the rear wheels 334. In this regard, hydraulic lines 700, which include supply and return lines, may extend from the hydraulic pumps 346 (located on the front platform 348) rearward toward the rear wheels 334. The rear wheels 334 may be mounted to a hub 710 of hydraulic motors 720. Each hydraulic motor 720 is powered by the hydraulic fluid pumped by a corresponding one of the hydraulic pumps 346 (i.e., on the same side). Thus, the hydraulic motors 720 and hydraulic pumps 346 are physically separated in fore and aft directions instead of inboard to outboard directions, as is typically the case. The hydraulic lines 700 therefore run substantially parallel to the longitudinal centerline of the riding lawn care vehicle 310 instead of substantially perpendicular to the longitudinal centerline.

Figure 57:
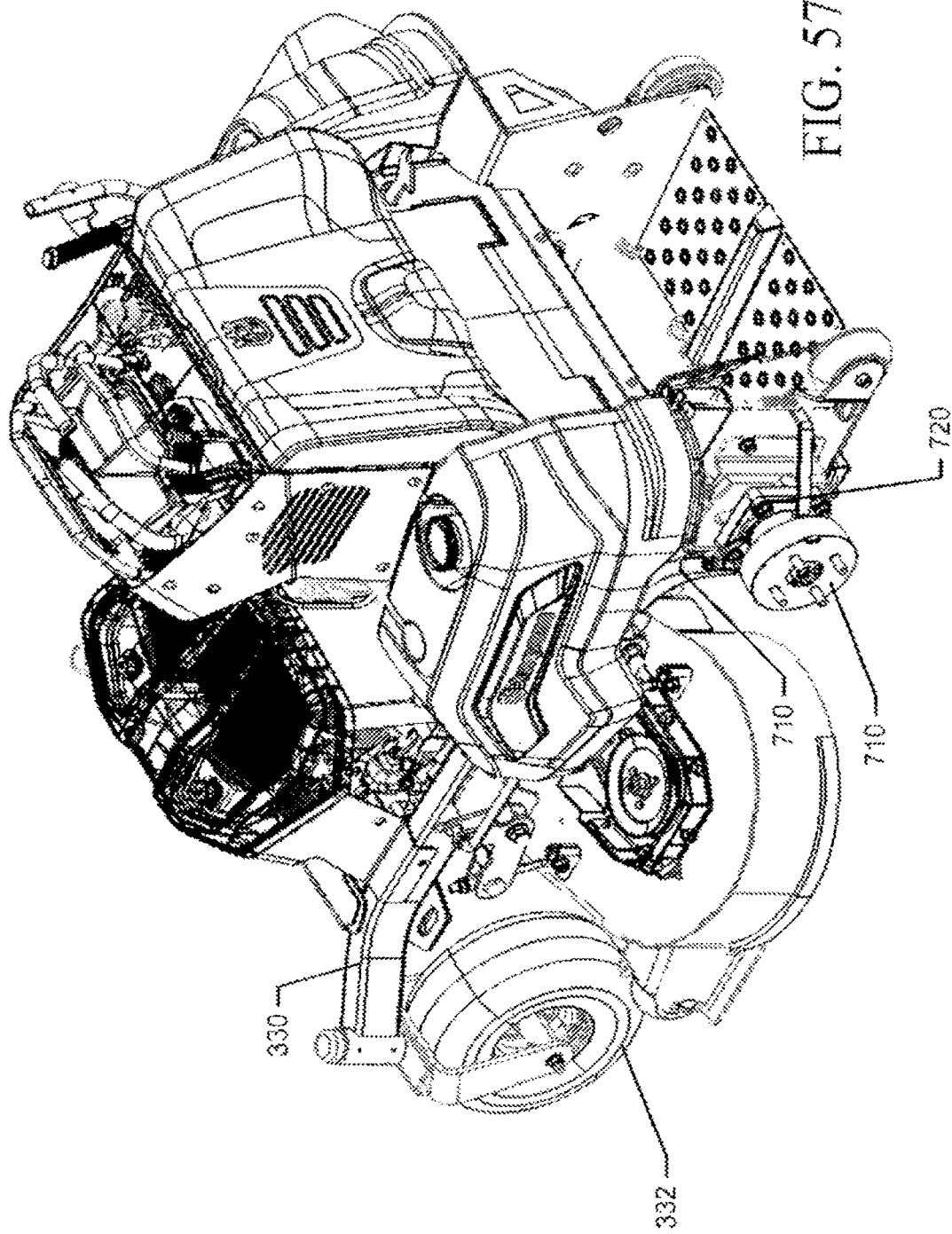
FIG. 57 illustrates a perspective view of the riding lawn care vehicle with the left rear wheel removed to expose the hydraulic motor in accordance with an example embodiment.
Figure 58:
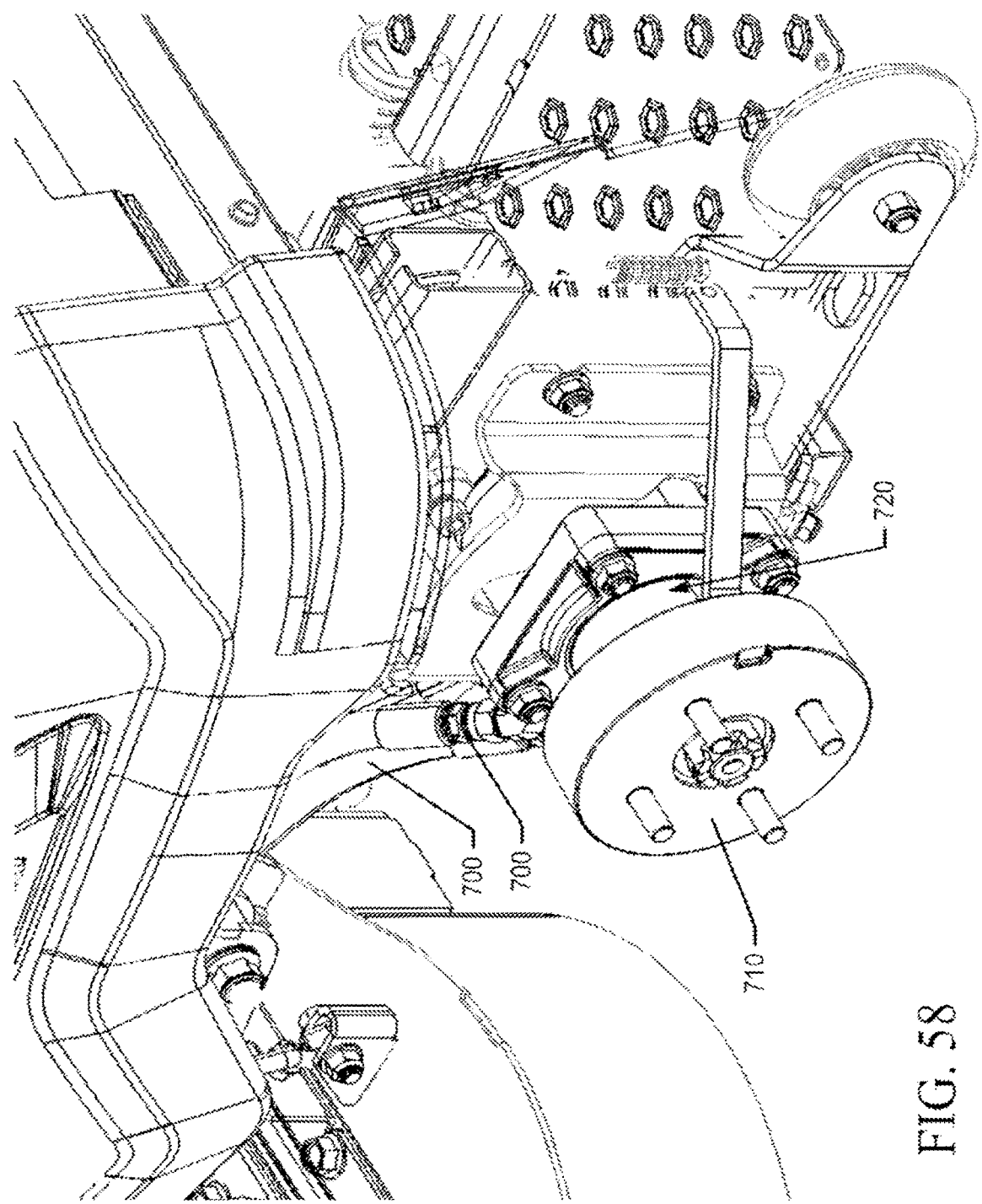
FIG. 58 illustrates a closer view of the hydraulic motor of FIG. 57 in accordance with an example embodiment.

FIG. 57 illustrates a perspective view of the riding lawn care vehicle 310 with the left rear wheel removed to expose the hydraulic motor 720 and the hydraulic lines 700 that extend between the hydraulic pump 346 on the same side as the hydraulic motor 720. FIG. 58 illustrates a closer view of the hydraulic motor of FIG. 57. The same hydraulic lines 720 are also seen leaving the hydraulic pumps in FIGS. 41 and 42. In operation, the engine 340 powers the hydraulic pumps 346 from a location rearward of the hydraulic pumps 346, and from a different platform and elevation. Each of the hydraulic pumps 346, when actuated, pressurizes the hydraulic fluid in the hydraulic lines 700 that extend between each one of the hydraulic pumps 346 and its respective hydraulic motor 720. The legs of the hydraulic lines 720 that carry the hydraulic fluid to and from the hydraulic motors 720 can alternate in function between supply and return legs. Thus, the fluid in the hydraulic lines 720 can change in directions that depend upon the operation of the hydraulic pumps 346 (which can operate in either direction) to correspondingly turn the rear wheels 334 of the riding lawn care vehicle 310 in dependence upon the direction the control levers at the operator station 352 were operated.

The deck lift system 400 of an alternative embodiment is shown in FIGS. 29-32. Referring to FIGS. 29-32, the deck lift system 400 may include a deck lift lever 402, a torsion bar 404, a front lift assembly 406, a rear lift assembly 408, torsion bar linkages 410, and deck lift linkage arms 412. The deck lift lever 402 may be provided on one side or the other of the operator station 352 (e.g., the right side in this example). The deck lift lever 402 may be movable forward or rearward to adjust other components of the deck lift system 400 to correspondingly raise or lower the elevation of the cutting deck 344. The front lift assembly 406 and the rear lift assembly 408 may each be bell cranks or other pivoting assemblies that are operably coupled to the cutting deck 344 and the frame 330 to allow the cutting deck 344 to be raised or lowered relative to the frame 330. In this regard, one end of each of the bell cranks of the front and rear lift assemblies 406 and 408 are coupled to each other via the deck lift linkage arms 412 to ensure that the front and rear lift assemblies 406 and 408 pivot simultaneously and in the same direction. The bell cranks may each be V-shaped pivot members having one end (e.g., the forward end) operably coupled to the cutting deck 344 while the other end is operably coupled to the other bell crank via the deck lift linkage arms 412. Moreover, the rear lift assembly 408 (e.g., on the right side) may be operably coupled to the deck lift lever 402 and also be operably coupled to the same end of the rear lift assembly 408 that is operably coupled to the deck lift linkage arm 412 on that side (e.g., the right side).

The torsion bar 404 may be operably coupled to the same end of both of the rear lift assemblies 408 via torsion bar linkages 410. The torsion bar 404 may be physically located in the space between the engine 340 and the hydraulic pumps 346 (e.g., proximate to the vertical exhaust 360) and may extend laterally between left and right sides of the riding lawn care vehicle 310. In some cases, the torsion bar 404 may include extensions 414 that extend upward to engage deck lift assisting springs 416 that are biased to assist with raising and lowering the cutting deck 344 by facilitating rotation of the torsion bar 404. The torsion bar 404 therefore provides operable coupling between the left and right sides of the deck lift system 400.

During operation, if the deck lift lever 402 is operated, the rear lift assembly 408 on the same side will be pivoted based on the direction of movement of the deck lift lever 402. The torsion bar linkage 410 will translate the pivoting of the rear lift assembly 408 on the same side as the deck lift lever 402 to the rear lift assembly 408 on the opposite side via the torsion bar 402. The deck lift linkage arms 412 will also translate pivoting (or rotation) of the rear lift assemblies 408 to the front lift assemblies 406 and then correspondingly move the cutting deck 344 accordingly.

Figure 29:
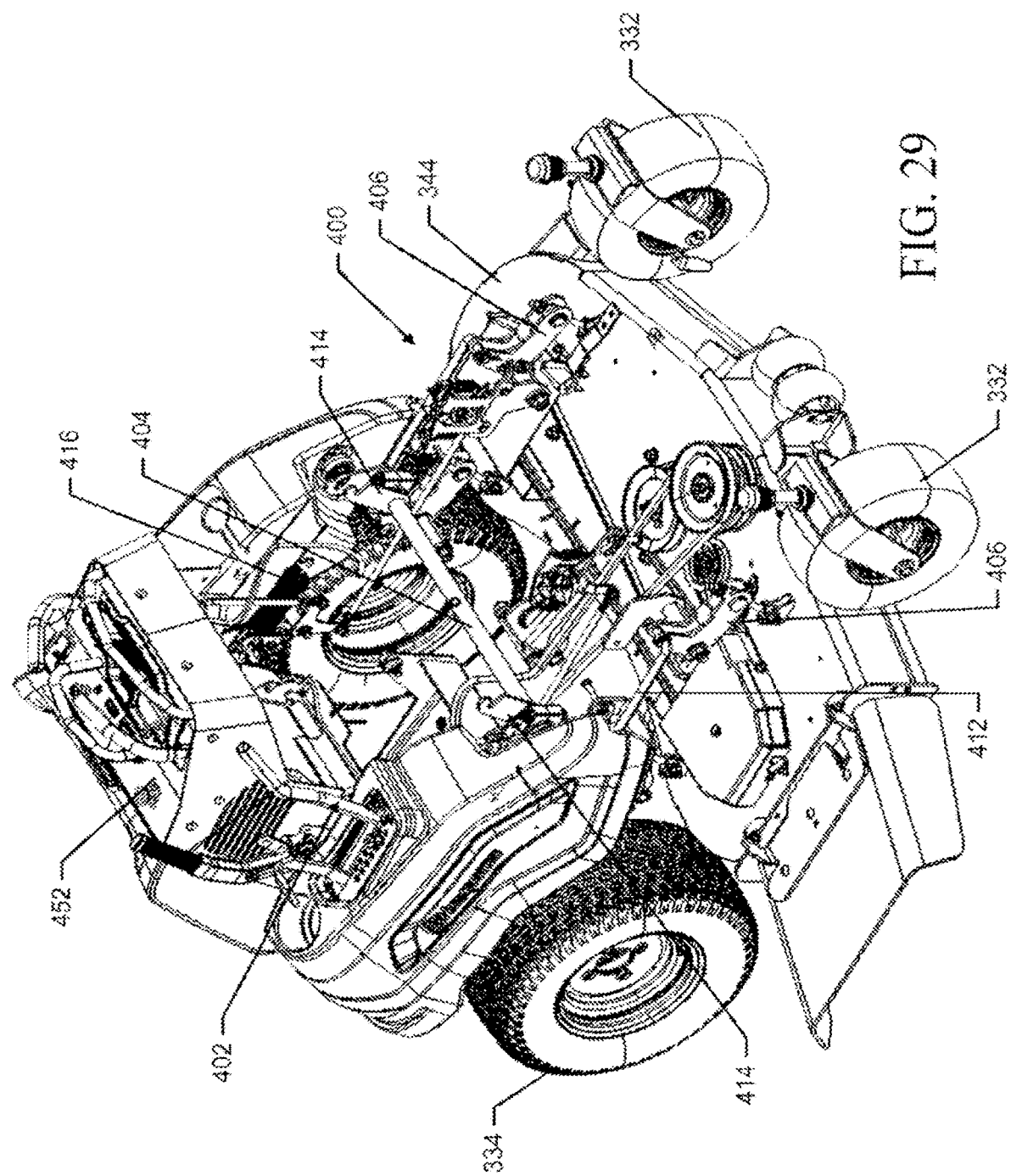
FIG. 29 illustrates a partially isolated view of deck lift components of the riding lawn care vehicle of FIG. 19 in accordance with an example embodiment.
Figure 30:
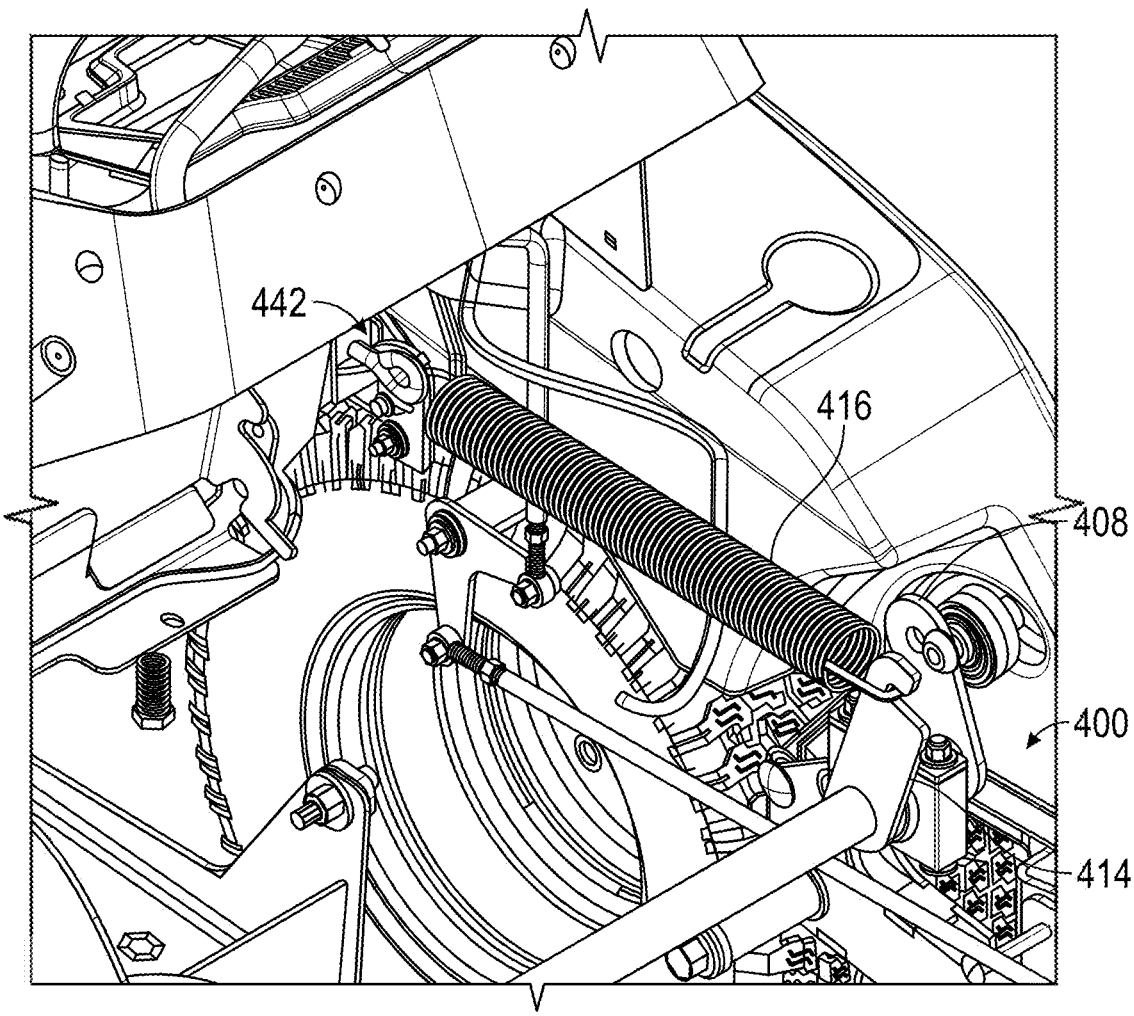
FIG. 30 illustrates a closer view of some of the deck lift components of FIG. 29 in accordance with an example embodiment.
Figure 31:
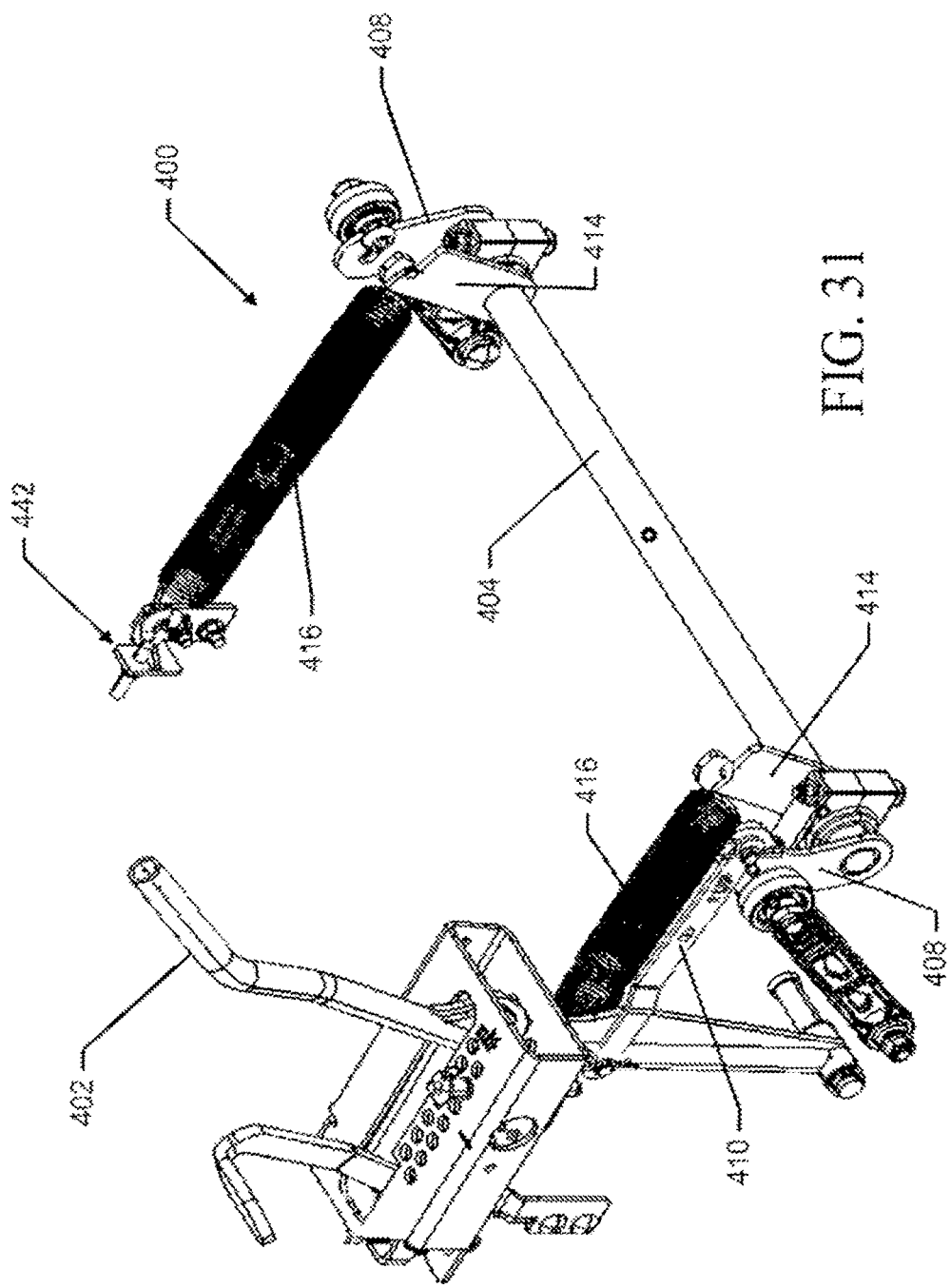
FIG. 31 illustrates an isolation view of some of the components of FIGS. 29 and 30 in accordance with an example embodiment.
Figure 32:
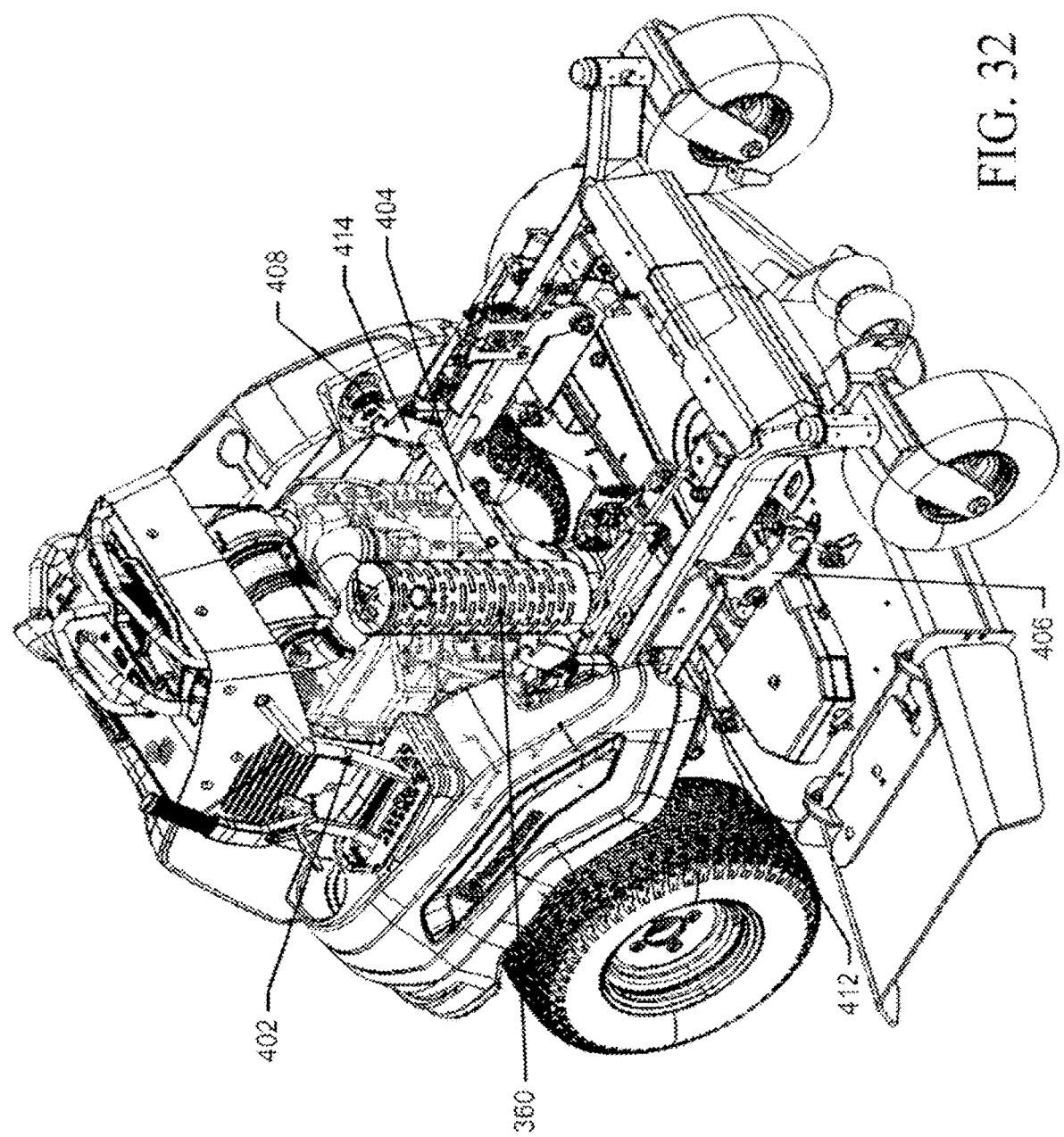
FIG. 32 illustrates a partially isolated view of an alternative exhaust design for the riding lawn care vehicle in accordance with an example embodiment.
Figure 46:
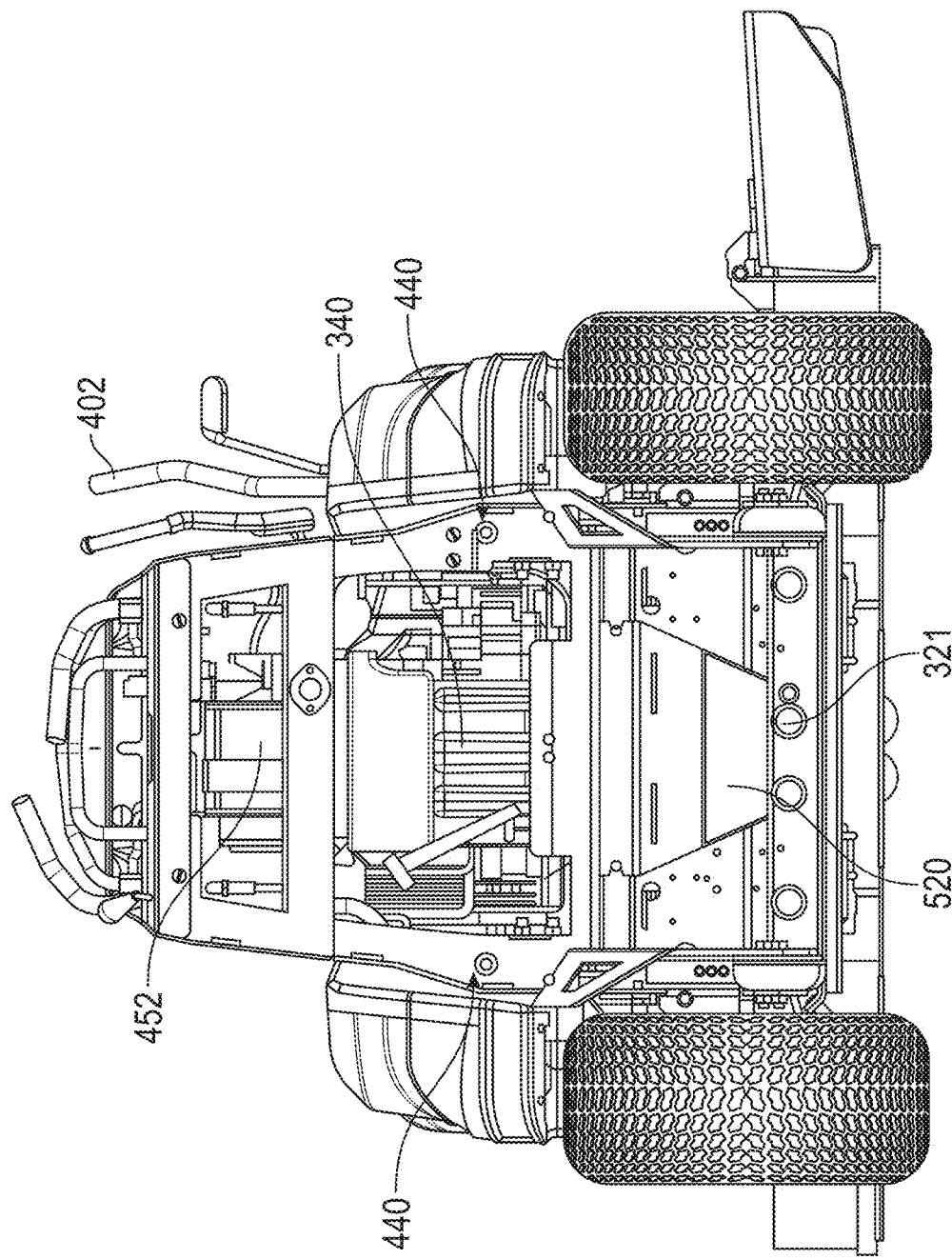
FIG. 46 illustrates a perspective view of spring tension adjustment access holes in accordance with an example embodiment.
Figure 47:
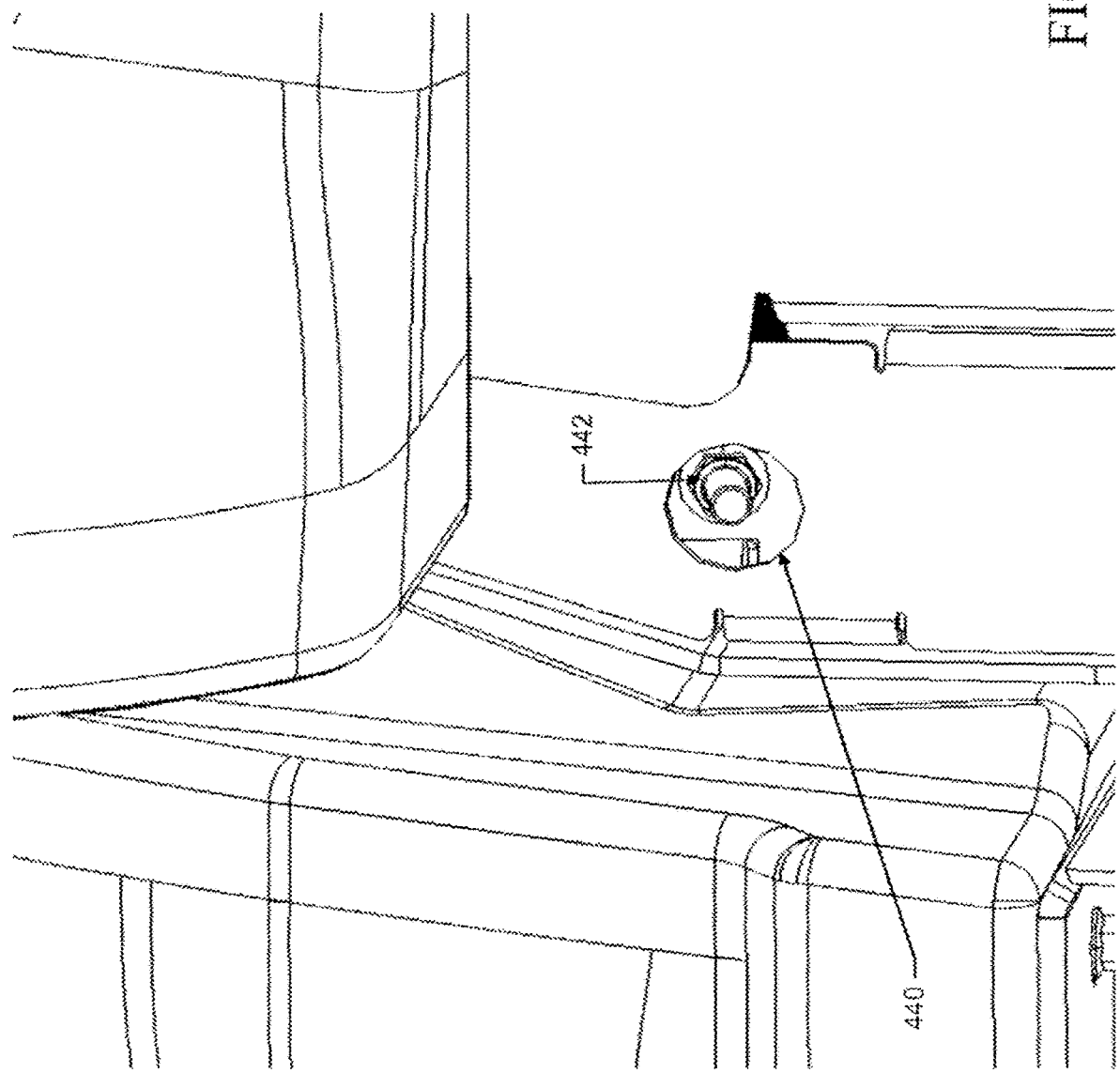
FIG. 47 illustrates close-up view of the spring tension adjustment access holes in accordance with an example embodiment.

The deck lift assisting springs 416 may be operably coupled between a portion of the frame 330 and the extensions 414 to provide a pull force for assisting the lifting of the cutting deck 344. The deck lift assisting springs 416 of FIGS. 29-31 are linear springs. However, the deck lift assisting springs 416 could be replaced with torsion springs or rotational springs in other embodiments. In the present example, the tension on the deck lift assisting springs 416 may also be adjustable. Moreover, the structure may be configured such that easy access is afforded to the operator to adjust the tension from a rear of the riding lawn care vehicle 310. In this regard, FIG. 46 illustrates a tension adjustment slot 440 formed to allow direct access to a tensioning assembly 442 that allows the tension of the deck lift assisting springs 416 to be adjusted. As can be seen from FIG. 46, and FIG. 47, which shows the tension adjustment slot 440 in greater detail, a nut of the tensioning assembly 442 can be easily accessed on each side of the riding lawn care vehicle 310 to allow tensioning of the deck lift assisting springs 416 to be adjusted. Additionally, both of the tension adjustment slots 440 are located below a pad 450 that may be a thigh pad or leaning pad that is normally disposed at a rear portion of the operator station 352 to allow the operator to lean against the pad 450 during operation of the riding lawn care vehicle 310.

Figure 33:
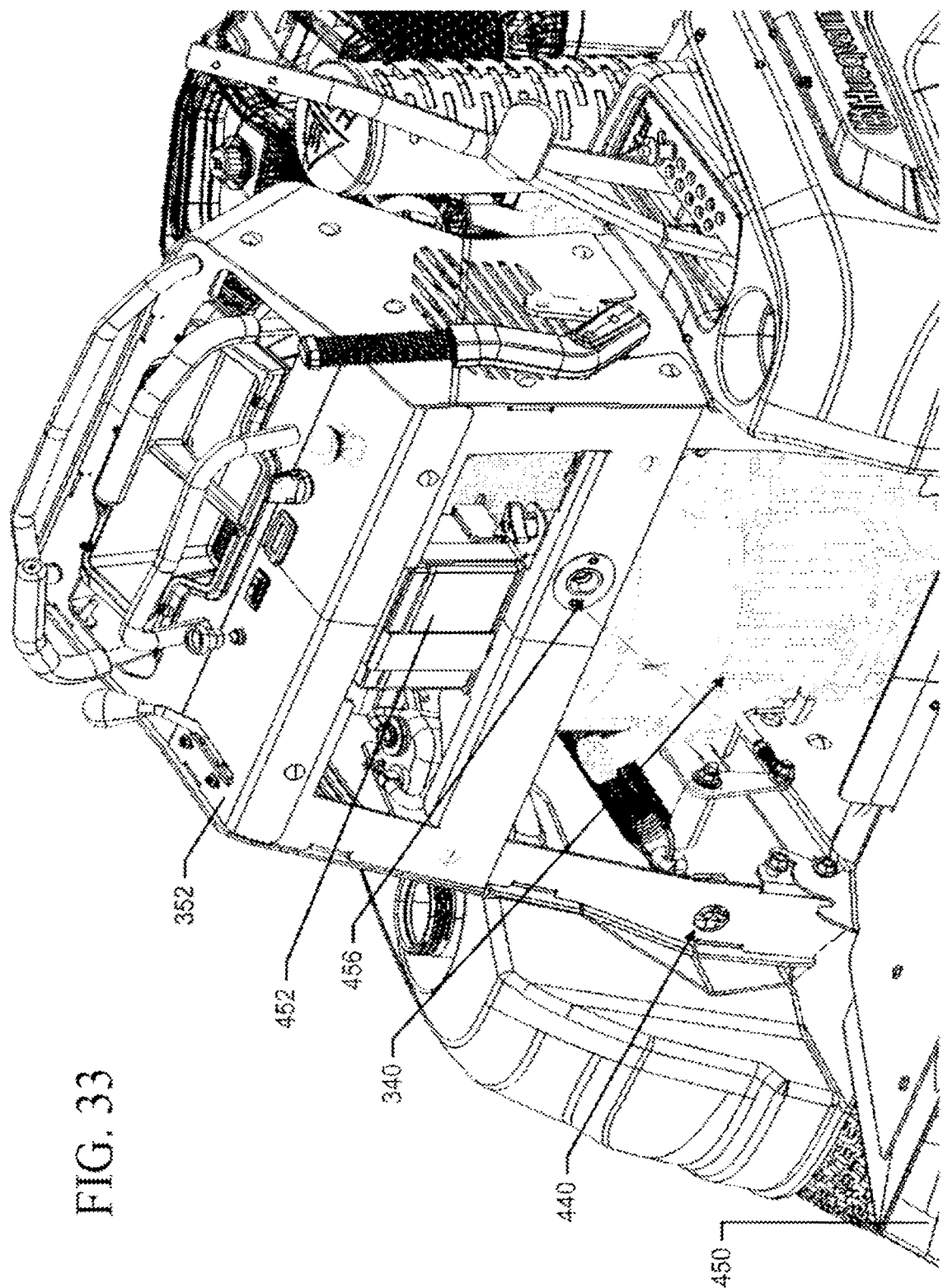
FIG. 33 illustrates a rear perspective view of the battery and electronics of the riding lawn care vehicle of FIG. 19 in accordance with an example embodiment.
Figure 34:
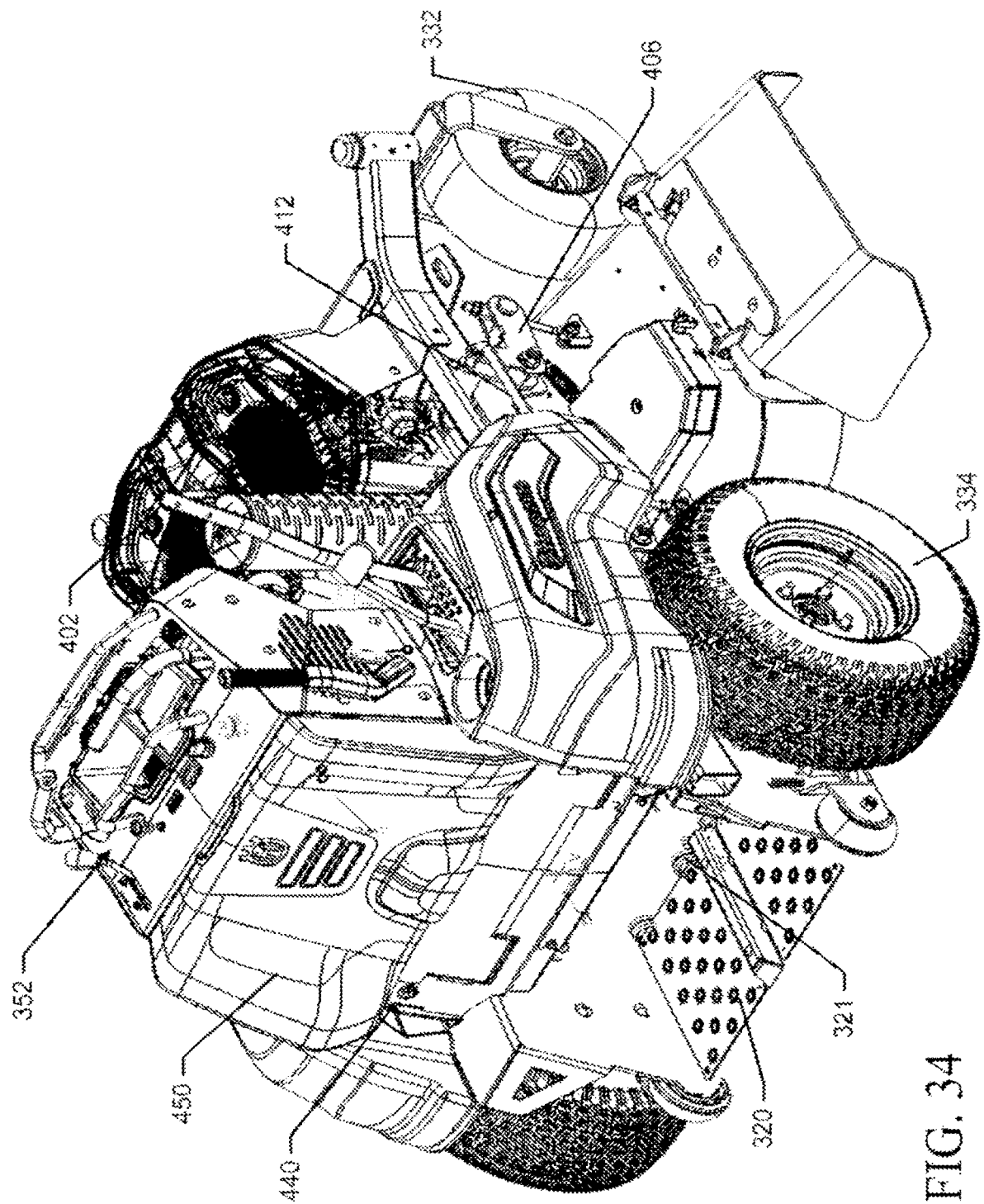
FIG. 34 illustrates a rear-right perspective view of the riding lawn care vehicle of FIG. 19 with support platform extended and pad (e.g., thigh or leaning pad) in a normal operating position in accordance with an example embodiment.
Figure 35:
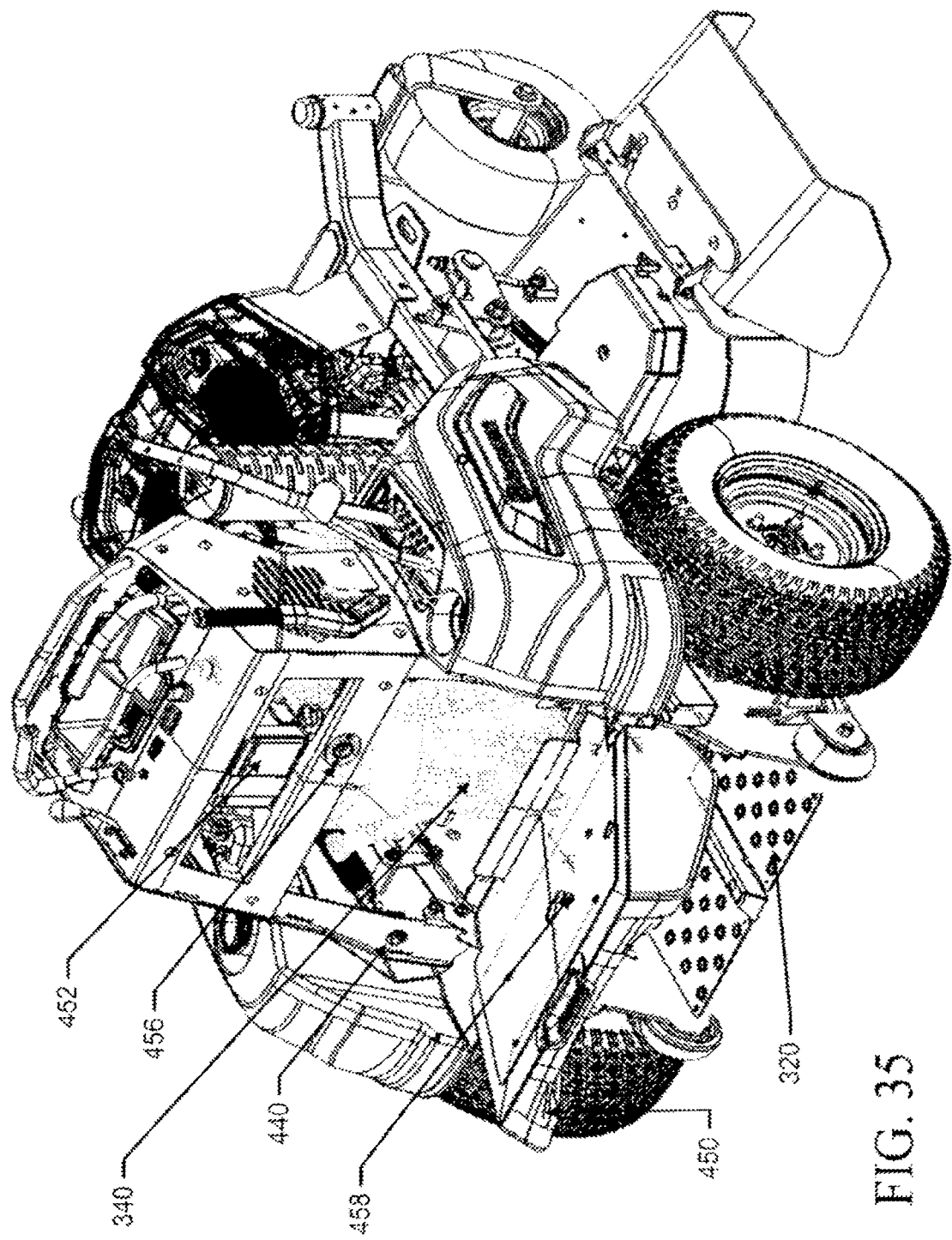
FIG. 35 illustrates the pad displaced from the normal operating position to provide access to the engine in accordance with an example embodiment.
Figure 36:
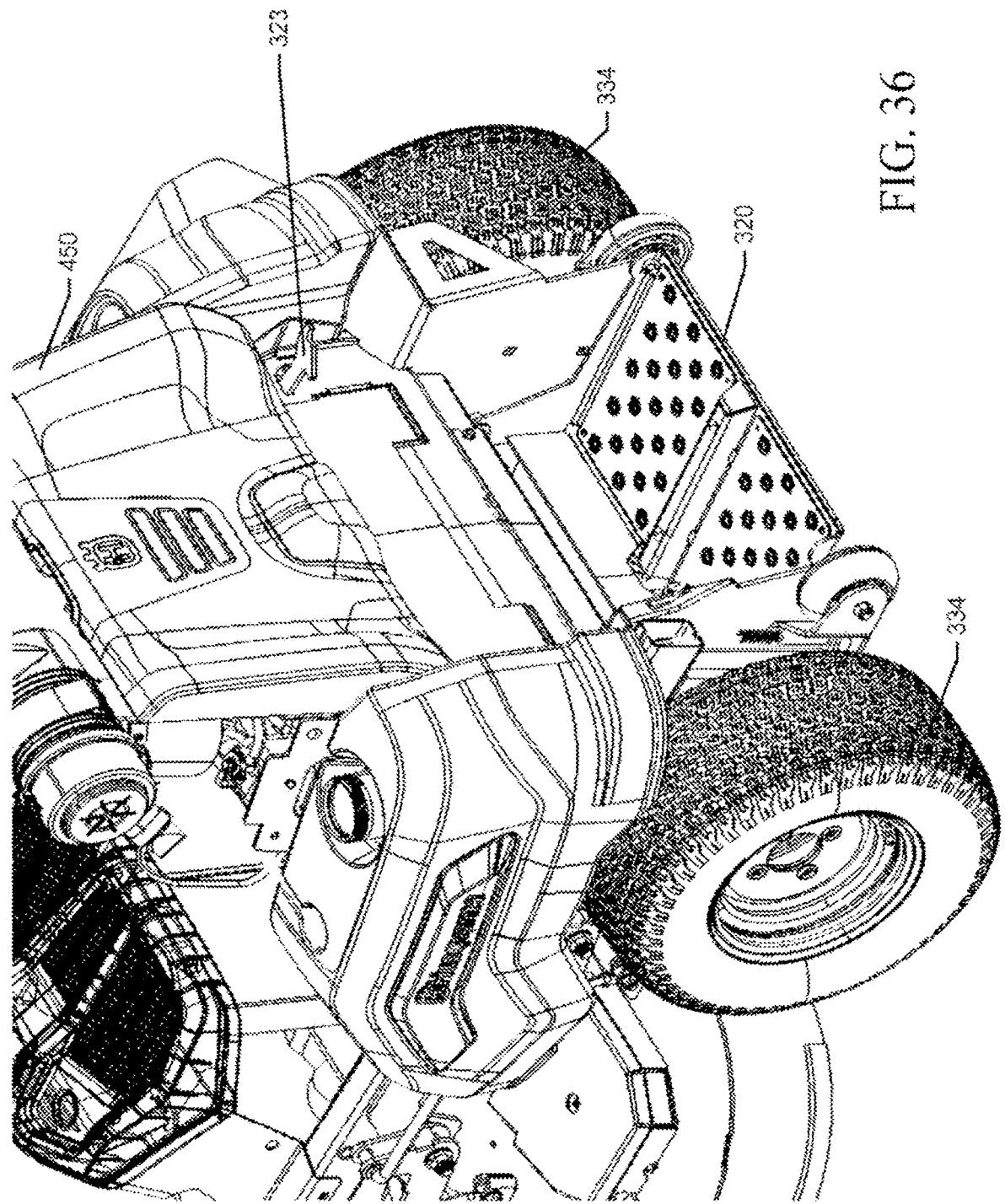
FIG. 36 illustrates a perspective view of the support platform in a first position in accordance with an example embodiment.
Figure 37:
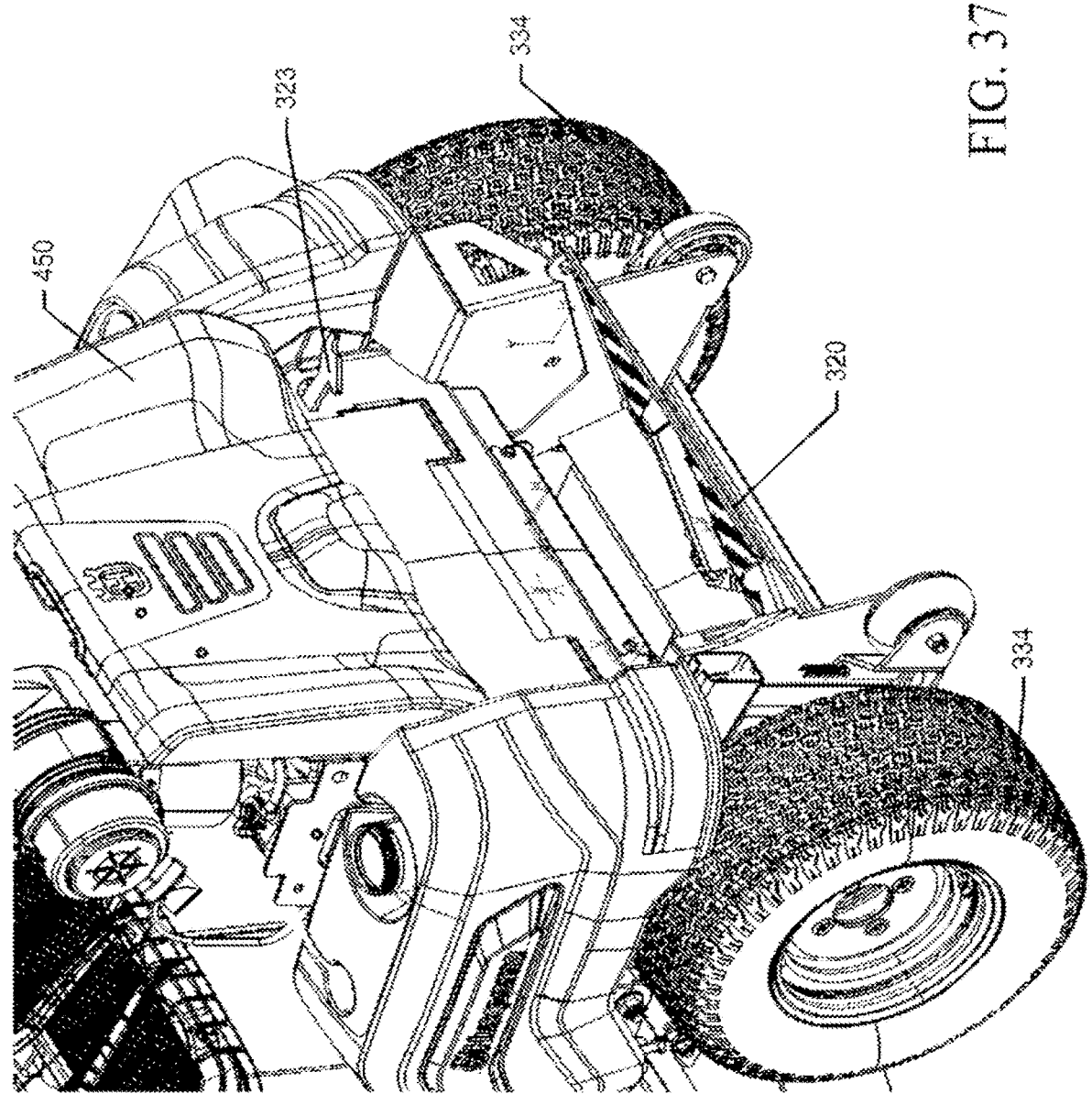
FIG. 37 illustrates the support platform being folded out of the first position toward a second position in accordance with an example embodiment.
Figure 38:
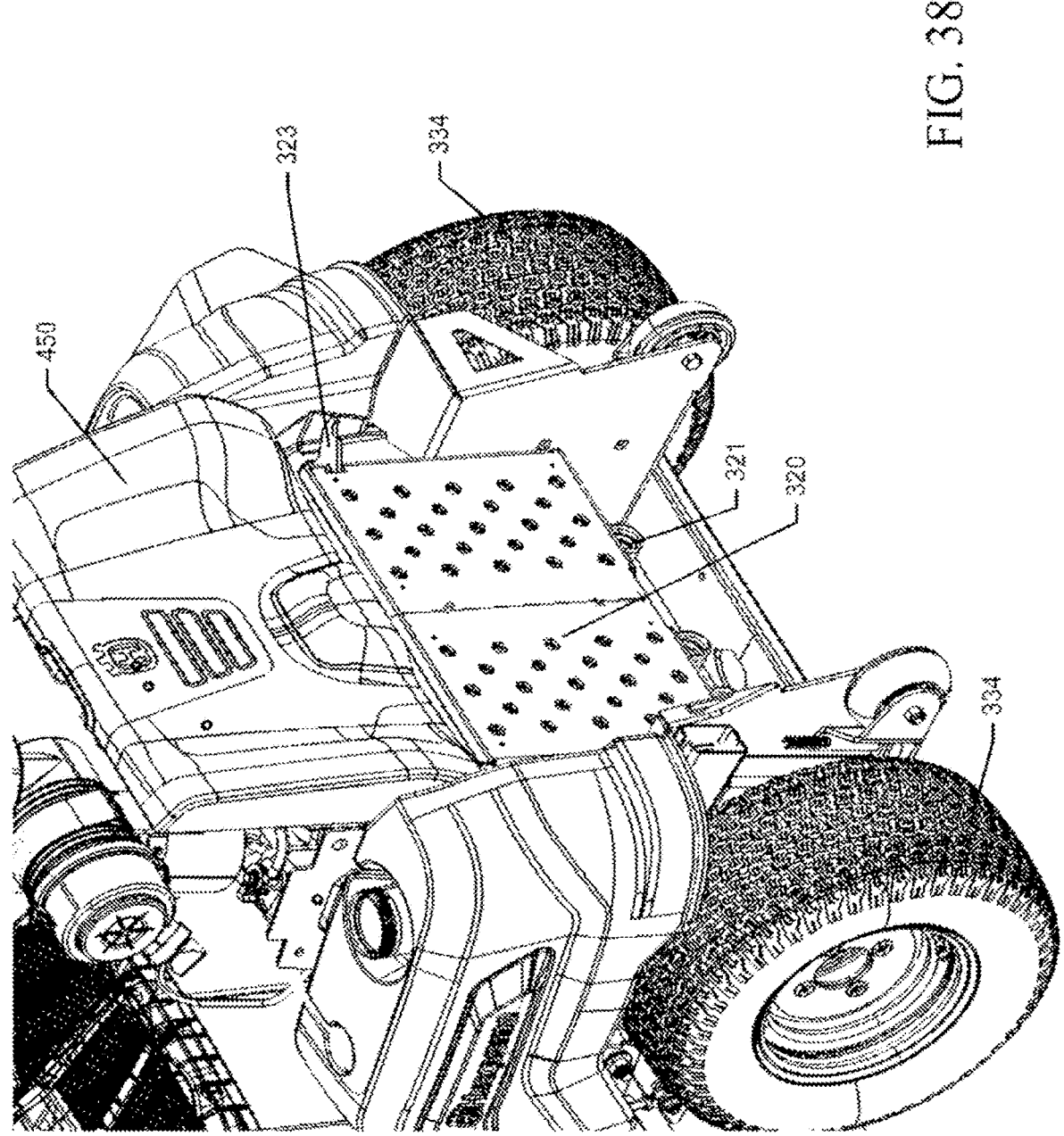
FIG. 38 illustrates a rear-left perspective view of the support platform folded and locked in the second position in accordance with an example embodiment.
Figure 39:
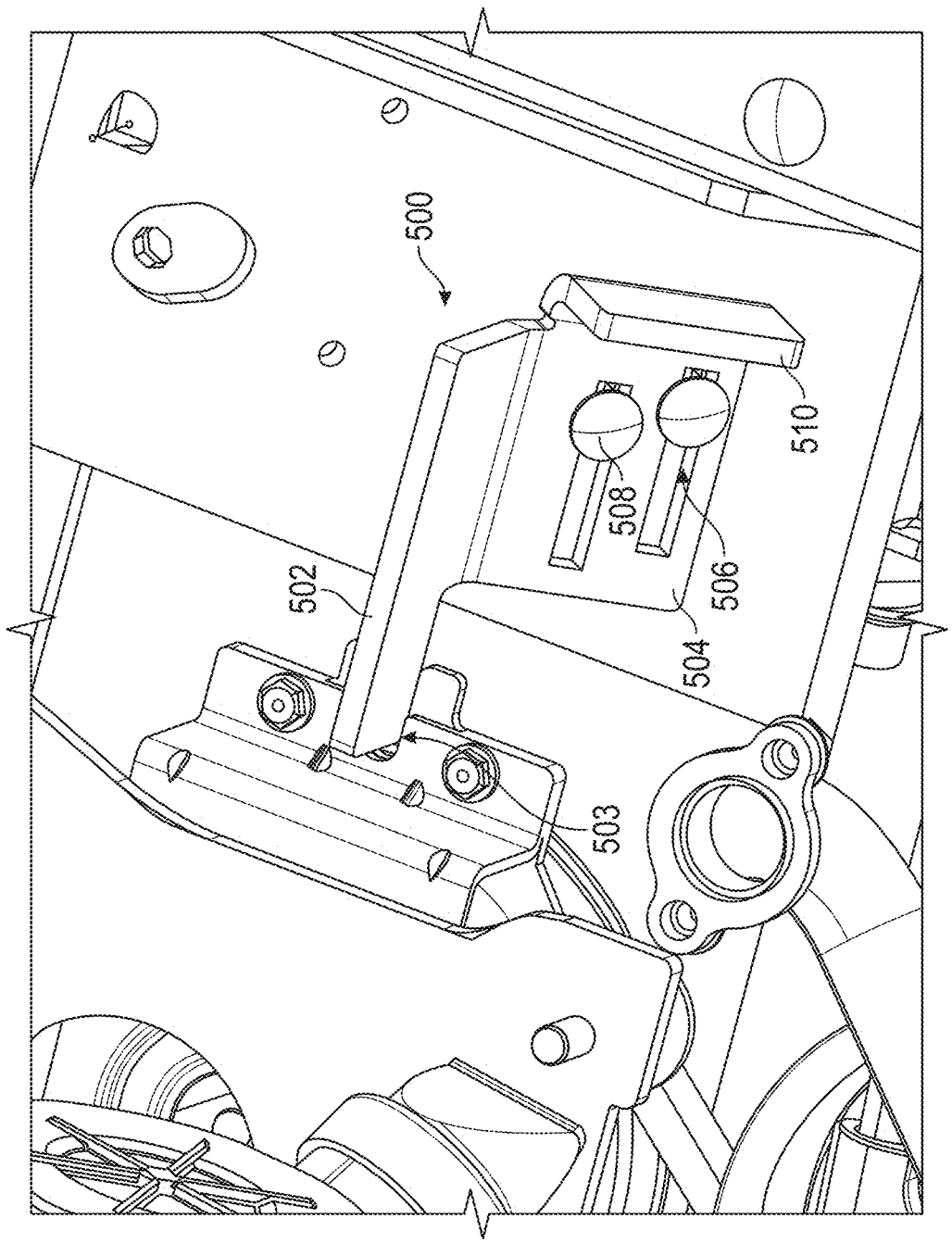
FIG. 39 illustrates a close in view of the support platform folded locked in the second position in accordance with an example embodiment.

As shown in FIG. 34, for example, the pad 450 may be pivotally attached to a rear portion of the operator station 352. Rotation of the pad 450 rearward exposes the engine 340, but also exposes an area inside which a battery 452 of the riding lawn care vehicle 310 and other electronics are located (e.g., near a top portion of the operator station 352) as shown in FIG. 35. FIG. 33 illustrates the view of FIG. 35 in greater detail and further illustrates the location of the tension adjustment slot 440. FIG. 33 also shows a fitting 456 into which a protrusion 458 from the pad 450 may be seated to hold the pad 450 in the normal (e.g., closed) position. The fitting 456 may be a snap fitting or any other suitable fixing mechanism.

The battery 452 (e.g., a lithium ion battery) of the riding lawn care vehicle 310 may be provided to extend from the rear wall of the operator station 352 to be proximate to an intake of the engine 340 so that the battery 452 may be cooled by the airflow in the airflow channel that is formed by the operator station 352 relative to the engine 340. The provision of the battery 452 in this location provides short and convenient connections to electric components of the riding lawn care vehicle 310 that are operated or otherwise housed at the operator station 352. Moreover, easy access is created to all of these electronic components simply by rotating the pad 450 forward.

Figure 43:
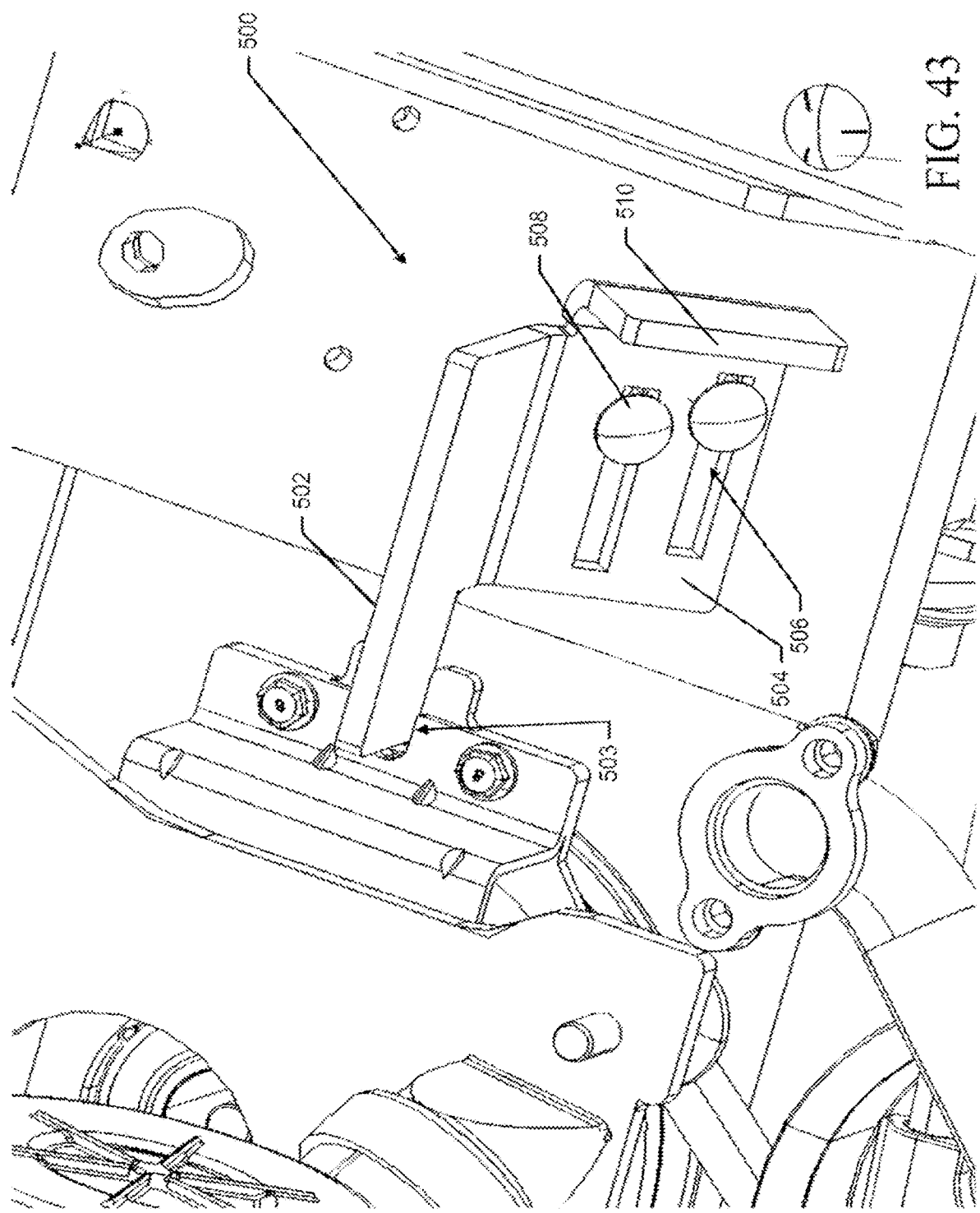
FIG. 43 illustrates a PTO locking assembly in a locked position in accordance with an example embodiment.
Figure 44:
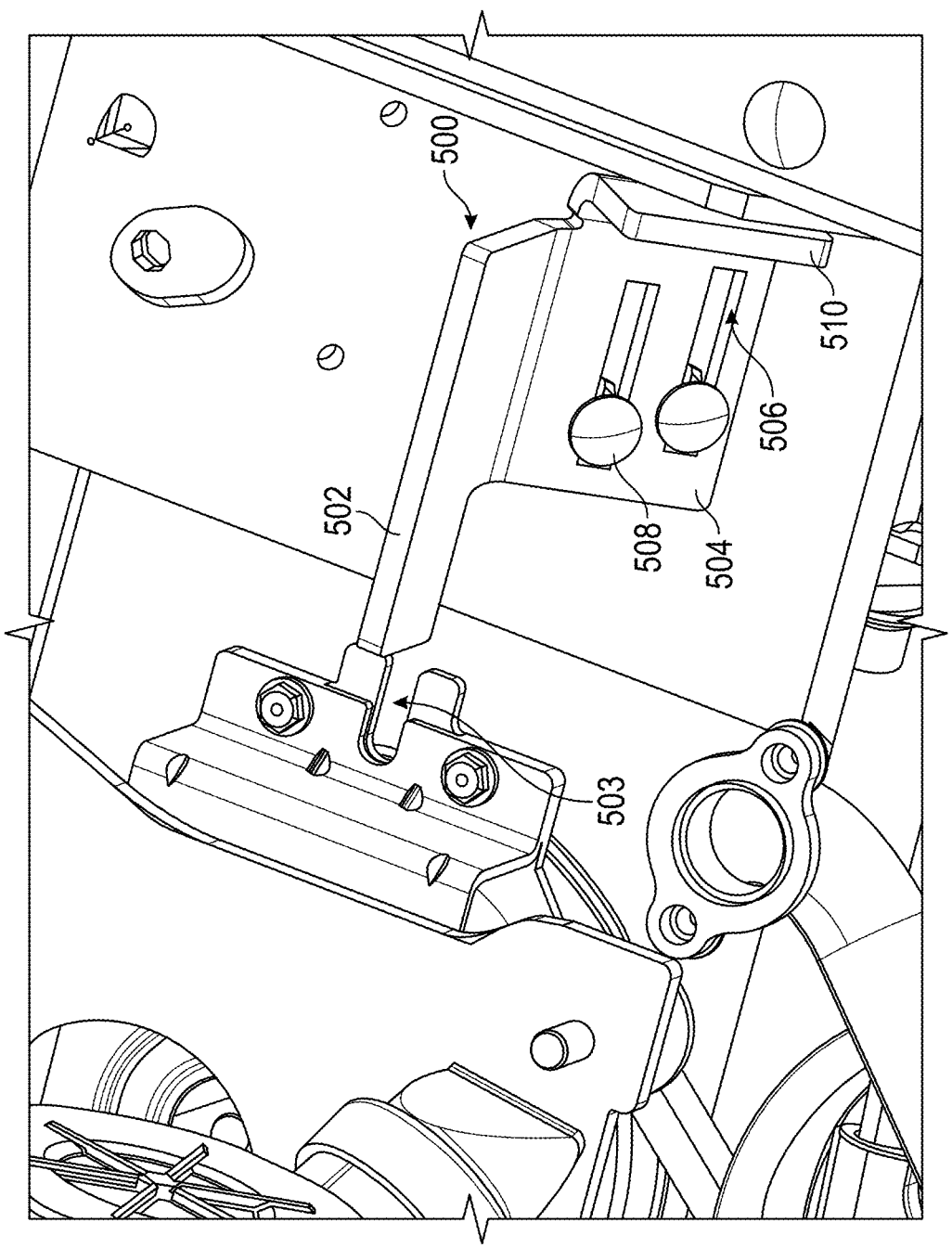
FIG. 44 illustrates the PTO locking assembly in an unlocked position in accordance with an example embodiment.
Figure 45:
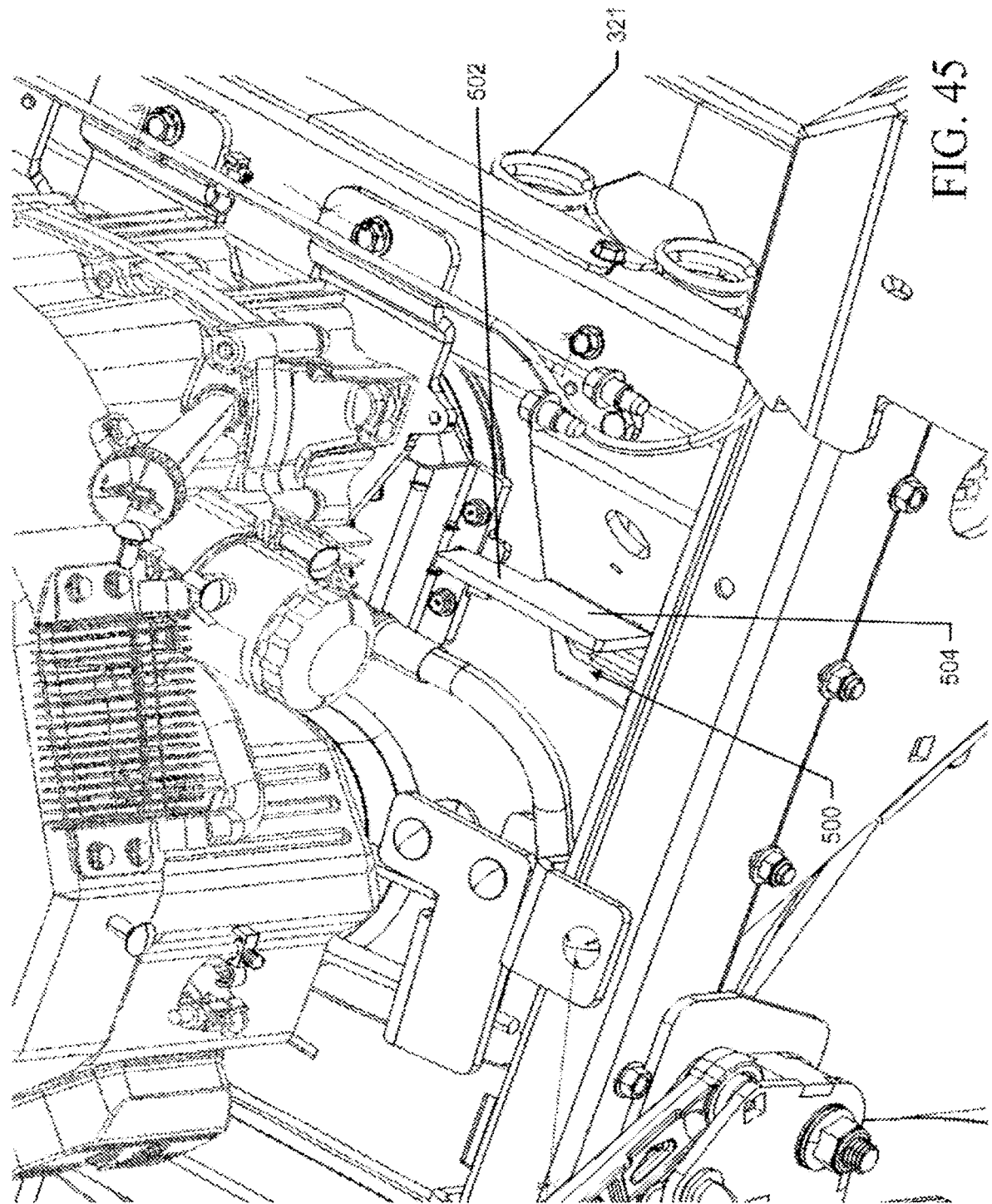
FIG. 45 illustrates perspective view of the PTO locking assembly in the locked position in accordance with an example embodiment.
Figure 50:
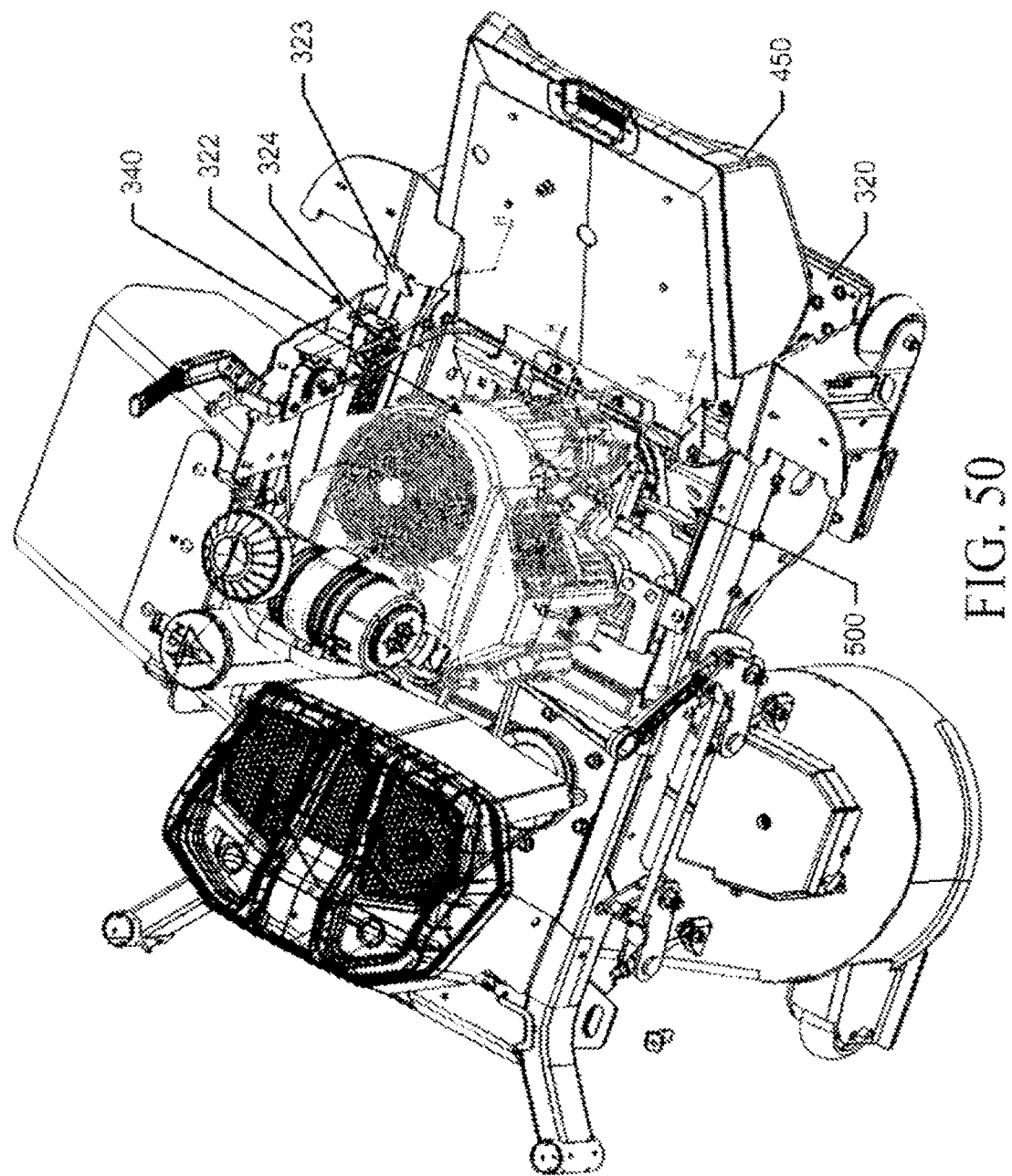
FIG. 50 illustrates a perspective view of the PTO locking assembly in context with the operator station removed in accordance with an example embodiment.

In some example embodiments, the engine 340 may include a PTO lock 500 that can be alternately engaged or disengaged to either allow normal operation of the PTO (when engaged) or allow the PTO to be serviced, maintained, or replaced (when disengaged). Thus, under normal circumstances, the PTO lock 500 remains engaged (as shown in FIGS. 43, 45 and 50). However, the PTO lock 500 may also be disengaged, as shown in FIG. 44. The PTO lock 500 may include a locking protrusion 502 that extends into a locking slot 503 disposed proximate to a base portion of the engine 340 when engaged and is removed from the locking slot 503 when disengaged. The locking protrusion 502 may extend from a lock body 504 that includes one or more slots 506. One or more bolts 508 may ride in the slots 506 during movement of the lock body 504 between engaged and disengaged positions. A tab 510 may be provided on the lock body 504 to allow the operator to easily press on the tab 510 when the bolts 508 are loosened to move the lock body 504 (and therefore also the locking protrusion 502) between the engaged and disengaged positions. The bolts 508 may normally be tightened, particularly when the PTO lock 500 is engaged, and loosened to permit a change in state between engaged and disengaged states. In an example embodiment, an access panel 520 at a rear portion of the riding lawn care vehicle 310 may be removed to allow access to the PTO lock 500. Access may also be gained to various belts and pulleys via the removal of the access panel 520.

Figure 48:
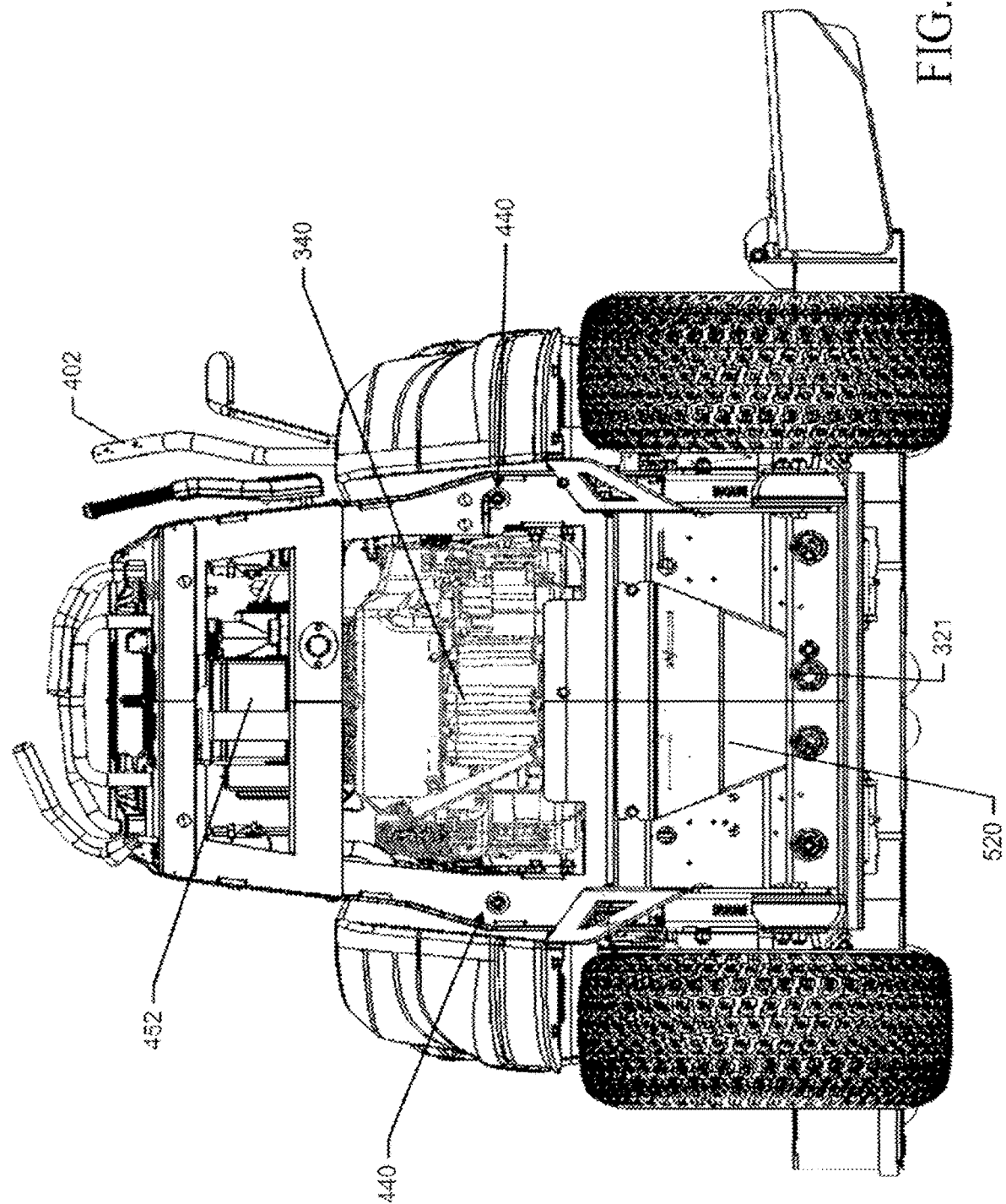
FIG. 48 illustrates a rear view of the riding lawn care vehicle with the pad and access panel for the battery removed in accordance with an example embodiment.
Figure 49:
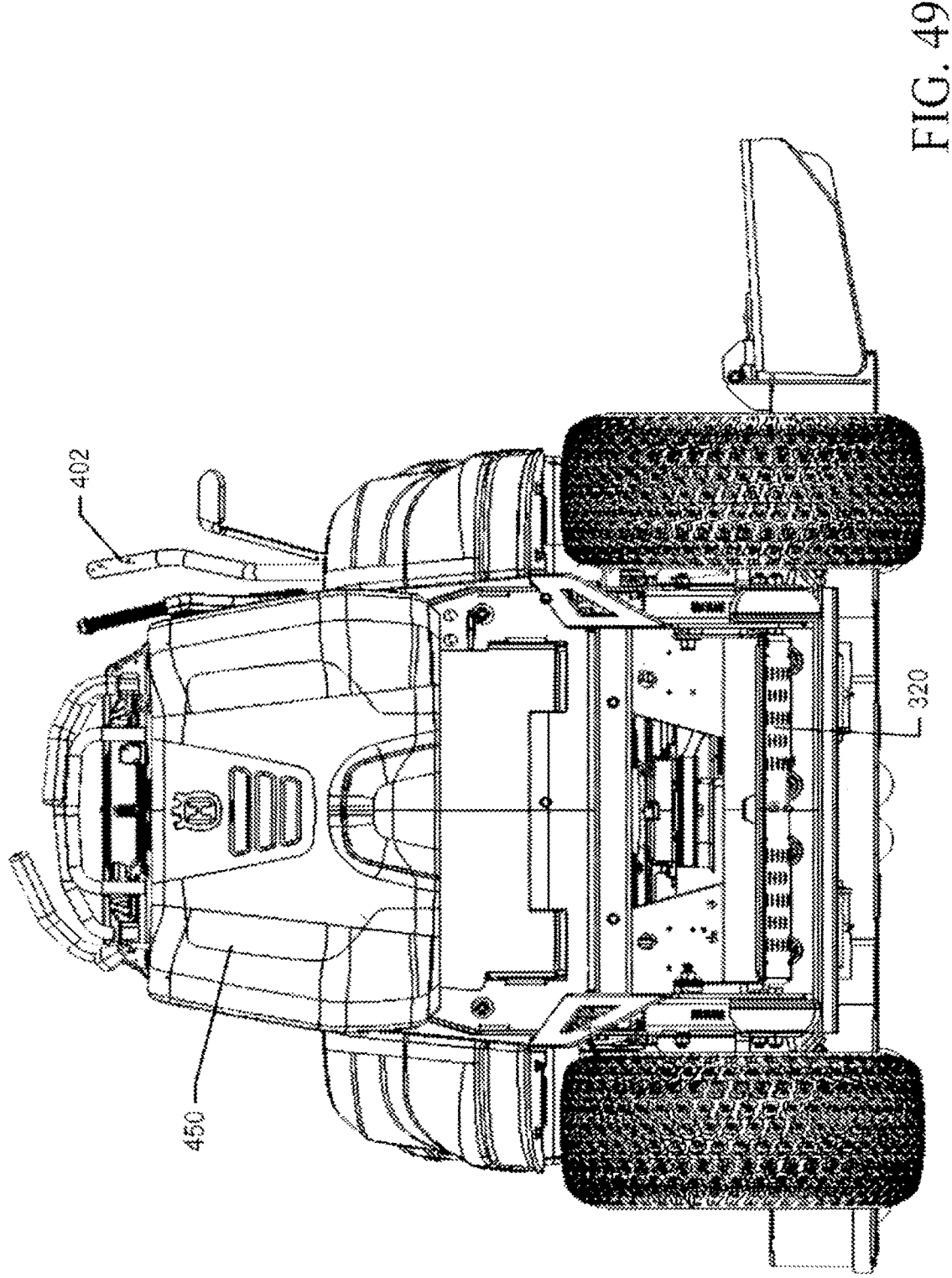
FIG. 49 illustrates a rear view of the riding lawn care vehicle with an access panel for accessing the PTO locking assembly removed in accordance with an example embodiment.

FIG. 48 illustrates the access panel 520, and FIG. 49 shows the access afforded to a rear portion of the riding lawn care vehicle 310 through which the PTO lock 500 can be accessed. FIG. 50 illustrates a perspective view of the area in which the PTO lock 500 resides, proximate to the engine 340.

It should be appreciated that example embodiments of the present invention provide a new type of configuration for a stand-on riding lawn care vehicle. Example embodiments of the invention may provide a riding lawn care vehicle including a frame, an engine, a steering assembly, a support platform and a front platform. At least a pair of drive wheels may be operably coupled to the frame. The engine is operably coupled to the frame via an engine platform. The engine is disposed substantially between the drive wheels to selectively provide drive power to the drive wheels via respective hydraulic pumps. The steering assembly includes control levers operably coupled to respective ones of the drive wheels via the respective hydraulic pumps. The steering assembly enables steering of the riding lawn care vehicle based on drive speed control of the drive wheels responsive to positioning of the control levers. The support platform is operably coupled to the frame at a rear portion of the riding lawn care vehicle to support a standing rider. The front platform is operably coupled to the frame forward of the engine platform. The front platform supports the hydraulic pumps. The vehicles structure and configuration may provide improved accessibility, stability, maneuverability, versatility, handling, hill holding, visibility, cutting performance, trimming performance, and operator escapeability (e.g., operator can simply step off the back of the riding lawn care vehicle 10).

In some cases, the vehicle may include additional optional features, structures or components, or the components described above may be augmented, modified or improved. For example, in some cases, the steering assembly may be disposed at an operator station that is removable from or foldable relative to remaining portions of the riding lawn care vehicle. In an example embodiment, the steering assembly may be disposed at an operator station that has a top panel including a storage container formed therein. In some cases, the storage container may include one or more tabs to which a retention element is mountable to secure an item in the storage container. Alternatively or additionally, the storage container comprises drain holes formed at a bottom portion thereof. Moreover, in some cases, the storage container may include drain holes formed at a bottom portion thereof. In such an example, one or more tabs may protrude into the drain holes. The tabs may enable a retention element to be mounted thereto to secure an item in the storage container. In an example embodiment, the steering assembly may be disposed at an operator station that has a substantially U or C shape that tapers as the operator station extends away from the frame. In such an example, a deck lift lever is provided proximate to a side of the operator station. The deck lift lever may extend in a plane substantially perpendicular to the ground. A parking brake may be provided between the deck lift lever and the side of the operator station. In some cases, the front platform may include an access passage formed in a surface thereof below a reservoir portion of each of the hydraulic pumps to provide access to a cartridge filter of the hydraulic pumps via the access passage. In some cases, the front platform is higher in elevation than the engine platform. In this regard, for example, the front platform may be disposed substantially level with a top of the frame and the engine platform may be recessed relative to the top of the frame. In an example embodiment, an exhaust of the engine may be provided between the engine and the hydraulic pumps such that air drawn by fans of the hydraulic pumps passes by the exhaust. In some cases, the riding lawn care vehicle further includes a bypass assembly configured to enable the hydraulic pumps to be simultaneously engaged or disengaged from a single location/side of the riding lawn care vehicle via operation of a single actuator. In this regard, for example, the single actuator may be a universal bypass lever that slides along a surface of the front platform. In an example embodiment, the riding lawn care vehicle may further include a cutting deck comprising one or more cutting blades operably coupled to a mandrel. A mandrel cover is provided to removably cover the mandrel. The mandrel cover may include at least one tab configured to provide snap engagement with an orifice formed in an inner frame operably coupled to a top surface of the cutting deck. In an example embodiment, the steering assembly may be disposed at an operator station, and the engine may have an intake at least partially provided below a top panel of the operator station. A battery of the riding lawn care vehicle may be provided above the intake such that air drawn to the intake cools the battery. In some cases, a neutral position of the control levers may be adjustable via a neutral position adjustment assembly. In this regard, for example, the neutral position adjustment assembly may include a cross member to which one of the control levers is attached, a threaded eye operably coupled to one end of the cross member, and an adjustment screw assembly that engages a threaded portion of the threaded eye to a vertically extending portion of a pump control linkage at a variable location is made to adjust the neutral position of the one of the control levers. Additionally or alternatively, the adjustment screw assembly may include vertically extending slots that align with an orifice in the vertically extending portion of the pump control linkage to receive a pin to prevent further adjustment of the adjustment screw assembly. In an example embodiment, the steering assembly may be disposed at an operator station. The drive wheels are rear wheels of the riding lawn care vehicle, and each of the rear wheels has a console provided proximate thereto. In an example embodiment, the console may be provided proximate to one of the rear wheels comprises a gas tank. Additionally or alternatively, the console may be further provided proximate to a side of the operator station and a majority portion of the gas tank is outside the operator station while at least a vapor space of the gas tank is provided inside the operator station. In some embodiments, the riding lawn care vehicle is a zero turn radius mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
a frame to which at least a pair of drive wheels are operably coupled;
an engine operably coupled to the frame via an engine platform, the engine being disposed substantially between the drive wheels to selectively provide drive power to the drive wheels via respective hydraulic pumps;
a steering assembly comprising control levers operably coupled to respective ones of the drive wheels via the respective hydraulic pumps, the steering assembly enabling steering of the riding lawn care vehicle based on drive speed control of the drive wheels responsive to positioning of the control levers;
a support platform operably coupled to the frame at a rear portion of the riding lawn care vehicle to support a standing operator; and
a front platform operably coupled to the frame forward of the engine platform, the front platform supporting the hydraulic pumps,
wherein at least one of the respective hydraulic pumps comprises a neutral positioning assembly defining a neutral position to which the at least one of the respective hydraulic pumps returns after actuation of a corresponding one of the control levers, and
wherein the neutral positioning assembly is configured to enable adjustment of a longitudinal location of the neutral position forward toward the front platform and rearward toward the pair of drive wheels.

2. The riding lawn care vehicle of claim 1, wherein the engine platform is fixed at an elevation above the ground that is at least as high as an axis of rotation of the drive wheels.

3. The riding lawn care vehicle of claim 1, wherein the steering assembly is disposed at an operator station, the operator station being removable from or foldable relative to remaining portions of the riding lawn care vehicle.

4. The riding lawn care vehicle of claim 3, wherein the operator station comprises a top panel comprising a storage container formed therein,
wherein the storage container comprises one or more tabs to which a retention element is mountable to secure an item in the storage container,
wherein the storage container comprises drain holes formed at a bottom portion thereof, and
wherein one or more tabs protrude into the storage container, the tabs enabling a retention element to be mounted thereto to secure an item in the storage container.

5. The riding lawn care vehicle of claim 3, wherein the operator station comprises a substantially U or C shape that tapers as the operator station extends away from the frame.

6. The riding lawn care vehicle of claim 3, wherein a deck lift lever is provided proximate to a side of the operator station, the deck lift lever extending in a plane substantially perpendicular to the ground, and wherein a parking brake is provided between the deck lift lever and the side of the operator station.

7. The riding lawn care vehicle of claim 1, wherein the front platform comprises an access passage formed in a surface thereof below a reservoir portion of each of the hydraulic pumps to provide access to a cartridge filter of the hydraulic pumps via the access passage.

8. The riding lawn care vehicle of claim 2, wherein the front platform is higher in elevation than the engine platform, and
wherein the front platform is disposed substantially level with a top of the frame and the engine platform is recessed relative to the top of the frame.

9. The riding lawn care vehicle of claim 1, wherein the support platform comprises a suspension system.

10. The riding lawn care vehicle of claim 9, wherein the suspension system comprises springs operably coupled to the frame and disposed between the frame and the support platform, and
wherein the springs are configured to bias the support platform in a horizontal position.

11. The riding lawn care vehicle of claim 1, wherein the support platform is configured to rotate relative to the frame between a first position in which the support platform is horizontal and a second position in which the support platform is vertical.

12. The riding lawn care vehicle of claim 11, wherein in the first position, the support platform is configured to support the operator standing on a surface of the support platform.

13. The riding lawn care vehicle of claim 12, wherein the support platform further comprises a divider plate that bisects the surface of the support platform.

14. The riding lawn care vehicle of claim 1, further comprising a cutting deck comprising one or more cutting blades operably coupled to a mandrel, wherein a mandrel cover is provided to removably cover the mandrel, the mandrel cover comprising at least one tab configured to provide snap engagement with an orifice formed in an inner frame operably coupled to a top surface of the cutting deck.

15. The riding lawn care vehicle of claim 1, wherein the steering assembly is disposed at an operator station, and wherein the engine has an intake at least partially provided below a top panel of the operator station, and wherein a battery of the riding lawn care vehicle is provided above the intake such that air drawn to the intake cools the battery.

16. The riding lawn care vehicle of claim 1, wherein the steering assembly is disposed at an operator station, and wherein the drive wheels are rear wheels of the riding lawn care vehicle, and wherein each of the rear wheels has a console provided proximate thereto,
  wherein the console provided proximate to one of the rear wheels comprises a gas tank, and
  wherein the console is further provided proximate to a side of the operator station, and wherein a majority portion of the gas tank is outside the operator station and at least a vapor space of the gas tank is provided inside the operator station.

17. A riding lawn care vehicle comprising:
  a frame to which at least a pair of drive wheels are operably coupled;
  an engine operably coupled to the frame via an engine platform, the engine being disposed substantially between the drive wheels to selectively provide drive power to the drive wheels via respective hydraulic pumps;
  a steering assembly comprising control levers operably coupled to respective ones of the drive wheels via the respective hydraulic pumps, the steering assembly enabling steering of the riding lawn care vehicle based on drive speed control of the drive wheels responsive to positioning of the control levers:
  a support platform operably coupled to the frame at a rear portion of the riding lawn care vehicle to support a standing operator; and
  a front platform operably coupled to the frame forward of the engine platform, the front platform supporting the hydraulic pumps,
  wherein at least one of the respective hydraulic pumps comprises a neutral positioning assembly defining a neutral position to which the at least one of the respective hydraulic pumps returns after actuation of a corresponding one of the control levers, and
  wherein the neutral positioning assembly is configured to enable adjustment of the neutral position,
  wherein the riding lawn care vehicle is a zero turn radius mower, and
  wherein the riding lawn care vehicle further comprises a hydraulic motor disposed proximate to each of the drive wheels, the hydraulic motor being operably coupled to a respective one of the hydraulic pumps.

18. The riding lawn care vehicle of claim 1 wherein the neutral positioning assembly comprises an orientation plate having a reference protrusion, a first scissor arm, a second scissor arm, and a pivot arm that is operably coupled to a linkage that moves responsive to repositioning of the corresponding one of the control levers,
  wherein each of the first and second scissor arms is biased to return to the neutral position by biasing springs that are operably coupled between respective distal ends of the first and second scissor arms and corresponding portions of the orientation plate.

19. The riding lawn care vehicle of claim 1, further comprising a power-take-off (PTO) lock, the PTO lock being accessible from an access panel disposed proximate to the engine and the support platform to shift between engaged and disengaged states responsive to sliding a locking protrusion from a locking slot.

20. The riding lawn care vehicle of claim 1, further comprising a cutting deck comprising one or more cutting blades, wherein a height of the cutting deck is adjustable via a deck lift system,
  wherein the deck lift system comprises a torsion bar that operably couples right and left sides of a rear lift assembly, the rear lift assembly being operably coupled to a front lift assembly via deck lift linkage arms to operate the front lift assembly simultaneously with operation of the rear lift assembly to raise or lower the height of the cutting deck,
  wherein the torsion bar is biased via a deck lift assisting spring,
  wherein the deck lift assisting spring has an adjustable tension,
  wherein the steering assembly is disposed at an operator station, and
  wherein the operator station comprises a tension adjustment slot at a rear portion thereof, the tension of the deck lift assisting spring being adjustable via the tension adjustment slot.

* * * * *